(12) United States Patent
Asmussen

(10) Patent No.: US 7,293,279 B1
(45) Date of Patent: Nov. 6, 2007

(54) ADVANCED SET TOP TERMINAL HAVING A PROGRAM PAUSE FEATURE WITH VOICE-TO-TEXT CONVERSION

(75) Inventor: Michael L. Asmussen, Oak Hill, VA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 1029 days.

(21) Appl. No.: 09/609,285

(22) Filed: Jun. 30, 2000

Related U.S. Application Data

(63) Continuation-in-part of application No. 09/521,614, filed on Mar. 9, 2000.

(51) Int. Cl.
- H04N 7/173 (2006.01)
- H04N 5/445 (2006.01)
- G06F 3/00 (2006.01)
- G06D 13/00 (2006.01)

(52) U.S. Cl. .................. 725/102; 725/55; 725/100
(58) Field of Classification Search ................ 725/102, 725/55, 100
See application file for complete search history.

(56) References Cited

U.S. PATENT DOCUMENTS

| | | | |
|---|---|---|---|
| 3,993,955 A | 11/1976 | Belcher et al. | |
| 4,896,354 A | 1/1990 | Inagaki et al. | |
| 5,083,205 A | 1/1992 | Arai | |
| 5,208,660 A | 5/1993 | Yoshida | |
| 5,448,313 A | 9/1995 | Kim et al. | |
| 5,550,863 A | 8/1996 | Yurt et al. | |
| 5,715,315 A * | 2/1998 | Handelman | 380/234 |
| H001714 H * | 3/1998 | Partridge, III | 348/14.01 |
| 5,754,938 A * | 5/1998 | Herz et al. | 725/116 |
| 5,808,662 A * | 9/1998 | Kinney et al. | 348/14.1 |
| 5,838,368 A | 11/1998 | Masunaga et al. | |
| 5,990,927 A | 11/1999 | Hendricks et al. | 725/132 |
| 6,006,257 A * | 12/1999 | Slezak | 725/110 |
| 6,167,376 A * | 12/2000 | Ditzik | 704/235 |
| 6,480,667 B1 * | 11/2002 | O'Connor | 386/83 |
| 6,553,178 B2 * | 4/2003 | Abecassis | 386/83 |

FOREIGN PATENT DOCUMENTS

WO    WO94/13107    6/1994

OTHER PUBLICATIONS

ReplayTV VS. Tivo: http://egotron.com/ptv/ptvlive.htm.*
http://glossary.its.bldrdoc.gov/fs-1037/dir-025/_3640.htm, definition of off-hook condition in telephony, Aug. 23, 1996.*
http://dictionary.reference.com/search?q=event.*
http://mlrmag.com/archive/99_spring/publishers_page44.html, Beck, Harold, The Publisher's PAge, Mar. 12, 1999.*

* cited by examiner

Primary Examiner—Hunter B. Lonsberry
(74) Attorney, Agent, or Firm—Patterson & Sheridan, LLP

(57) ABSTRACT

A system for automatically pausing a video program in response to detection of the occurrence of a audio communications event or triggering event. In response to an incoming phone call, message, web page, or other communications information, the system pauses the video program and displays an indication of the occurrence of the audio communications event. The system also buffers the video programming while paused, permitting a user to replay missed portions of the video programming. Alternatively, the system waits for a triggering event, which includes the user's access to the audio communications event, in order to pause the video program. The audio (voice) portion of a phone call or voice mail message is converted to text for display to a recipient of the call.

63 Claims, 41 Drawing Sheets

SET TOP TERMINAL UPSTREAM DATA TRANSMISSION HARDWARE

MOOD QUESTION MENUS

LENGTH OF PROGRAM DESIRED

| SHORT | 30 minutes or less |
| MEDIUM | 30 to 60 minutes |
| LONG | 60 minutes or more |

TYPE OF PROGRAM DESIRED

- SERIOUS
- THOUGHTFUL
- LIGHT

DO YOU WISH AN ACTIVE OR PASSIVE PROGRAM?

- ACTIVE
- PASSIVE

Thursday, October 26, 1994     8:06 PM

AIRLINE INFORMATION AND RESERVATIONS (continued)

CREDIT CARD CHARGE

Amount: $590.00    Delta Flight #49
One Way: Phoenix to Dulles    Date: 11/25/94
Departs: 8:00 AM    Arrives: 3:07 PM    Dinner

| American Express | Visa | Discover | Master Charge |

Press 🔘 on Credit Card You Want to Use:

Enter Your Credit Card Number: 2 1 7 7 3 5 ▢ ▢ ▢ ▢ ▢ ▢ ▢ ▢ ▢

Enter Expiration Date (example 0 9 9 7):
Month: ▢ ▢    Year: ▢ ▢

Press 🔘 Here to Erase Above and Repeat
Press 🔘 Here to Cancel Above and Exit
Press 🔘 Here to Confirm Above Charge

ADVANCED SET TOP TERMINAL HAVING A PROGRAM PAUSE FEATURE WITH VOICE-TO-TEXT CONVERSION

The present application is a continuation-in-part of U.S. application Ser. No. 09/521,614, entitled ADVANCED SET TOP TERMINAL HAVING A PROGRAM PAUSE FEATURE, and filed Mar. 9, 2000, which is incorporated herein by reference.

The following applications and patents are incorporated herein by reference: U.S. application Ser. No. 09/588,503, filed Jun. 7, 2000, entitled ADVANCED SET TOP TERMINAL HAVING A PROGRAM PAUSE FEATURE FOR INTERACTIVE SERVICES; U.S. application Ser. No. 08/868,967, filed Jun. 5, 1997, entitled CALLER IDENTIFICATION SYSTEM FOR TELEVISION; U.S. Pat. No. 5,990,927, dated Nov. 23, 1999, entitled ADVANCED SET TOP FOR CABLE TELEVISION DELIVERY SYSTEM; U.S. application Ser. No. 08/928,630, filed Sep. 12, 1997, entitled SET TOP TERMINAL FOR CABLE TELEVISION DELIVERY SYSTEMS; U.S. application Ser. No. 09/404,707, filed Sep. 15, 1999, entitled PROGRAM DELIVERY SYSTEM FOR NVOD; U.S. Pat. No. 5,798,785, dated Aug. 25, 1998, entitled TERMINAL FOR SUGGESTING PROGRAMS OFFERED ON A TELEVISION PROGRAM DELIVERY SYSTEM; U.S. Pat. No. 5,600,364, dated Feb. 4, 1997, entitled NETWORK CONTROLLER FOR CABLE TELEVISION DELIVERY SYSTEMS; U.S. Pat. No. 5,659,350, dated Aug. 19, 1997, entitled AN OPERATIONS CENTER FOR A TELEVISION PROGRAM PACKAGING AND DELIVERY SYSTEM; U.S. Pat. No. 5,734,853, dated Mar. 31, 1998, entitled SET TOP TERMINAL FOR CABLE TELEVISION DELIVERY SYSTEMS; and U.S. Pat. No. 5,682,195, dated Oct. 28, 1997, entitled DIGITAL CABLE HEADEND FOR CABLE TELEVISION DELIVERY SYSTEM.

TECHNICAL FIELD

The invention relates to television entertainment systems for providing television programming to consumer homes. More particularly, the invention relates to an apparatus and method for pausing of a video program based upon automatic detection of occurrence of an event and selectively converting audio of an incoming telephone call to text for display.

BACKGROUND

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels.

The concepts of interactive television, high definition television and 300 channel cable systems in consumer homes will not sell if they are not packaged, delivered and presented in a useable fashion to consumers. The problem is that TV programming is not being delivered and presented to consumers in a user friendly manner.

Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

In addition, viewership fragmentation, which has already begun, will increase. Programming not presented in a user friendly manner will suffer with a decrease in viewership and revenue. As programming presentation becomes more user friendly, users seek additional features and functional capabilities.

What is needed is a system which can deliver and present television programming through a user friendly interface which allows the consumer to easily select from among the many program choices.

What is needed is a set top converter that provides a user friendly interface for subscribers to access television programs.

What is needed is a set top converter with enhanced functionality.

What is needed is a set top converter that provides users with advanced features and capabilities.

What is needed is a method that allows efficient access to hundreds of television programming options.

What is needed is technology that upgrades the functionality of existing set top converters.

What is needed is hardware that provides an upgrade capability allowing the use of existing set top converter technology in advanced program delivery systems.

What is needed is a set top converter that provides an upstream communications capability between the set top converter and cable headend.

What is needed is a set top converter that provides a capability of generating menus for display.

What is needed is a set top converter that provides a simple way to select a program from a menu.

What is needed is a set top converter that allows users to subscribe on-screen to specialty channels.

What is needed is a set top converter that monitors subscriber viewing choices for statistical purposes.

What is needed is a set top converter that provides sophisticated on-screen television menus which can incorporate still video and moving video.

What is needed is a set top converter that provides a capability of scaling and redirecting video for menus.

What is needed is a set top converter that provides the capability of receiving audio information and converting the audio information to text for display with paused or displayed programming.

What is needed is a set top converter that provides the capability of receiving phone calls and converting the phone calls audio into text for display while viewing or pausing the programming. The present invention is addressed to fulfill these needs.

SUMMARY

The present invention is a set top converter box or terminal for a television program delivery system. More specifically, the present invention is an advanced set top converter box that acts as a terminal in the viewer home. The set top terminal is a key component of a digital cable television delivery system. The set top terminal is an upgradeable system that provides for the decompression of digital program signals. The preferred set top terminal provides both a menu generation capability as well as a number of advanced features and functional capabilities.

The set top terminal of the present invention may be achieved through a set of hardware upgrades to any of the following embodiments: (1) an existing set top converter upgraded with a circuit card (which has a microprocessor electronically connected to the set top converter); (2) an industry standard decompression converter upgradeable by either an upgrade module or a menu generation card; and (3) a set top converter box capable of both decompression and menu generation. The hardware upgrades provide additional advanced features and functional capabilities to any of these embodiments.

A number of advanced features and functional capabilities are supported by the preferred set top terminal. This set top terminal provides subscribers with a picture-on-picture capability without requiring a special television to support the capability. The set top terminal also supports a TV guide service, which provides subscribers with information on all programming available at its particular subscriber location. The set top terminal further includes the capability of querying viewers to establish, among other things, favorite channel lists, personal profile data and mood information. The set top terminal allows the subscriber to view promotional menus on future programming events.

The set top terminal supports additional capabilities using its hardware upgrades that allow subscribers to use other interactive services, for example, to engage in on-line question and answer sessions, to order and confirm airline tickets, and to access a variety of other data services. The set top terminal makes use of a digital tuner as a hardware upgrade to provide subscribers with a digital audio capability.

The preferred set top terminal may be used to control video tape machines, thereby simplifying the recording of programs. The set top terminal can, in conjunction with the program delivery system, easily support high definition television (HDTV). For subscribers living in remote locations, the set top terminal accommodates backyard satellite systems. In addition to all the features that the set top terminal supports with its current internal programming and upgradeability, additional features may be added or existing features increased through remote reprogramming of the set top terminal 220 or other programming.

Such features include a system for automatically pausing a video program in response to detection of the occurrence of a communications event or triggering event. In response to an incoming phone call, the system pauses the video program and displays an indication of the occurrence of the communications event. Alternatively, the system pauses the video program in response to a triggering event, which includes a user's access to a communications event such as answering the phone call. The system buffers the video program while paused, permitting a user to replay missed portions of it. In addition, the system can convert the audio of an incoming phone call to text for display to a recipient of the call or other person.

It is an object of the invention to provide a user friendly interface for subscribers to access television programs.

It is an object of the invention to allow users to easily navigate through hundreds of programming choices using on-screen menus.

It is an object of this invention to efficiently access hundreds of television programming options.

It is an object of this invention to upgrade the functionality of existing set top converters.

It is an object of this invention to provide an upgrade capability allowing the use of existing set top converter technology in an advanced program delivery system.

It is an object of this invention to provide an upstream communications capability between the set top converter and cable headend.

It is an object of this invention to provide a set top terminal capable of generating menus for display.

It is an object of this invention to allow users to subscribe on-screen to specialty channels.

It is an object of this invention to monitor subscriber viewing choices for statistical purposes.

It is an object of this invention to provide sophisticated on-screen television menus which can incorporate still video and moving video.

It is an object of the invention to provide for receiving audio information and converting the audio information to text for display with paused or displayed programming.

It is an object of the invention to provide for receiving phone calls and converting the phone calls audio into text for display while viewing or pausing the programming.

These and other objects and advantages of the invention will become obvious to those skilled in the art upon review of the following description, the attached drawings and appended claims.

DESCRIPTION OF THE DRAWINGS

FIGS. 16a through 16d are drawings of viewer querying and mood question menus.

FIGS. 20a through 20d are drawings of interactive services using hardware upgrade Level B, which are related to on-screen airline reservations.

DETAILED DESCRIPTION

A. Television Program Delivery System Description

1. Introduction

Figure 1:
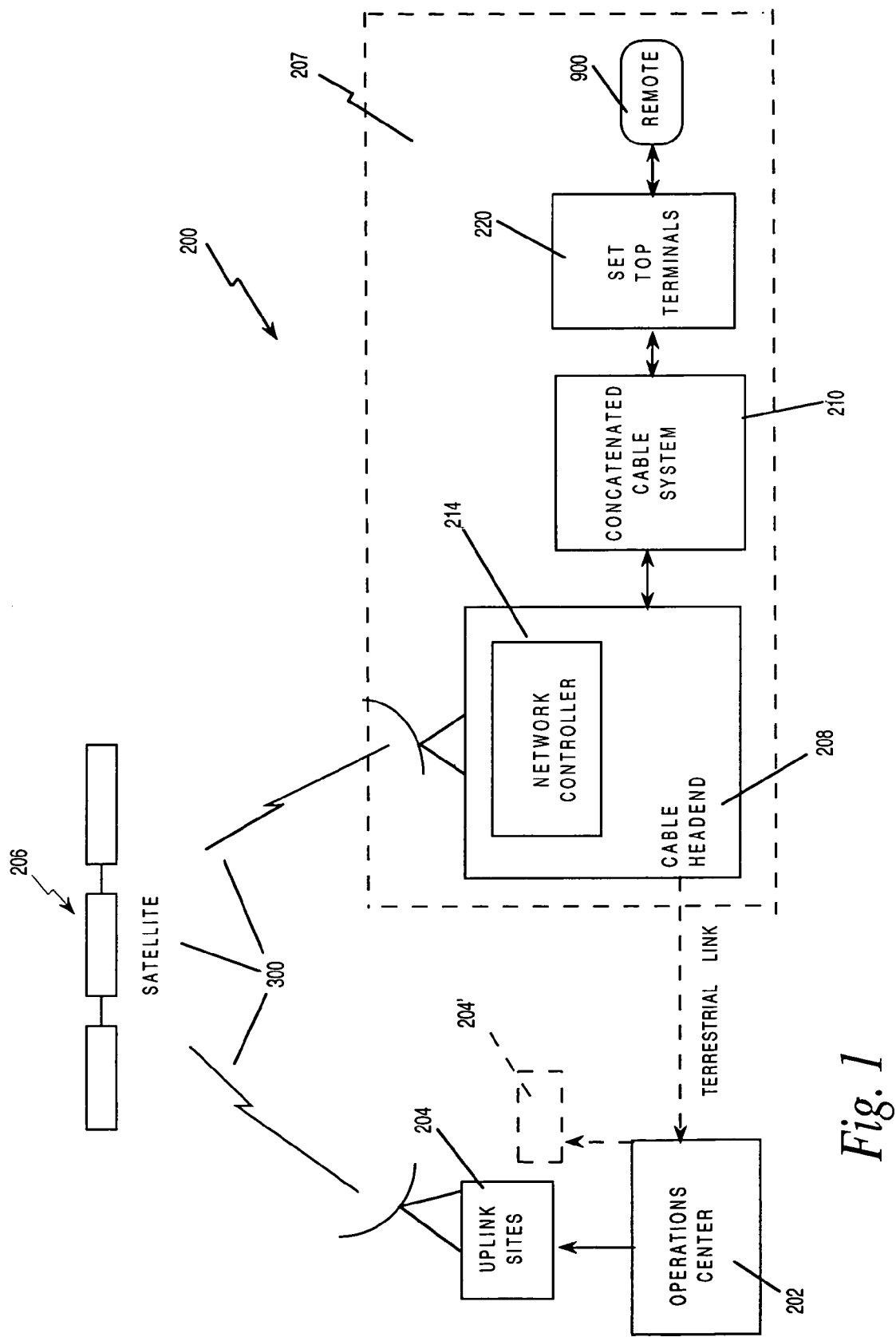
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

Figure 2:
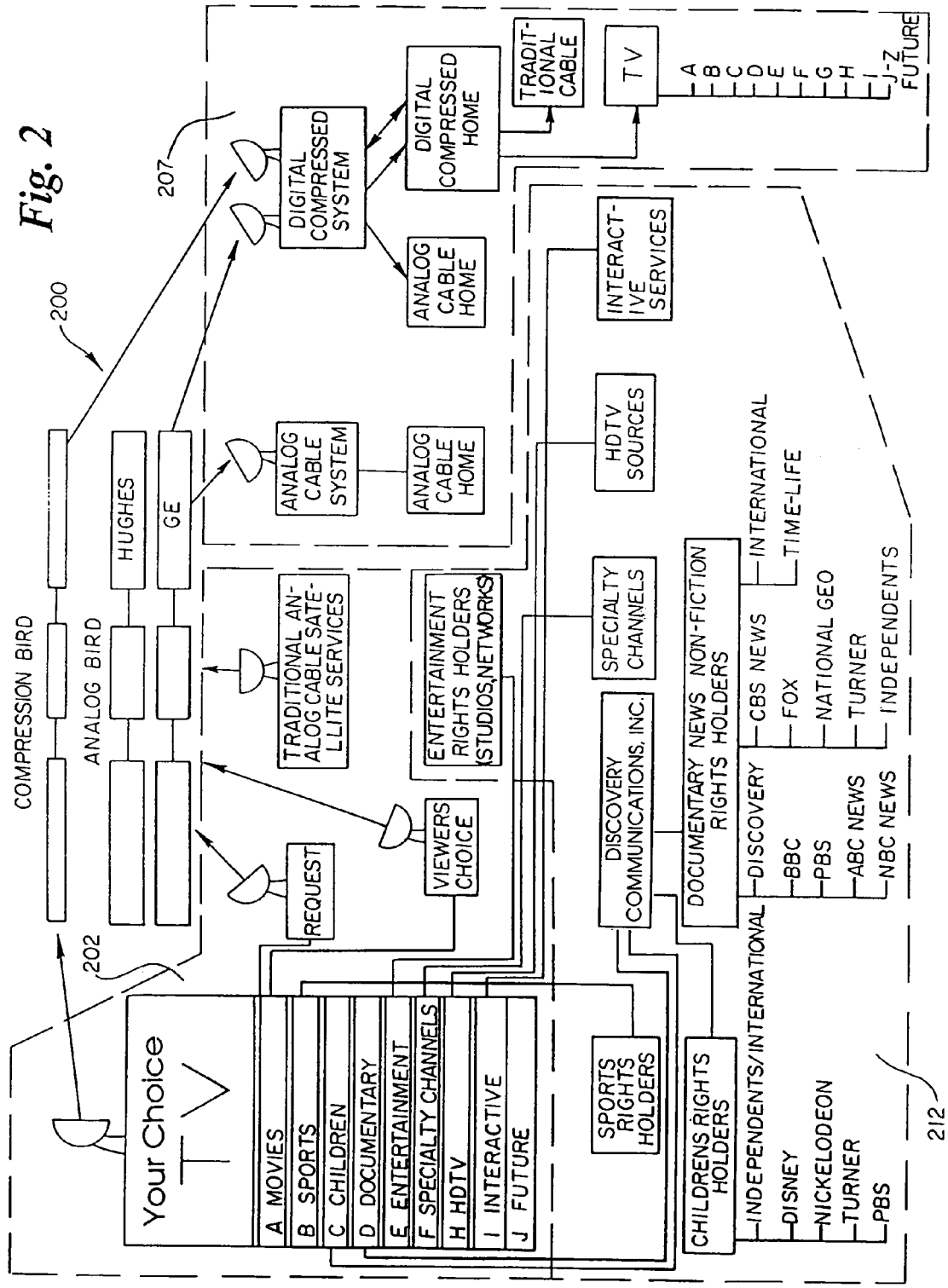
FIG. 2 is an overview of the television delivery system operations.

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

Figure 3:
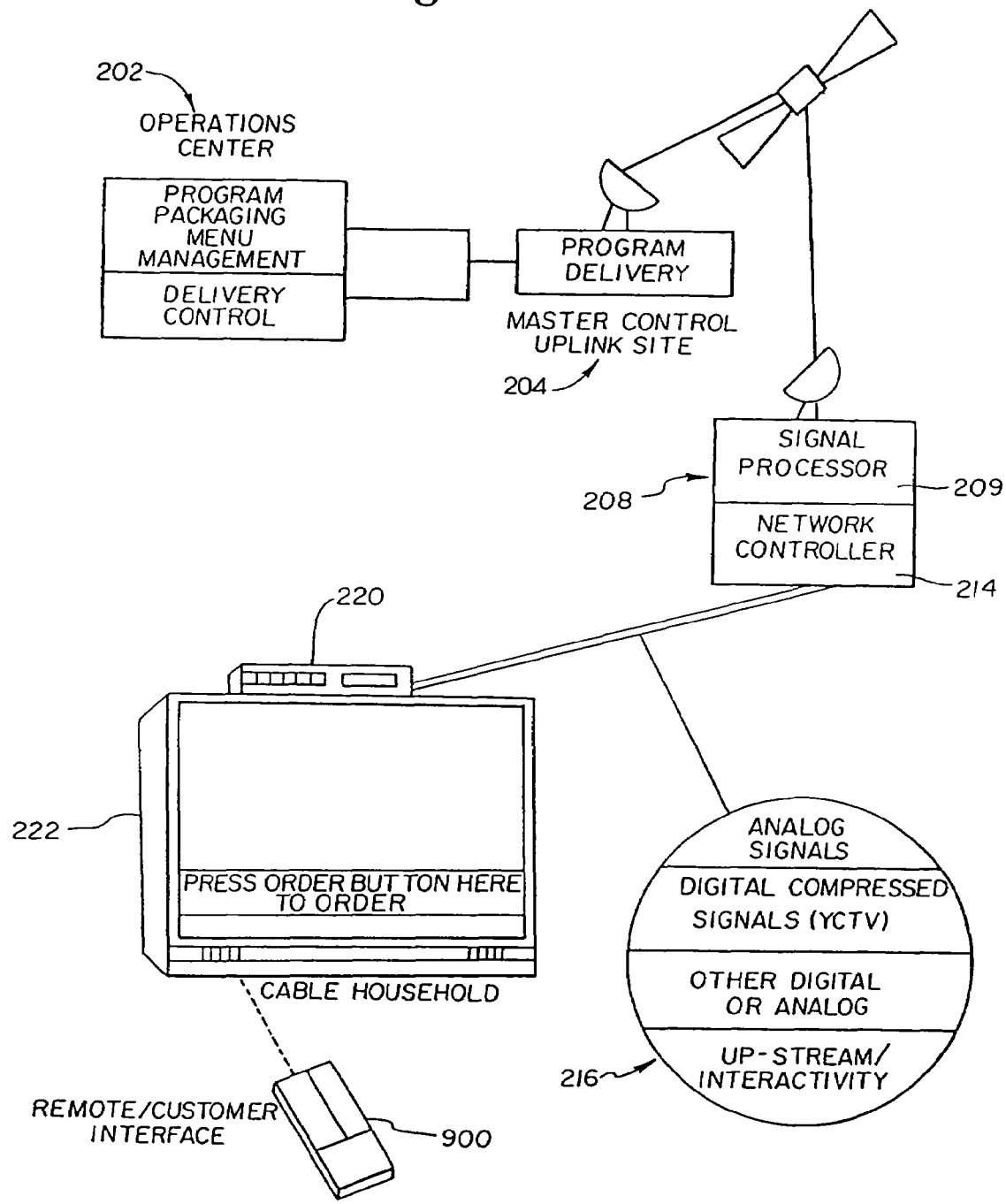
FIG. 3 is a schematic of the operation of the primary components of the system.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers' home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The delivery system 200 and digital compression of the preferred embodiment provides a one-way path from the operations center 202 to the cable headend 208. Status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Also, optional upgrades are available to enhance the performance of a subscriber's set top terminal 220. These upgrades may consist of a cartridge or computer card (not shown) that is inserted into an expansion slot in the set top terminal 220 or may consist of a feature offered by the cable headend 208 or operations center 202 to which the user may subscribe. Available upgrades may include on line data base services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

The primary conduit for communication between the subscriber and the set top terminal 220 is through the subscriber interface, preferably a remote control device 900. Through this interface, the subscriber may select desired programming through the system's menu-driven scheme or by directly accessing a specific channel by entering the actual channel number. Using the interface, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the cable system 200, the physical characteristics of the subscriber interface 900 should also add to the user friendliness of the system. The remote control 900 should easily fit in the palm of the user's hand. The buttons of the preferred remote control 900 contain pictorial symbols that are easily identifiable by the subscriber. Also, buttons that perform similar functions may be color coordinated and consist of distinguishing textures to increase the user friendliness of the system.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Detailed Set Top Terminal Description

The set top terminal 220 receives and manipulates signals from the cable headend 208. The set top terminal 220 is equipped with local computer memory and the capability of interpreting the digitally compressed signal to produce menus for the subscriber. The remote control 900 communicates the subscriber's selections to the set top terminal 220. The subscriber's selections are generally based upon menus or other prompts displayed on the television screen.

It is preferred that the signal reaches the subscriber's home in a compressed format and is decompressed prior to viewing. Included in the delivered program signal is information that enables equipment at the subscriber's home to display menus for choosing particular programs. Depending on the particular embodiment, the television program signal may arrive at the subscriber's home through one or more connections such as coaxial cables, fiber cables, twisted pairs, cellular telephone connections, or personal communications network (PCN) hookups.

The program control information signal is generated by the operations center 202 and provides the network controller 214 with data on the scheduling and description of programs. In an alternate configuration, this data is sent directly to the set top terminal 220 for display to the subscriber. In the preferred embodiment, the program control information signal is stored and modified by the network controller 214 and sent to the set top terminal 220 in the form of a set top terminal control information stream (STTCIS). The set top terminal 220 integrates either the program control information signal or the STTCIS with data stored in the memory of the set top terminal 220 to generate on-screen menus that assist the subscriber in choosing programs for display.

The types of information that can be sent using the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

With a minimal amount of information being communicated to the set top terminal 220 on a regular basis, the set top terminal 220 is able to determine the proper menu location for each program and the proper time and channel to activate for the subscriber after a menu selection. The program control information signal and STTCIS can be formatted in a variety of ways and the on-screen menus can be produced using many different methods. For instance, if the program control information signal carries no menu format information, the menu format for creating the menus can be fixed in ROM at the set top terminal 220. In the preferred embodiment, the menu format information is stored at the set top terminal 220 in a temporary memory device such as a RAM or EPROM. New menu format information is sent via the program control information signal or the STTCIS to the set top terminals 200 whenever a change to a menu format is desired.

In the simplest embodiment, the menu formats remain fixed and only the text changes. In this way the program control information signal can be limited to primarily text and a text generator can be employed in the set top terminal 220. Another simple embodiment uses a separate channel full-time (large bandwidth) just for the menu information.

Live video signals may be used in windows of certain menus. These video signals can be transmitted using the program control information signal or STTCIS, or can be taken off channels being transmitted simultaneously with the menu display. Video for menus, promos or demos may be sent to the set top terminal 220 in several formats, including (1) on a dedicated channel, (2) on a regular program channel and scaled to size, or (3) along with the program control information signal. However, in the preferred embodiment, a large number of short promos or demo video is sent using a split screen technique on a dedicated channel. A multiple window technique may be used with the menus to display a description of a program and one or more video frames that assist the subscriber in selecting the program.

Figure 4:
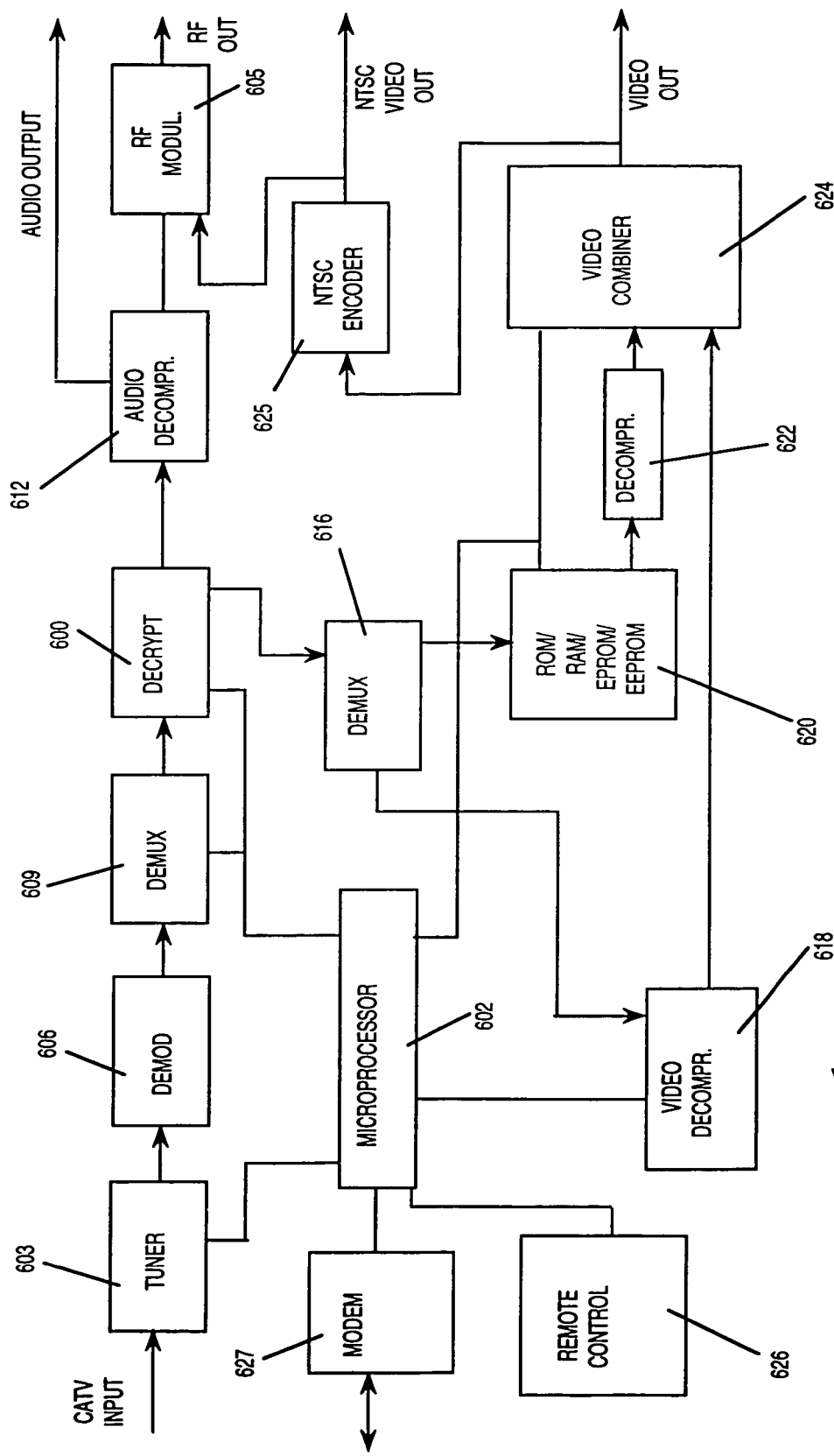
FIG. 4 is a block diagram of the hardware components of the set top terminal.

FIG. 4 shows the basic hardware components of the set top terminal 220. The set top terminal 220 has a tuner 603, digital demodulator 606, decryptor 600, and demultiplexers 609,616 as well as audio equipment 612 and a remote control interface 626 for receiving and processing signals from the remote control unit 900. An optional modem 627 allows communication between a microprocessor 602 and the cable headend 208. An NTSC encoder 625 provides a standard NTSC video output.

The microprocessor 602 is capable of executing program instructions stored in memory. These instructions allow a user to access various menus by making selections on the remote control 900.

The manner in which the video is decompressed and the menus are generated from the program control information signal or STTCIS varies depending on the specific embodiment of the invention. Video decompressors 618 and 622 may be used if the video is compressed. The program control information signal may be demulfiplexed into its component parts, and a video decompressor 618, graphic decompressor, text generator and video combiner 624 may be used to assist in creating the menus.

In addition to the menu format information that is stored in graphics memory, the set top terminal 220 also stores data, tracking those programs that have been selected for viewing. By gathering this data, the set top terminal 220 can maintain an accurate record of all programs accessed/watched by storing the data in EEPROM or RAM. Subsequently, this data can be transmitted to the cable headend 208, where it can be used in carrying out network control and monitoring functions. Such data transmissions between the set top terminal 220 and cable headend 208 can be accomplished, for example, through upstream transmission over the cable network or over telephone lines through the use of telephone modems. Where upstream transmission over the cable network is used, the set top terminals 220 can complete data transmissions on a scheduled (e.g., using a polling response or status report to respond to polling requests sent from the cable headend 208) or as-needed (e.g., using a random access technique) basis.

Figure 5A:
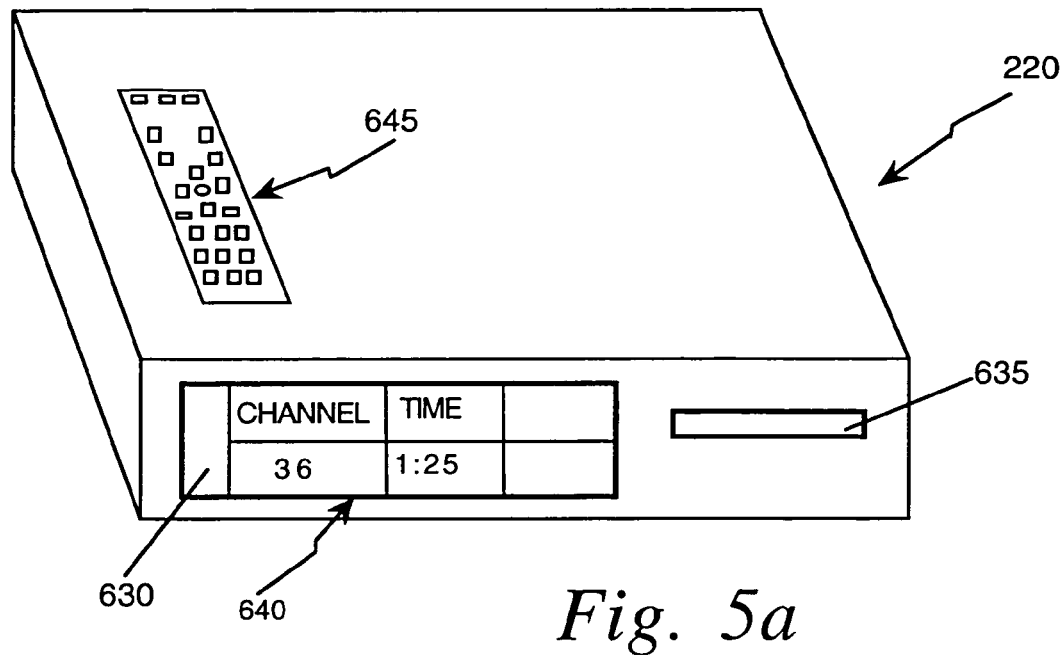
FIG. 5a is a perspective front view of a set top terminal.

FIG. 5*a* shows the front panel of the set top terminal 220, which includes an infrared sensor 630 and a series of LED displays 640. The LED displays 640 may indicate with an icon or a letter (e.g. A-K) the major menu currently selected by the set top terminal 220 or the channels selected directly by a user, or menu channel selections (e.g., from 1 to 50). Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220. The LEDs 640 may also provide an indication of the digital audio channel currently tuned.

The set top terminal 220 includes a flapped opening 635 on its front that allows the insertion of a magnetic cartridge (or similar portable storage device, including optical disk, ROM, EPROM, etc. not shown). This cartridge opening 635 allows the set top terminal 220 to be upgraded or reprogrammed locally with the use of a magnetic tape cartridge.

On the top or cover of the set top terminal 220 are located pushbutton controls 645. Any function that can be performed on the remote 900 may also be performed at the set top terminal 220 using the duplicative pushbutton controls 645.

Figure 5B:
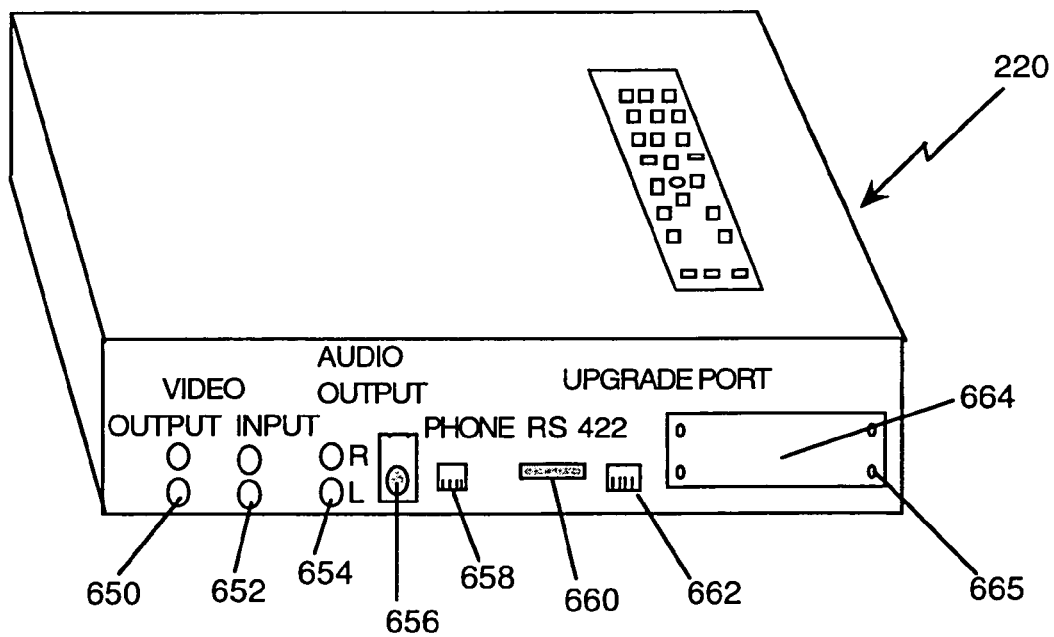
FIG. 5b is a perspective rear view of a set top terminal.

FIG. 5*b* shows the back of the set top terminal 220, which includes a pair of output terminals 650, pair of input terminals 652, pair of stereo/audio output terminals 654, satellite dish input port 656, telephone jack 658 and an RS-422 port 660. In addition, an upgrade port 662 and a cover plate 664 are held in place by a series of sheet metal screws. One of the output terminals 650 is for a television and the other is for a VCR. The set top terminal 220 is equipped to handle incoming signals on one or two cables using the input terminals 652. The phone jack 658 and an RS-232 or RS-422 port 660 are provided for maintenance, trouble shooting, reprogramming and additional customer features. In alternate embodiments, the telephone jack 658 may be used as the primary mode of communication between the cable headend 208 and the set top terminal 220. This connection is possible through the local telephone, cellular telephone or a personal communications network (PCN).

The basic programming of each set top terminal 220 is located on ROM within the set top terminal 220. Random access memory, the magnetic cartridge capability, and the expansion card slot 635 each allow upgrades and changes to be easily made to the set top terminal 220.

In the preferred embodiment, the set top terminal 220 includes a hardware upgrade port 662, in addition to expansion card slots. The hardware upgrade port 662 accommodates a four-wire (or more) connection for: (1) error corrected, decrypted data output of the set top terminal 220, (2) a control interface, (3) decompressed video output, and (4) a video input port. In the preferred embodiment, multiple wires are used to perform each of the four functions. The four sets of wires are combined in a single cable with a single multipin connector.

In the preferred embodiment, multipin connections may be used for the multiwire cable. The multipin connection 662 may range from DB9 to DB25. A variety of small computer systems interface (SCSI) ports may also be provided. Alternatively, four or more ports may be provided instead of the single port depicted.

Another port 662 is used to attach the various hardware upgrades described below to a set top terminal 220. The preferred embodiment has a number of hardware upgrades available for use with a set top terminal 220, including: (1) a Level A interactive unit, (2) a Level B interactive unit, (3) a Level C interactive unit with compact disc capability, (4) a Level D digital radio tuner for separate room use, and (5) a Level E information download unit. Each of these upgrades may be connected to the set top terminal 220 unit through the upgrade port 662 described earlier. The same four wires in a single cable described earlier may be used.

Existing set top converter boxes such as those made by Scientific Atlanta or General Instruments are presently unequipped to handle the menu selection system of the present invention. Thus, hardware modifications are necessary in order to use the menu selection system with existing set top converter technology.

Figure 6:
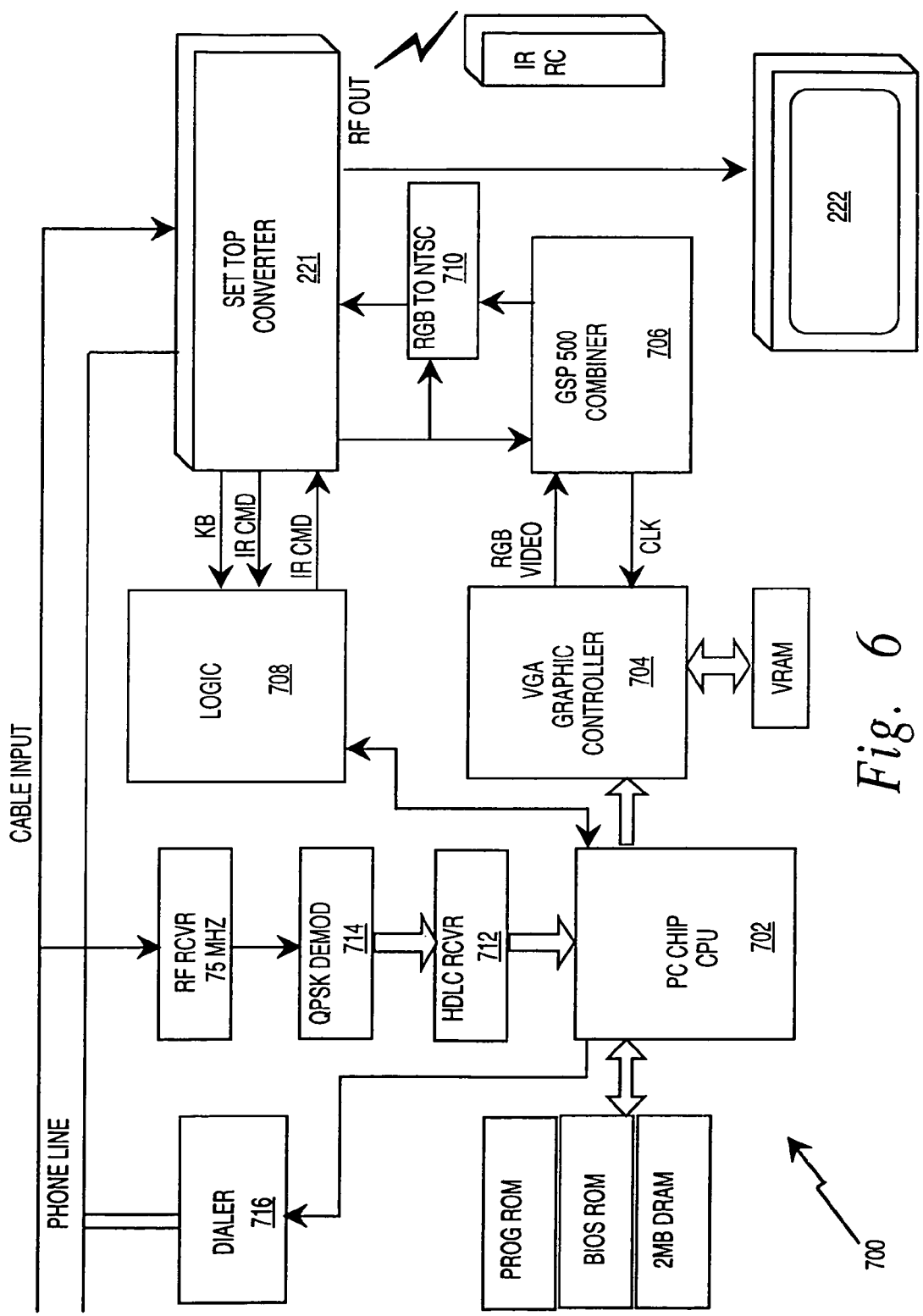
FIG. 6 is a schematic of a Turbo card upgrade for a set top terminal.

A Turbo Card addition to a set top converter is depicted in FIG. 6. The Turbo Card 700 shown provides the additional functionality needed to utilize the menu system with existing set top converter technology. The primary functions the Turbo Card 700 adds to the set top converter are the interpreting of program control information signals, generating of menus, sequencing of menus, and, ultimately, the ability of the viewer to select a channel through the menu system without entering any channel identifying information. The turbo card also provides a method for a remote location, such as the cable headend 208, to receive information on programs watched and control the operation of the set top converter and Turbo Card 700. The programs watched information and control commands may be passed from the cable headend 208 to the Turbo Card 700 using telephone lines.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. The Turbo Card 700 operates by receiving the program control information signal from the cable headend 208 through the coaxial cable. The logic circuitry 708 of the Turbo Card 700 receives data, infrared commands, and synchronization signals from the set top converter. Menu selections made by the viewer on the remote control 900 are received by the set top converter's IR equipment and passed through to the Turbo Card 700. The Turbo Card 700 interprets the IR signal and determines the program (or menu) the viewer has selected. The Turbo Card 700 modifies the IR command to send the program selection information to the set top converter 221. The modified IR command contains the channel information needed by the set top converter. Using the phone line and dialer 716, the Turbo Card 700 is able to transmit program access information to the cable headend 208.

Figure 7A:
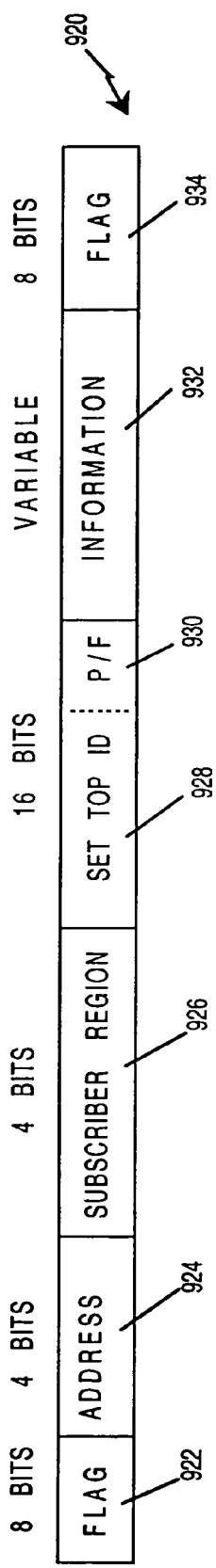
FIG. 7a is a drawing of a frame format for program control information signal.
Figure 7B:
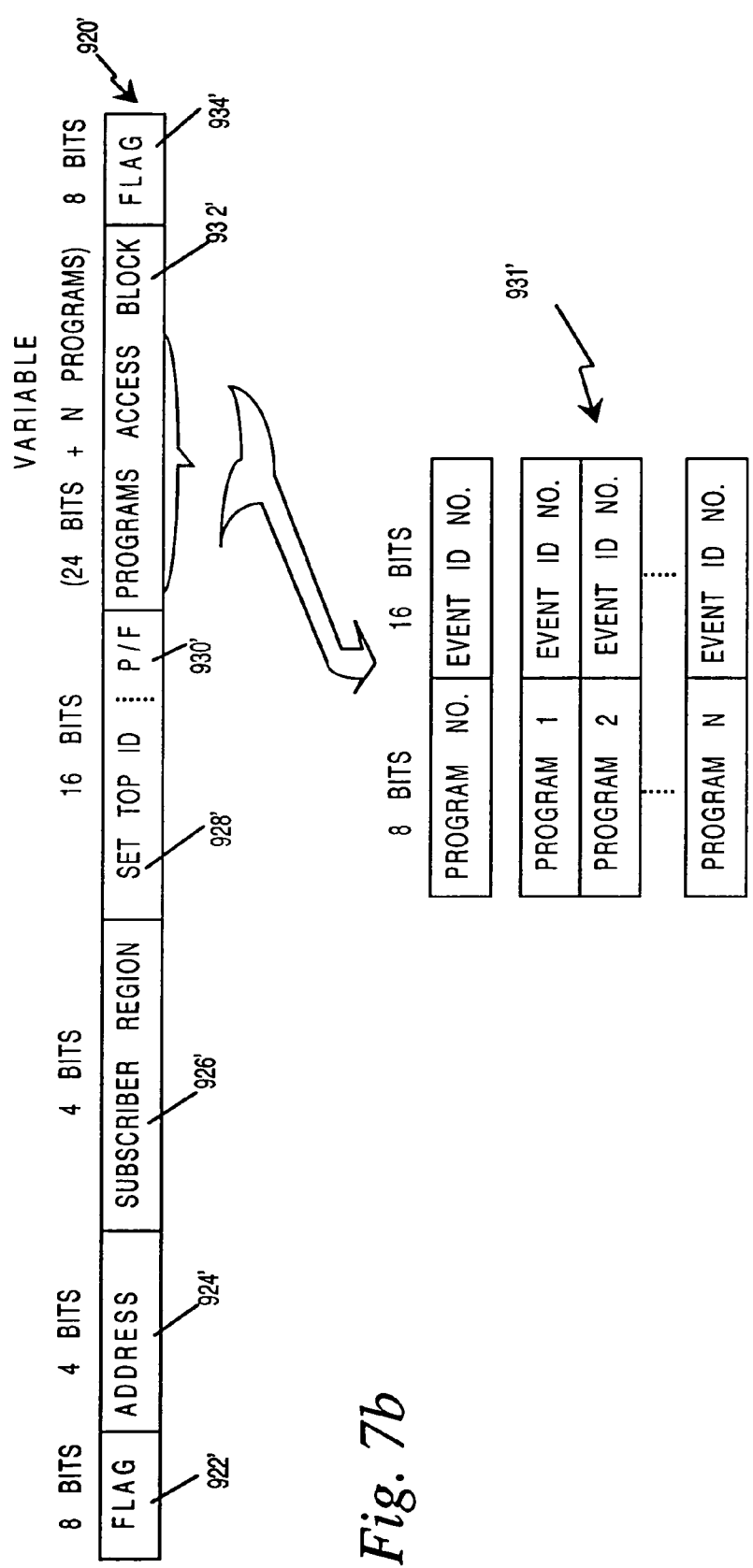
FIG. 7b is a drawing of a frame format for a polling response from the set top terminal.
Figure 7B:
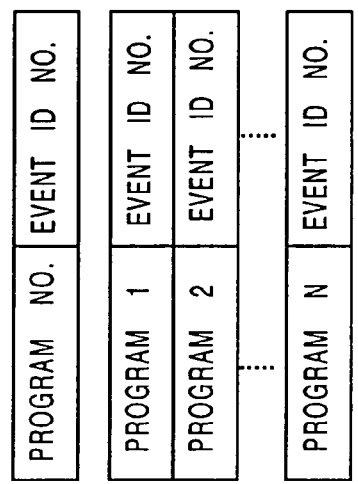

In the preferred embodiment, program access information, that is what programs the viewer watched, is stored at each set top terminal 220 until it is polled by the network controller 214 using a polling request message format as shown in FIG. 7a. This frame format 920 consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message. FIG. 7b shows a response frame format 920' (similar to the frame format 920 end, therefore, commonly numbered with the frame depicted in FIG. 7a, but with the prime indicator added for clarity) for information communicated by the set top terminal 220 to the network controller 214 in response to the polling request of FIG. 7a.

The eight-bit flag sequence 922 that appears at the beginning and end of a frame is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response from the set top terminal 220 addressed, as described below. The response frame format 920' also provides a variable-length information field 932' for other data transmissions, such as information on system updates. The frame format 920' ends with an 8-bit flag (or trailing flag) 934' that is identical in format to the leading flag 922', as set forth above. Other frame formats (e.g., MPEG) will be apparent to one skilled in the art and can be easily adapted for use with the system.

Figure 8:
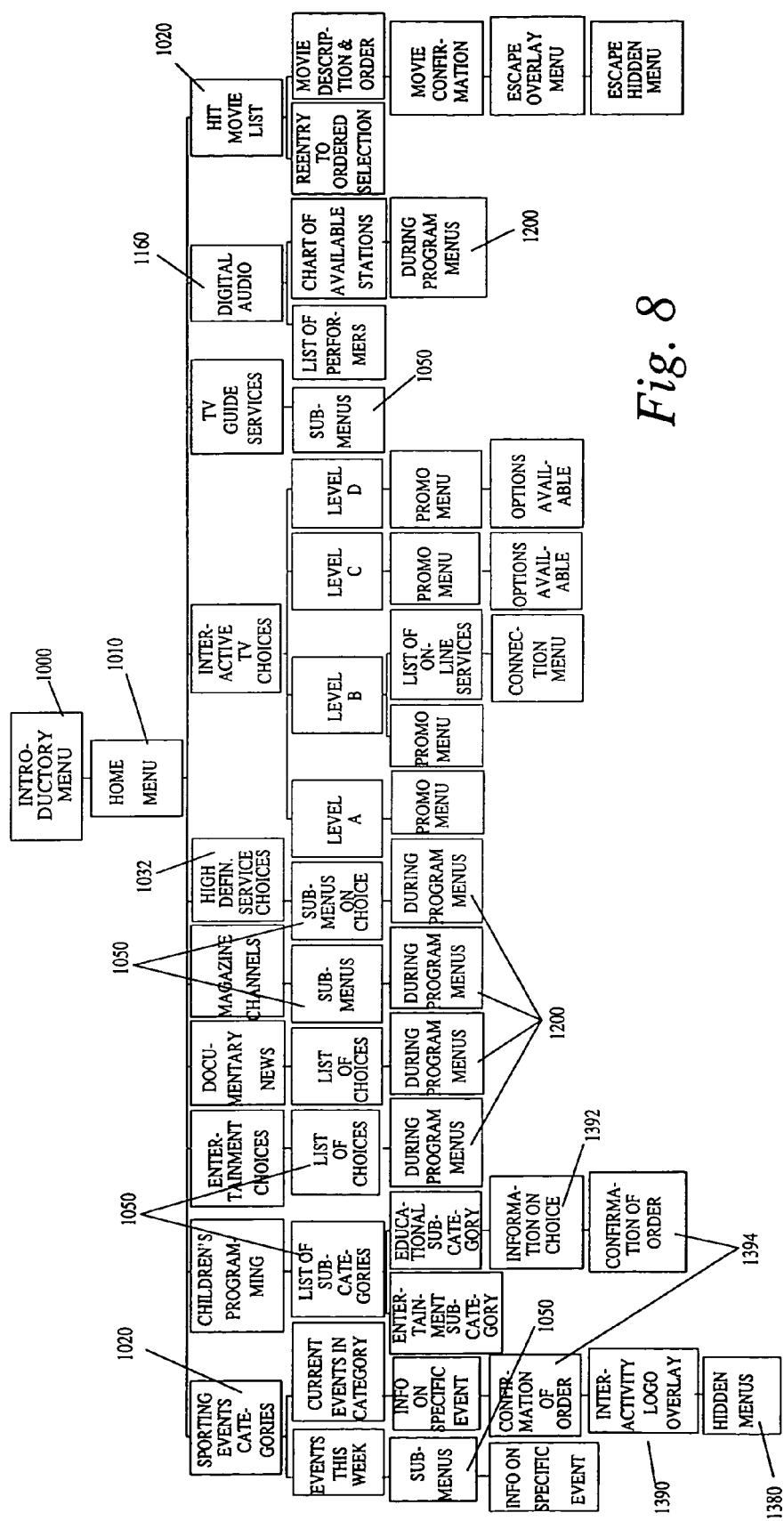
FIG. 8 is a drawing of the basic menus used in the present invention, including the ten major menus represented by icons.

As summarized above, images or programs may be selected for display by sequencing through a series of menus. FIG. 8 is an example of one possible structure for a series of menus. Generally, the sequence of menus is structured with an introductory menu, a home menu, various major menus and a multitude of submenus. The submenus can include promo menus and during program menus. For example, at the home menu portion of the sequence of menus and corresponding software routines, a subscriber may select one of the major menus and start a sequence of menu displays. Alternatively, a subscriber may go directly to a major menu by depressing a menu select button on remote control 900.

At any time during the menu sequence, the subscriber may depress a major menu button to move into another series of menus. In this way, a subscriber may move from major menu to major menu.

The various software subroutines executed by the microprocessor 602 allow a subscriber to sequence the menus, navigating through the various menus of the present invention. A subscriber may sequence back through menus or return to the home menu with a single touch of the home menu button on remote 900.

An introductory menu screen 1000 automatically appears upon power-up and initialization of the set top terminal 220. From this introductory menu screen 1000, the set top terminal software will normally advance the subscriber to the home menu screen 1010. The home menu 1010 is the basic menu that the subscriber will return to in order to make the first level of viewing decisions. When the set top terminal software is displaying the home menu 1010, the subscriber is able to access any television programming option. The software allows programming options to be entered through cursor movement on the screen and directly by button selection on the remote control 900.

In the normal progression through the menu screens, the software will forward the subscriber to a major menu screen 1020 in response to the subscriber's remote control 900 selection or highlighted cursor selection from the home menu screen 1010. The selections displayed on the home menu 1010 are for large categories of programming options.

Following the major menu 1020, the subscriber may navigate through one or more submenu screens 1050 from which the subscriber may choose one particular program for viewing. For most programming selections, the user will proceed from the home menu 1010 to a major menu 1020 and then to one or more submenus 1050. However, for certain programming options or functions of the set top terminal 220, the user may skip one or more menus in the sequence.

The During Program Menus 1200 are submenus enabled by the set top terminal software only after the subscriber has selected a television program. These menus provide the subscriber with additional functionality and/or additional information while viewing a selected program. The During Program Menus 1200 sequence can be further subdivided into at least two types of menus, Hidden Menus 1380 and Program Overlay Menus 1390.

To avoid disturbing a subscriber during viewing of a program, the Hidden Menus 1380 are not shown to the subscriber but instead "reside" at the set top terminal 220 microprocessor 602. The microprocessor 602 awaits a button entry either from the remote control 900 or set top terminal 220 buttons before executing or displaying any Hidden Menu 1380 options. The set top terminal software provides the subscriber with additional functions such as entering an interactive mode or escaping from a selected program through use of Hidden Menus 1380. Program Overlay Menus 1390 are similar to Hidden Menus 1380. However, the Program Overlay Menus 1390 are overlayed onto portions of the displayed video and not hidden. The software for the Program Overlay Menus 1390 allows the subscriber to continue to watch the selected television program with audio but places graphical information on a portion of the television screen. Most Program Overlay Menus 1390 are graphically generated to cover small portions of video. Some Overlays 1390 which are by their nature more important than the program being viewed will overlay onto greater portions of the video. Examples of types of overlay menus 1390 include Notification Menus 1392 and Confirmation Menus 1394. In the preferred embodiment, the software for the Program Overlay Menus 1390 controls the reduction or scales down the (entire) programs video and redirects the video to a portion of the screen.

Submenus provide the cost of viewing the program and the program's length in hours and minutes. From the submenus, the subscriber is given at least three options: (1) to purchase a program, (2) to return to the previous menu, and (3) to press "go" and return to regular TV. The subscriber may also be given other options such as previewing the program.

Using an on-screen menu approach to program selection, there is nearly an unlimited number of menus that can be shown to the subscriber. The memory capability of the set top terminal 220 and the quantity of information that is sent using the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment described.

The set top terminal 220 generates and creates menus using, in part, information stored in its graphics memory. A background graphics file 800 will store menu backgrounds and a logo graphics file will store any necessary logos. A menu display and cursor graphics file will store menu display blocks and cursor highlight overlays as well as any other miscellaneous files needed to build the menus. Using this method of storing menus, the menus can be changed by reprogramming the graphics memory of the set top terminal 220 through instructions from either the network controller 214 or operations center 202.

The microprocessor 602 performs the steps required to create a menu using stored information. The microprocessor 602 fetches a background file, logo file, menu display and cursor file in most instances. The microprocessor 602 fetches text from long-term, intermediate-term, or short-term storage depending on where the text is stored. Using a video combiner (or like device), the stored information is combined with video and the entire image is sent to the television screen for display.

In the preferred embodiment, a graphics controller is used to assist the set top terminal 220 in generating menus. Menu generation by the set top terminal 220 begins with the building of a major menu screen, which includes background graphics for that major menu. The background graphics may include an upper sash across the top of the screen and a lower sash across the bottom of the screen. The background graphics may be generated from the background graphics file 800 in the memory files of the graphics memory (preferably EEPROM). In addition, logo graphics may be generated. Such graphics typically include an icon window, a cable company logo, a channel company logo, and two "go" buttons.

Preferably, the text for each major menu is generated separately by a text generator in the set top terminal 220. Those portions of the text that generally remain the same for a period of weeks or months may be stored in EEPROM or other local storage. Text which changes on a regular basis, such as the movie titles (or other program selections), is transmitted to the set top terminal 220 by either the operations center 202 or the network controller 214 of the cable headend 208. In this manner, the cable headend 208 may change the program selections available on any major menu 1020 by modifying the program control information signal sent by the operations center 202 and transmitting any changes using the STTCIS.

Day, date and time information are added to each major menu. This information is sent from the operations center 202, the cable headend 208 (signal processor 209 or network controller 214), the uplink site, or generated by the set top terminal 220 internally.

The creation and display of program description submenus is performed by the set top terminal 220 in a manner similar to that described above. Each submenu may be created in parts and combined before being sent to the television screen. Preferably, background graphics and upper and lower sashes are used. Likewise, a video window and half-strip window can be generated from information in storage on the EEPROM.

In addition to graphics and text, some submenus include windows that show video. Such video may be still or moving pictures. Still pictures may be stored in a compressed format (such as JPEG) at the set top terminal 220. Video stills may be transmitted by the operations center 202 through the program control information signal from time to time.

Moving video picture is obtained directly from a current video feed as described above. Depending on video window size, this may require manipulation of the video signal, including scaling down the size of the video and redirecting the video to the portion of the menu screen which is within the video window of the menu. Alternatively, the video may be obtained from a split screen channel. Such a method involves the use of split screen video techniques to send multiple video clips on a single channel at a given time. The set top terminal 220 would scale the picture, if necessary, and redirect it to the correct position on the screen using known scaling and positioning techniques. Additional circuitry may be required in the set top terminal 220 to perform adequate scaling and repositioning.

To avoid the need for redirecting video into the portion of the screen which houses the video window, masking and menu graphics may be used to cover the portions of the channel video that are not needed. This masking technique allows the split screen video to remain in the same portion of the screen that it is transmitted by the operations center 202. The masking is then adjusted to cover the undesired through, for example, an upgrade module, expansion card or hardware upgrade of the present invention, on the other. This balance allows a designer or manufacturer of set top converters to choose between adding advanced functionality to an existing converter box or, instead, producing a converter with additional built-in features that increase cost and complexity of the converter or terminal.

TABLE A

|  | Existing Analog Set Top Converter | Set Top Converter With Digital Decompression Capability | Set Top Converter With Digital Decompression And Menu Generation Capability | Advanced Set Top Terminal |
|---|---|---|---|---|
| Decompression Capability | N/A | Built-In | Built-In | Built-In |
| Menu Generation Capability | Turbo Card | Upgrade Module or Menu Generation Card | Built-In | Built-In |
| Advanced Features | Level A-C Hardware Upgrades or Expansion Card | Level A-E Hardware Upgrades or Expansion Card | Level A-E Hardware Upgrades or Expansion Card | Built-In | portions of the screen. These masks are stored in the background graphics file similarly to other background files for menus.

The split screen video technique may also be used for promoting television programming. Since a great number of short video clips may be sent continuously, fill or partial screen promotionals (or informationals) may be provided to the subscriber. With this large quantity of promotional video, the subscriber is given the opportunity to "graze" through new movie or television programming selections. The subscriber simply grazes from promotional video to promotional video until the desired television program is discovered.

C. Detailed Description of Advanced Set Top Terminal

1. Overview

Figure 9A:
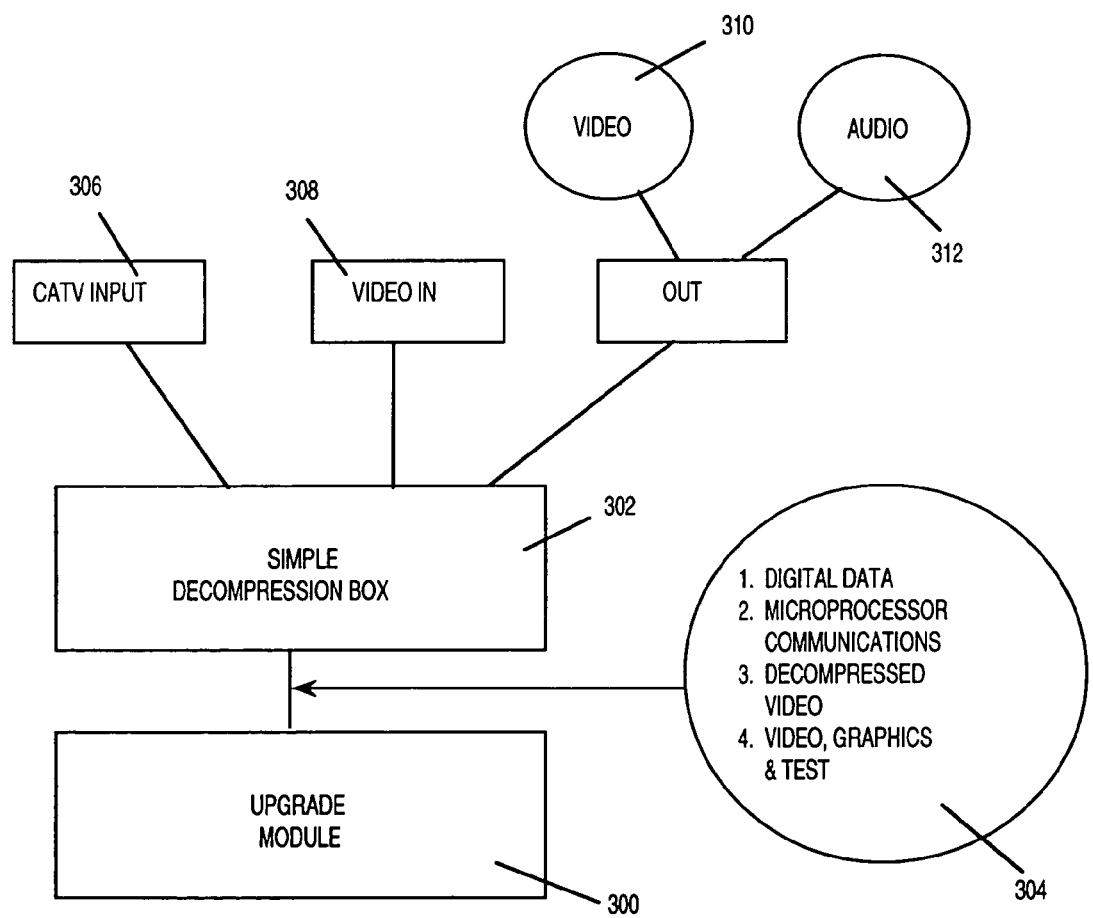
FIG. 9a is a schematic of a basic decompression box with upgrade module and associated connections.
Figure 9B:
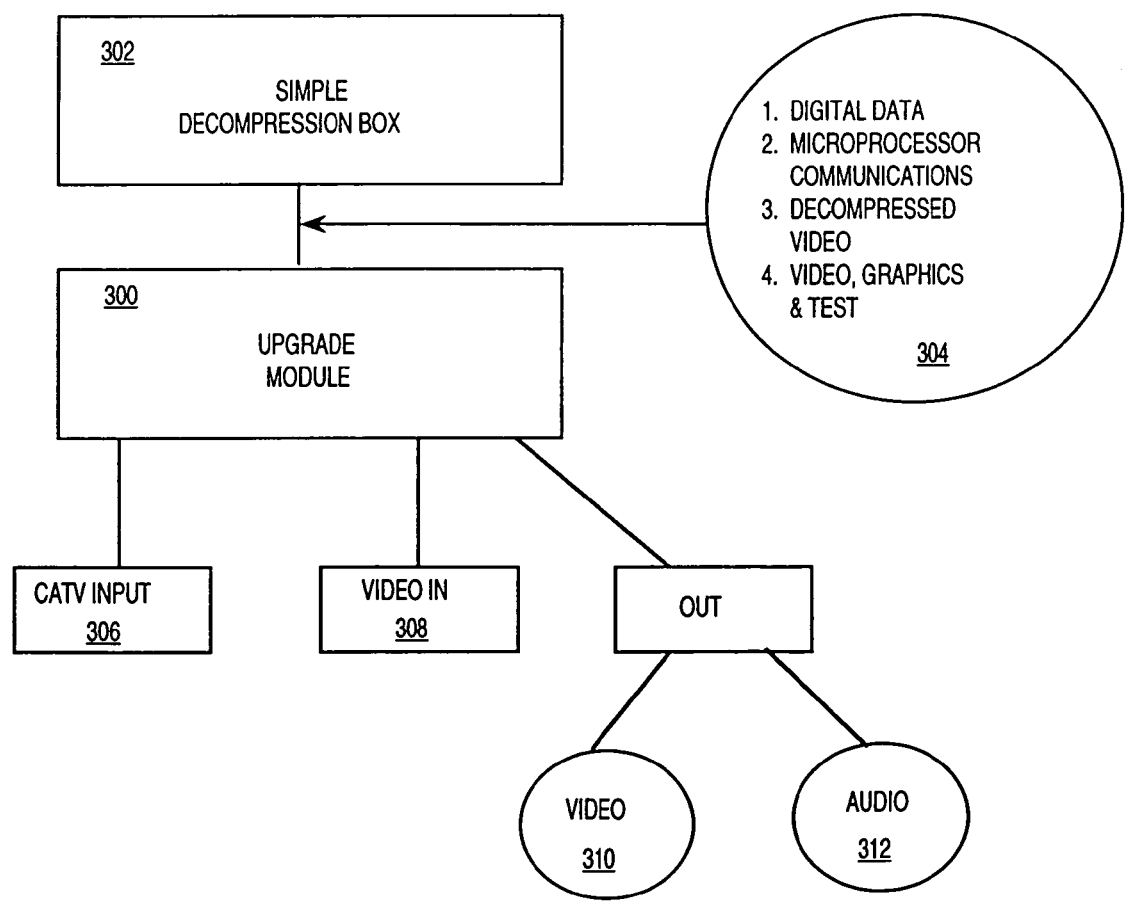
FIG. 9b is a schematic of an alternative embodiment of a simple decompression box with upgrade module and associated connections.

The present invention relates to advances in the set top terminal 220 described above. In particular, the present invention may be achieved through a set of hardware upgrades or additions to the following embodiments: (1) an existing set top converter (not shown) upgraded with a Turbo Card 700 or the like; (2) an industry standard digital decompression converter box (as shown in FIGS. 9a and 9b below) upgradeable by either an upgrade module or a menu generation card; or (3) a set top terminal 200 capable of both decompression and menu generation. The set of hardware upgrades described below can be used to provide additional advanced features and functional capabilities to any of these embodiments.

Table A shows several exemplary hardware configurations that may be used to achieve the goals of the present invention. In particular, Table A shows four columns of set top converter technology, which may be modified to produce the various set top capabilities shown in the three rows of the table.

The table shows the various inherent functional capabilities of each set top converter, and how each may be modified or upgraded, if necessary, to achieve the objectives of the present invention. From left to right, the columns of the table span the various alternatives for balancing those capabilities that may be built into set top converters or terminals, on the one hand, and those capabilities that can be provided The first column of Table A shows how an existing analog set top converter can be modified to provide menu generation capability through the use of the Turbo Card. In addition to the Turbo Card, such an existing analog set top converter may be further modified to provide any of the advanced features described below through the use of the Level A, Level B and Level C hardware upgrades or an expansion card. Such existing set top converter boxes are currently manufactured by Scientific Atlanta and General Instruments, among others. These converter boxes have been designed for use with analog waveforms and, as a result, digital decompression capabilities are not applicable.

The second column of Table A shows a set top converter with digital decompression capability. This converter is a simple decompression box which may eventually become the industry standard. The simple decompression boxes may be modified to provide the enhanced functionality of the present invention. For example, a simple decompression box may be modified to produce menu generation capability through the use of an upgrade module or menu generation card. In addition, other advanced features may be added to a simple decompression box through modifications that include any of the Level A through E hardware upgrades or an expansion card. Each of these modifications are described below.

The third column of Table A shows a set top converter that has built-in digital decompression and menu generation capabilities. Thus, in order to achieve the enhanced functionality of the present invention, other advanced features may be provided through hardware modification. Such modification may be accomplished through the use of any of the Level A through E hardware upgrades or the expansion card, as explained below.

The fourth column of Table A shows an advanced set top terminal having decompression, menu generation, and advanced functional capabilities. Each of these capabilities are built into the terminal itself In this way, achieving the enhanced performance of the set top terminal in accordance with the present invention would require no hardware modification.

In the preferred embodiment, the advanced set top terminal 220 of the present invention has the capability, among other things, of receiving tiered programming from the network controller. Tiered programming allows different users to view different video even though the subscribers are "tuned" to the same channel. For example, the network controller 214 may know the demographics of its subscribers through a database, by "learning" from prior subscriber choices, from an interactive selection, or from other means. Using the demographics information, the network controller 214 may target commercials to the correct audience by showing different commercials to subscribers with different demographics. Even though subscribers will believe they are "tuned" to one channel, each subscriber will be switched to a different channel for the tiered video. Alternatively, subscribers may be offered an option of several commercials from which to choose.

To accommodate foreign speaking subscribers, multiple audio channels for television programming may be provided. In this way, the subscriber may be shown menus of programs available in the subscriber's native language. The function of choosing the correct audio to correspond to the selected language may be handled by either the set top terminal 220 or the network controller 214 depending upon the configuration. Local programming in several languages or additional audio channels for a foreign language translation of a popular television program may be provided by the network controller 214. Using a picture-on-picture feature, sign language may be similarly made available to certain set top terminals 220 for the deaf. Also, a text overlay may easily be produced on the lower part of the screen for the deaf.

Typically, each video signal is received at the set top terminal 220 along with four audio channels. Two of these audio channels will preferably be used for left and right stereo audio reception of the video signal being displayed. The remaining two audio signals may be used for alternative languages. For example, where a video signal is received by the set top terminal 220, two of the audio channels will provide the stereo audio signals for that video in English, with the other two audio channels providing mono audio signals in French and Spanish. In this way, each video signal received at the set top terminal 220 can accommodate at least two foreign languages. Where stereo audio channels are not desired, the audio channels in English can be set to a single signal, providing mono audio reception, and increasing the multiple language audio channel capability to three foreign languages.

In other embodiments, the network controller 214 can act as a central computer and provide intra-set top terminal interactive games, inter-set top terminal interactive games, computer bulletin board type services, message services (Electronic mail) etc. For example, a subscriber may play war games with five (anonymous) fellow subscribers each in their own home each operating a separate tank. The network controller 214 gathers the players via set top terminal 220 communications and acts as the referee. A bulletin board or message system can be set up to discuss a particular program such as "Twin Peaks Whodunit" for enthusiasts. These interactive features are further described below with the interactive services level B menu and the set top terminal hardware upgrade level B interactive unit.

In order to achieve the required throughput of video and audio information for the system, digital compression techniques for video are employed. As a result, the set top terminal 220 typically must decompress any digitally compressed program signals that it receives. Methods of decompression are a function of the compression technique used in the program delivery system.

There are three basic digital compression techniques: within-frame (intraframe), frame-to-frame (interframe), and within-carrier compression. Various compression methods may be used with these techniques. Such methods of compression, which include vector quantization and discrete cosine transform methodologies, are known to those skilled in the art.

Several standard digital formats representing both digitizing standards and compression standards have also been developed. For example, JPEG (joint photographic experts group) is a standard for single picture digitization. Motion picture digitization may be represented by standards such as MPEG or MPEG 2 (motion picture engineering group specification). In addition to these standards, other proprietary standards have been developed. Although MPEG and MPEG 2 for motion pictures are preferred in the present invention, any reliable digital format with compression may be used.

Various hybrids of the above compression techniques and methods have been developed by several companies including AT&T, Compression Labs, Inc., General Instruments, Scientific-Atlanta, Philips, and Zenith. Any of the compression techniques developed by these companies, as well as other techniques known to those skilled in the art, may be used with the present invention.

2. Advanced Set Top Terminal Major Components and Upgrades a. Decompression Box with Upgrade Module The preferred program delivery system uses digitally compressed signals and, as a result, the preferred subscriber equipment configuration must be capable of decompressing and processing such digitally compressed signals. FIG. 9a diagrams the basic interplay between an upgrade module 700 and a simple decompression box 302. The upgrade module 300 can be connected to the decompression box 302 through a port similar to the upgrade port 662 described above (FIG. 5b). The simple decompression box 302 shown is preferably a future industry standard decompression box capable of communicating with an upgrade module 300 to enhance functionality.

The upgrade module 300 provides menu generation capability to the simple decompression box 302. The microprocessor of the simple decompression box 302 communicates with the microprocessor in the upgrade module 300 to provide the full functionality of a set top terminal 220.

In the preferred embodiment, multipin connections may be used for a multiwire cable connecting the simple decompression box 302 with the upgrade module 300. The multipin connection may range from DB9 to DB25. A SCSI, or small computer systems interface, port (not shown) may also be provided. Alternatively, four or more ports may be provided instead of the single port depicted. If a port is not provided, the upgrade module may, alternatively, be hardwired to the simple decompression box 302.

As represented generally at 304, the digital data set of output wires of the simple decompression box 302 will preferably output error corrected and decrypted data to the upgrade module 300. The second set of wires, providing the interface connection, allows the microprocessor in the upgrade module 300 to communicate with the microprocessor of the simple decompression box 302. In this manner, the video circuitry of the upgrade module 300 and the simple decompression box 302 may maintain synchronization. The third set of wires, providing the decompressed video output, provide the upgrade module 300 with a decompressed video signal to manipulate. The fourth set of wires, comprising the video input set, allows the simple decompression box 302 to accept a video signal that is a combined text, graphics, and video signal.

FIG. 9a further shows the CATV input 306, video input 308, and video and audio outputs 310,312, as part of the simple decompression box 302. This embodiment reduces the component cost of upgrade module 300, and thus, is preferred. The upgrade module 300 may simply be a cartridge (not shown) insertable into the simple decompression box 302. Alternatively, as shown in commonly numbered FIG. 9b, the CATV input 306, video input 308 and video and audio outputs 310, 312 may be included as part of the upgrade module 300. In this embodiment, the simple decompression box 302 is primarily used for decompressing the video.

Figure 10:
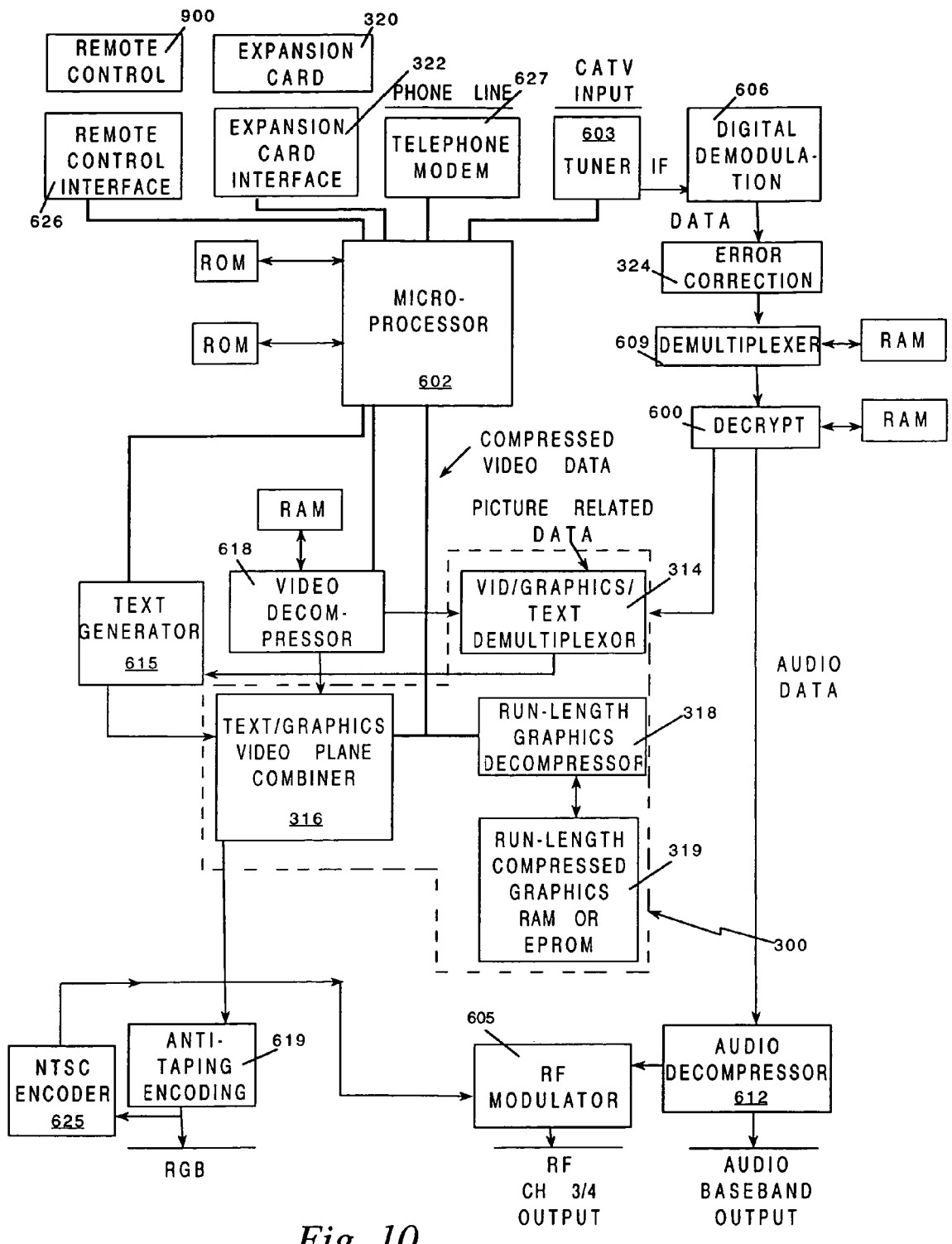
FIG. 10 is a more detailed block diagram of the components of a simple decompression box with upgrade module.

Referring to FIG. 10, the upgrade module 300 preferably includes the following circuitry: a video graphics and text demultiplexer 314; a text and graphics video plane combiner 316; a run length graphics decompressor 318; and, a run length compressed graphics memory 320 (nonvolatile RAM, ROM, EPROM, or EEPROM). By means of communications through the multiwire connection between the upgrade module 300 and the simple decompression box 302, compressed video and control signals may be demultiplexed by the demultiplexer 314 within the upgrade module 300. The run length graphics decompressor 318, through communications with the run length compressed graphics RAM 320, permits decompression of the input compressed video signal. The text and graphics video plane combiner 316 allows demultiplexed and decompressed signals to be output, through the simple decompression box 302, to a subscriber's television 222 showing both video and overlay menus with text.

FIG. 10 shows the elements of a simple decompression box 302 (numbered commonly with the elements of the set top terminal 220 depicted in FIG. 4) with the upgrade module 300 described above. Generated menus and video are combined in the combiner 316 and output to an antitaping encoder 619. Any method of antitaping encoding known by those skilled in the art may be used with the present invention.

FIG. 10 also depicts an expansion card 320 and an expansion card interface 320 for receiving the card 320. In addition, error correction circuitry 324 is shown receiving the demodulated signal, prior to demultiplexing the signal.

The enhanced functionality of the upgrade module 300 may alternatively be included on the expansion card 320. In this embodiment, the upgrade module 300 becomes an internal component of the simple decompression box 302 and internally upgrades the box 302 to include menu generation capability without using an external hardware upgrade module 300. Other variations in the upgrade module 300 configuration are also possible.

b. Upstream Data Transmission Hardware

Figure 11:
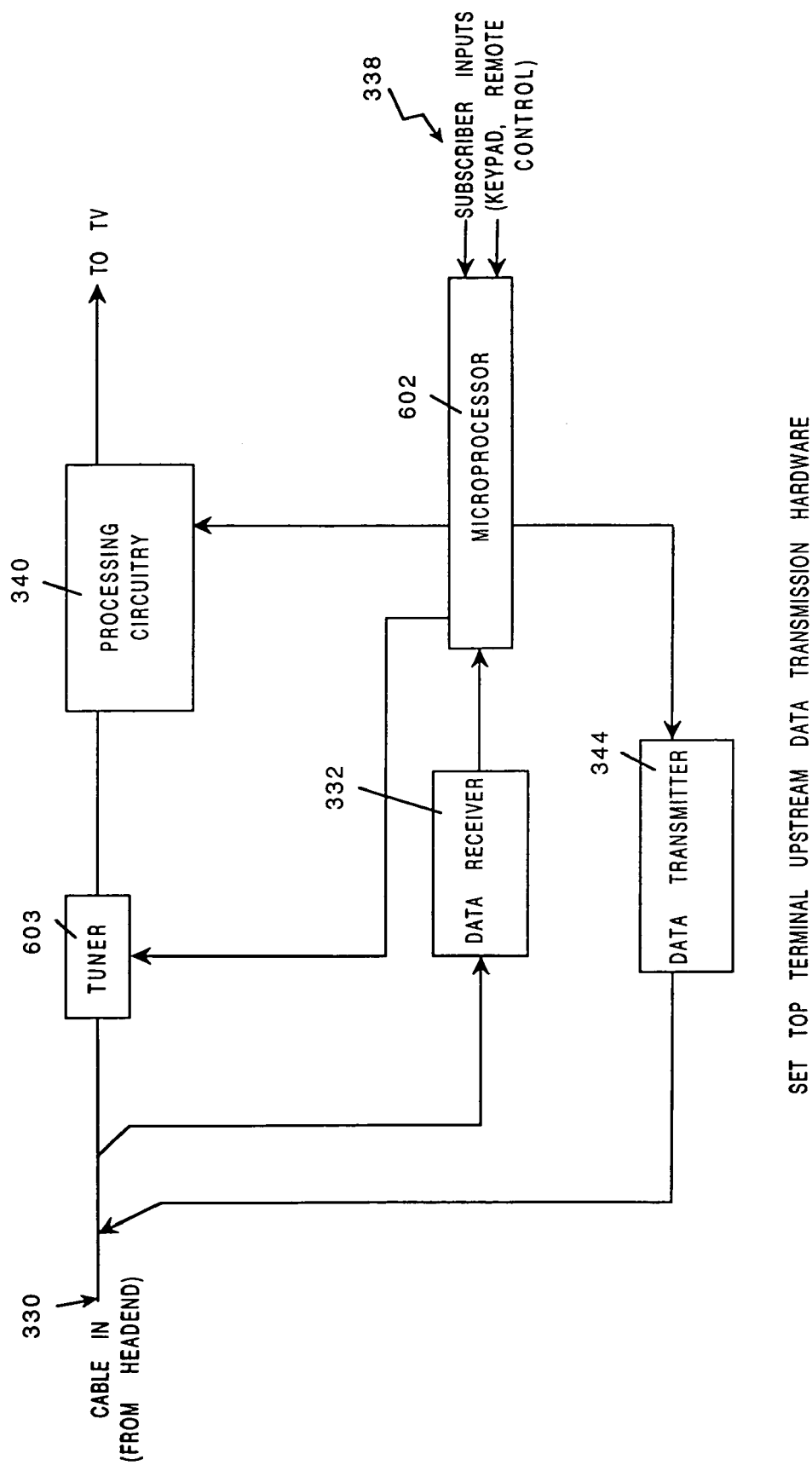
FIG. 11 is a schematic of the set top terminal's upstream data transmission hardware.

FIG. 11 shows a preferred set top terminal 220 that includes a data receiver 332 and a data transmitter 344. The data transmitter 344 provides upstream data communications capability between the set top terminal 220 and the cable headend 208. Upstream data transmissions are accomplished using the polling system described with reference to FIGS. 7a and 7b above, and, in particular, using a data transmitter 344. Both receiver 332 and transmitter 344 may be built into the set top terminal 220 itself or added through an upgrade module 300. Regardless of the specific hardware configuration, the set top terminal's data transmission capabilities may be accomplished using the hardware shown in FIG. 11.

FIG. 11 shows RF signals, depicted at 330, being received at by a data receiver 332 and tuner 603 working in unison. Both of these devices are interfaced with the microprocessor 602, which receives inputs, depicted at 338, from the subscriber, either through the set top terminal's keypad 645 or remote control unit 900. All cable signals intended for reception on the subscriber's TV are accessed by the tuner 603 and subsequently processed by the processing circuitry 340. This processing circuitry 340 typically includes additional components for descrambling, demodulation, volume control and remodulation on a Channel 3 or 4 TV carrier.

Data targeted to individual set top terminals 220 is received by the data receiver 332 according to each set top terminal's specific address or ID (e.g. set top ID 928,928'). In this way, each addressable set top terminal 220 only receives its own data. The data receiver 332 may receive set top terminal specific data in the information field of the program control information signal frame described with reference to FIG. 7a or on a separate data carrier located at a convenient frequency in the incoming spectrum.

Any received data includes information regarding channels and programs available for selection. The subscriber may enter a series of commands using the keypad 645 or remote control 900 in order to choose a channel or program. Upon receipt of such commands, the set top terminal's microprocessor 602 instructs the tuner 603 to tune to the proper frequency of the channel or program desired and subsequently instructs the processing circuitry 340 to begin descrambling of this channel or program.

Upon selection of a channel or program, the microprocessor 602 stores any selection information in local memory for later data transmission back to the cable headend 208. Typically, the data transmitter 344 operates in the return frequency band between 5 and 30 MHZ. In an alternative embodiment, the frequency band of 10 to 15 MHZ may be used. Regardless, however, of the frequency band used, the data transmitter 344 sends information to the cable headend 208 or network controller 214 in the information field of the frame described with reference to FIG. 7b. Those skilled in the art will recognize that a number of variations and combinations of the above-described set top terminal 220 hardware components may be used to accomplish upstream data transmissions.

c. Hardware Upgrades

In order to enhance a set top terminal's 220 functionality, the following hardware upgrades may be used: (1) a Level A interactive unit, (2) a Level B interactive unit, (3) a Level C interactive unit with compact disc capability, (4) a Level D digital radio tuner for separate room use, and (5) a Level E information download unit. Each of these upgrades is connected to the set top terminal 220 unit through the upgrade port 662 described earlier.

Figure 12A:
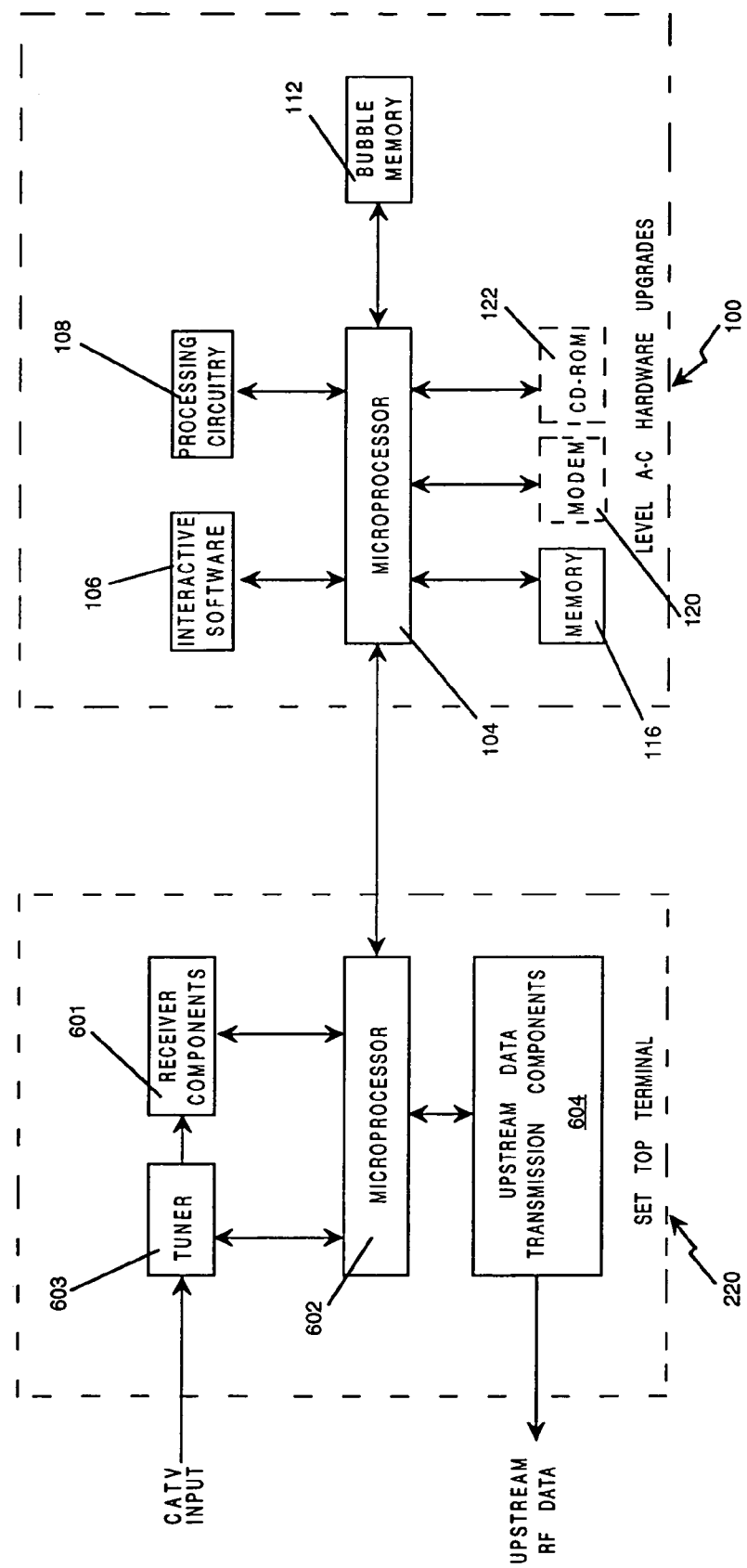
FIG. 12a is a schematic showing the components of the Level A, B, and C hardware upgrades.

Level A, B and C hardware upgrades have similar hardware components. FIG. 12a diagrams the basic components of the Level A, B and C hardware upgrades, indicated generally at 100. The figure diagrams the interaction between the hardware upgrades 100 and the set top terminal's 220 basic components. As seen in the figure, CATV input signals are received by the set top terminal 220 using a tuner 603 and various receiver components described above (but denoted generally at 601 in FIGS. 12a and 12b).

The set top terminal's microprocessor coordinates all CATV signal reception and also interacts with various upstream data transmission components 604, which have been described above.

The Level A, B and C hardware upgrades 100 each include a microprocessor 104, interactive software 106, processing circuitry 108, bubble memory 112, and a long-term memory device 116. In addition to these basic components, the Level B hardware upgrade makes use of an additional telephone modem 120, while the Level C hardware upgrade makes use of an additional CD-ROM storage device 122.

Along with their basic components, the Level A, B and C hardware upgrades 100 each use their own interactive software 106. This software may be used to provide the enhanced functional capabilities described below. The Level A, B and C hardware upgrades also make use of processing circuitry 108, which allows the set top terminal 220 to pass the subscriber's interactive input to the Level A, B and C hardware upgrades 100 for interpretation. These commands are passed through the interface linking the set top terminal's microprocessor with the microprocessor of the Level A, B and C hardware upgrades 100. In this way, subscriber inputs, entered through the set top terminal keypad or remote control, can be transferred to any of the hardware upgrades for processing and responses generated therein can then be sent back to the set top terminal 220 for display. In the preferred embodiment the IR commands are transferred from set top terminal to hardware upgrade.

The Level A, B and C hardware upgrades 100 also include a long-term memory component or device 116 that allows each hardware upgrade to internally store data used with each interactive service. Such data may include, for example, customized menu templates used by the individual interactive services. In addition, the Level A, B and C hardware upgrades include a bubble memory 112 for the temporary storage of, for example, interactive questions and responses used in each particular interactive service.

The Level A interactive unit allows the subscriber to access interactive services offering additional information about programs such as quizzes, geographical facts, etc. This information may be received by the set top terminal 220 in several data formats, including using the vertical blanking interval (VBI) or the program control information signal. The Level A interactive unit enables the subscriber to engage in textual interactivity with the current television program using overlay menus. Some examples are quizzes, fast facts, more info, where in the world, products, etc, all of which provide the subscriber with an interactive question and answer capability. Although the Level A interactive capability can easily be built into the set top terminal 220, such an embodiment increases the cost of the basic set top terminal 220.

The Level B interactive unit provides the user with access to online data base services for applications such as home shopping, airline reservations, news, financial services, classified advertising, home banking, and interactive teletext services. For example, with this upgrade, a user will be able to reserve plane tickets or buy consumer electronics. The primary feature of this upgrade unit is that it allows actual transactions using two-way communications over modem with outside services. This added two-way communications capability may be with the cable headend 208 or, alternatively, over cellular networks, PCN or other communications media.

The Level C interactive unit employs a high volume local storage capacity, including compact disc or other random access digital data formats (e.g., CD-ROM 122). This unit allows use of interactive multi-media applications. Such applications include, for example, computer games, multi-media educational software, encyclopedias, other reference volumes (e.g. Shakespeare library), etc. In the preferred embodiment, many of these applications will interact with live programming providing additional information and interactivity to the basic program feed. For example, a viewer watching a show set in a foreign country may be able to retrieve additional information, maps, economic data, as well as other information about that country that are stored on the compact disc. In the Level C applications, the upgrade hardware may closely monitor the television broadcast through additional data channels (e.g., vertical blanking interval, or other digital data encoded within live video) providing context sensitive interactivity.

Figure 12B:
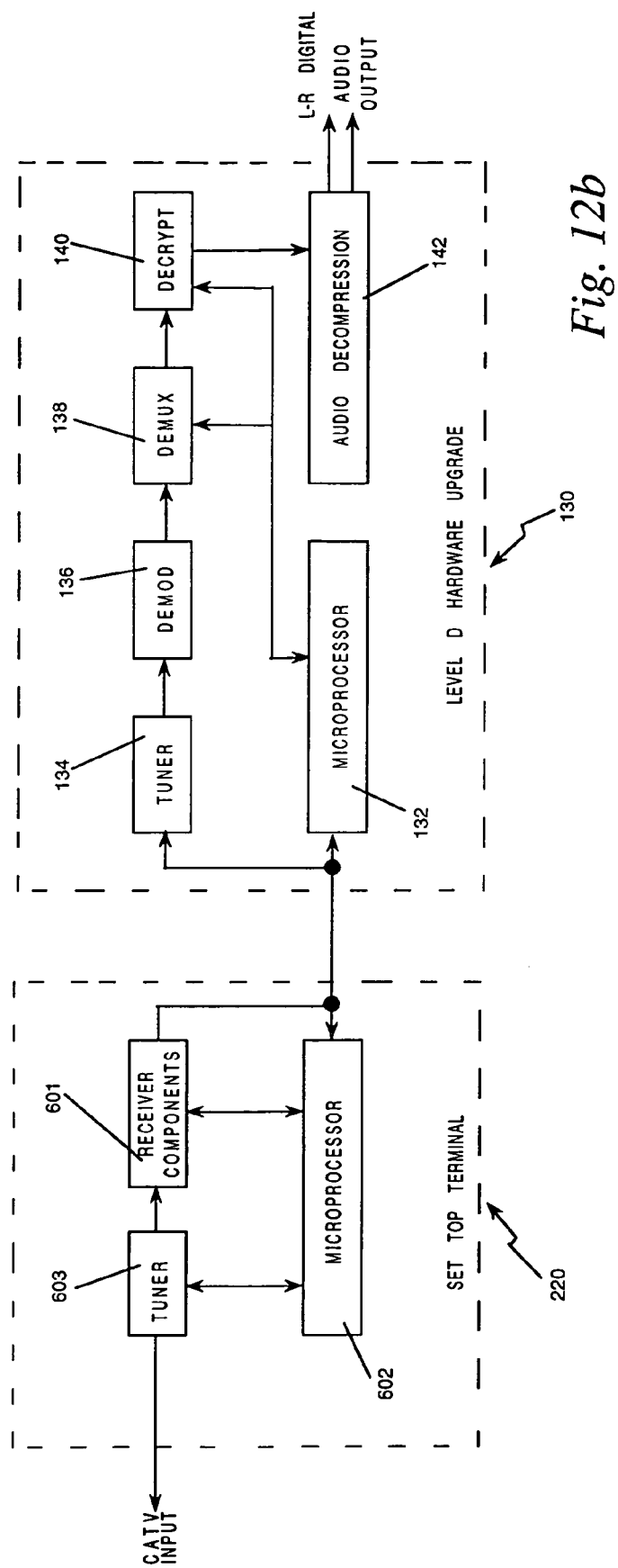
FIG. 12b is a schematic showing the components of the Level D hardware upgrade.

FIG. 12*b* diagrams the interaction between the set top terminal 220 and the Level D hardware upgrade, indicated generally at 130. As shown in the figure, the CATV signals are input to the set top terminal 220 through its tuner 603 and receiver components 601. As described above, the microprocessor 602 coordinates all cable television signal reception by the set top terminal 220. The Level D hardware upgrade 130 makes use of a microprocessor 132, a tuner 134, a demodulator 136, a demultiplexer 138, a decryptor 140 and an audio decompressor 142.

As shown in the figure, the set top terminal 220 and the Level D hardware upgrade 130 interact through the interface linking the respective devices. The set top terminal's microprocessor 602 instructs received signals to be transferred to the Level D hardware upgrade 130 for further processing. These received signals are input to the Level D hardware upgrade, passed through the signal path comprising the tuner 134 and other digital audio reception components (i.e., demodulator 136, demultiplexer 138, decryptor 140 and audio decompressor 142). Through the use of the hardware as configured in FIG. 12*b*, the subscriber can select a digital audio program for listening. The subscriber can accomplish such selection through a subscriber interface (not shown), which may exist at the set top terminal 220 or, alternatively, at the Level D hardware upgrade.

The Level D hardware upgrade allows the subscriber separate access to the digital radio channels while other programming (not necessarily radio) is being viewed on the television. Typically, this upgrade would be used for digital radio usage in a separate room from that of the television. The upgrade has a separate tuner, decompressor, and visual display. In the preferred embodiment a second remote control (which is preferably a scaled-down version of the set top terminal remote control, described below) is provided to access the digital audio system. This remote is equipped with a display.

The Level E hardware upgrade allows the subscriber to download large volumes of information from the operations center 202 or cable headend 208. The Level E hardware upgrade will enable subscribers to download data, such as books and magazines, to local storage. Primarily, the Level E hardware upgrade is an additional local storage unit (e.g., hard disk, floppy, optical disk or magnetic cartridge). Preferably, a small portable reader, called "EveryBook™", is also provided with the upgrade to enable downloaded text to be read without the use of a TV. The portable reader is equipped with a screen.

The downloadable information may be text or video supplied by the operations center 202 or cable headend 208. With this upgrade, books may be downloaded and read anywhere with the portable reader. Using this upgrade, video may be downloaded and stored in compressed form for later decompression. The video would be decompressed only at the time of viewing. Important text that the public desires immediate access may made available through this system. Text such as the President's speech, a new law, or a recent abortion decision rendered by the Supreme Court may be made immediately available.

Using a more sophisticated port, such as the SCSI port, multiple hardware upgrade units may be connected, or "daisy-chained" together, to operate simultaneously. Although these upgrade units are described separately, the units may be combined or built into the set top terminal 220. Those skilled in the art will recognize variations on such combinations of and additions to the set top terminal hardware.

d. Expansion Card Slot

In order to provide the greatest flexibility possible and prevent a set top terminal 220 from becoming outdated during the terminal's useful life, additional electronic expansion card slots have been built into the preferred embodiment. The expansion slots 665 (depicted in phantom in FIG. 5b) are covered by the metal plate cover 664 as shown in FIG. 5b. It is anticipated that additional memory or capabilities may be needed for certain customer features and also to update the system as the cable delivery system's capabilities increase.

In addition to providing an additional memory capability, the expansion card slot provides an easy method to upgrade the set top terminal hardware. In particular, expansion cards can be used to internally provide any of the Level A through E hardware upgrade features described above. Such embodiments, however, use the upstream data transmission hardware, also described above (or built-in modem).

Functionally, the expansion card (not shown) may be inserted into an expansion card slot 665, causing the connector on the expansion card to electrically link with a connector on the set top terminal 220. Preferably, the frame of the set top terminal has a shelf or rack position to hold the expansion card. The connector on the set top terminal 220 may simply be an electrical connection to the set top terminal's microprocessor and/or memory device or devices. Alternatively, the interface between the expansion card and the set top terminal 220 may be an electrical bus that allows the memory resources of the set top terminal 220 to be directly expanded. In this case, the expansion card itself contains a memory device or devices that expand the amount of program information or data that the set top terminal 220 may access. Such memory devices include RAM, ROM, EPROM or EEPROM. In addition, the interface may be a "mailbox," which resides in the set top terminal 220 as a single memory location. This embodiment facilitates the transfer of data between the set top terminal 220 and the expansion card in either serial or parallel format. Such transfers are coordinated and controlled by the set top terminal's microprocessor 602.

The use of expansion cards lowers the cost of the set top terminal 220 itself, while also increasing its potential functionality. Thus, an expansion card may include enhanced functional capabilities described as part of the upgrade module discussion above and be designed to accommodate any hardware upgrade compatible with the set top terminal 220.

3. Remote Control and Subscriber Access of Set Top Terminal

Figure 13A:
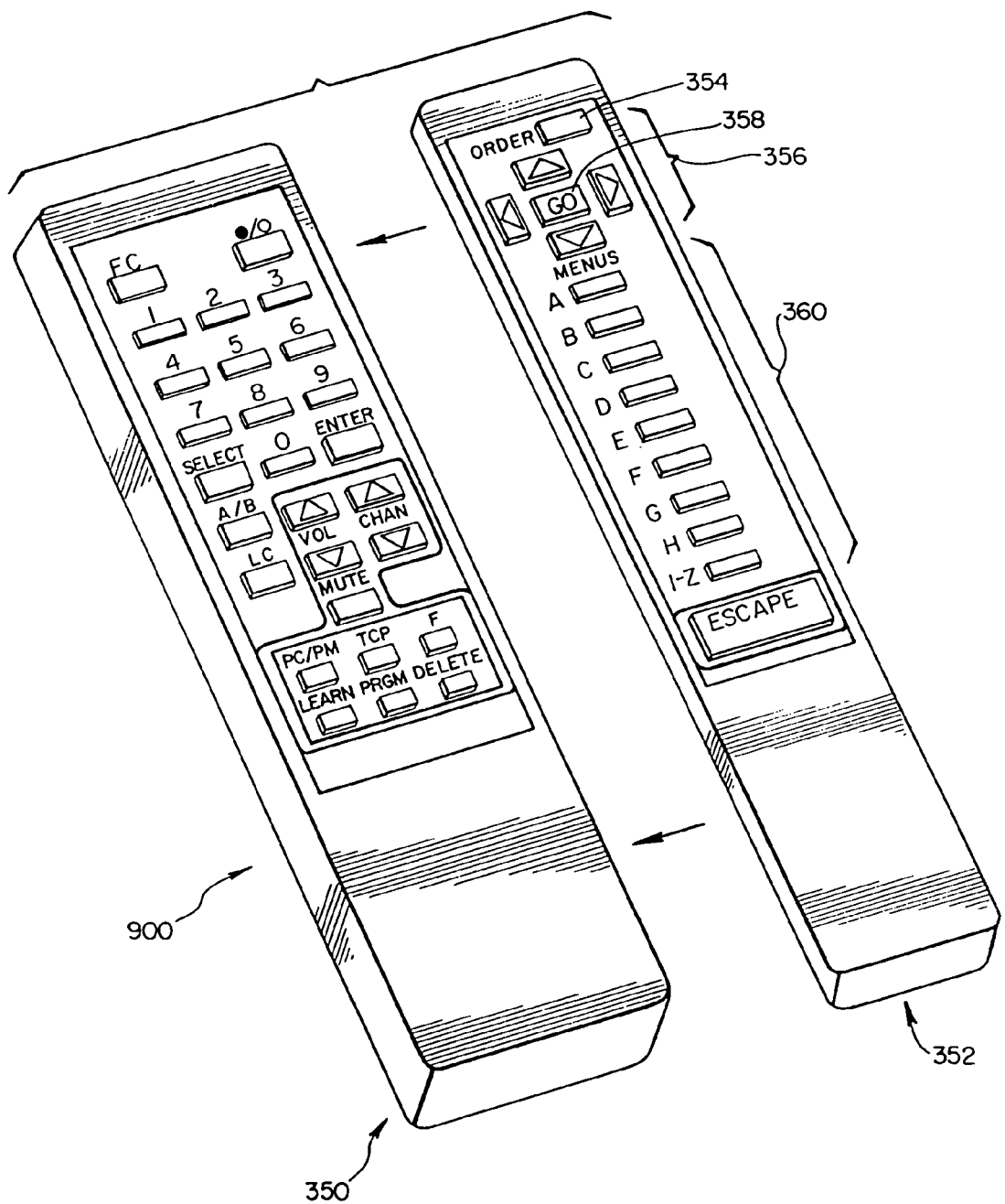
FIG. 13a is a schematic showing the two parts of a remote control unit.

The subscriber can access programs televised by the system through the set top terminal 220 using a remote control 900. FIG. 13a shows a two-section remote control 900 that accommodates such access. To reduce costs and make the set top terminal 220 as user friendly as possible, a standard television remote control 350, such as a Jerrold RC 650 remote control or the like, may be augmented by adding a new section 352 that provides the additional digital menu access and ordering functions. FIG. 13a depicts the addition of menu access and cursor movement control to the remote control 900.

The remote control 900 has an ordering button 354 and four-way cursor movement 356 that includes a "go" button 358 and menu access buttons 360. The preferred remote control 900 operates using infrared (IR) signals, with the signals being received by the infrared (IR) sensor 630 on the front of the set top terminal 220.

In the simplest embodiment, the remote 900, may be built with only cursor movement and a go button. In more sophisticated embodiments, the remote control 900 may be provided with buttons that are programmable to perform specific functions for a series of entries. An intelligent or smart remote control 900 would increase both the cost and capability of the set top terminal 220 system. Using the augmented remote control 900 depicted in FIG. 13a, a subscriber can navigate the program menu system of the set top terminal 220.

Figure 13B:
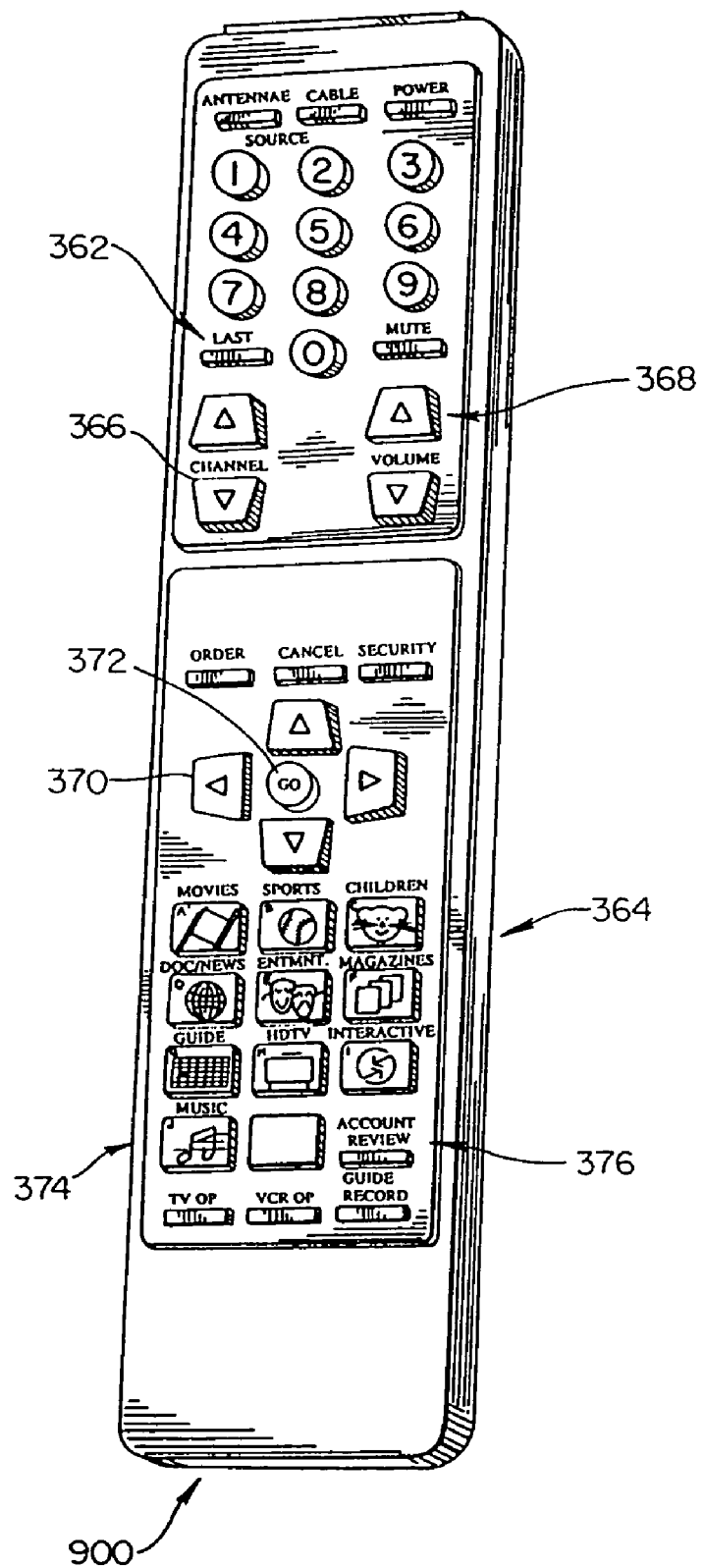
FIG. 13b is a drawing of the preferred remote control unit.
Figure 14:
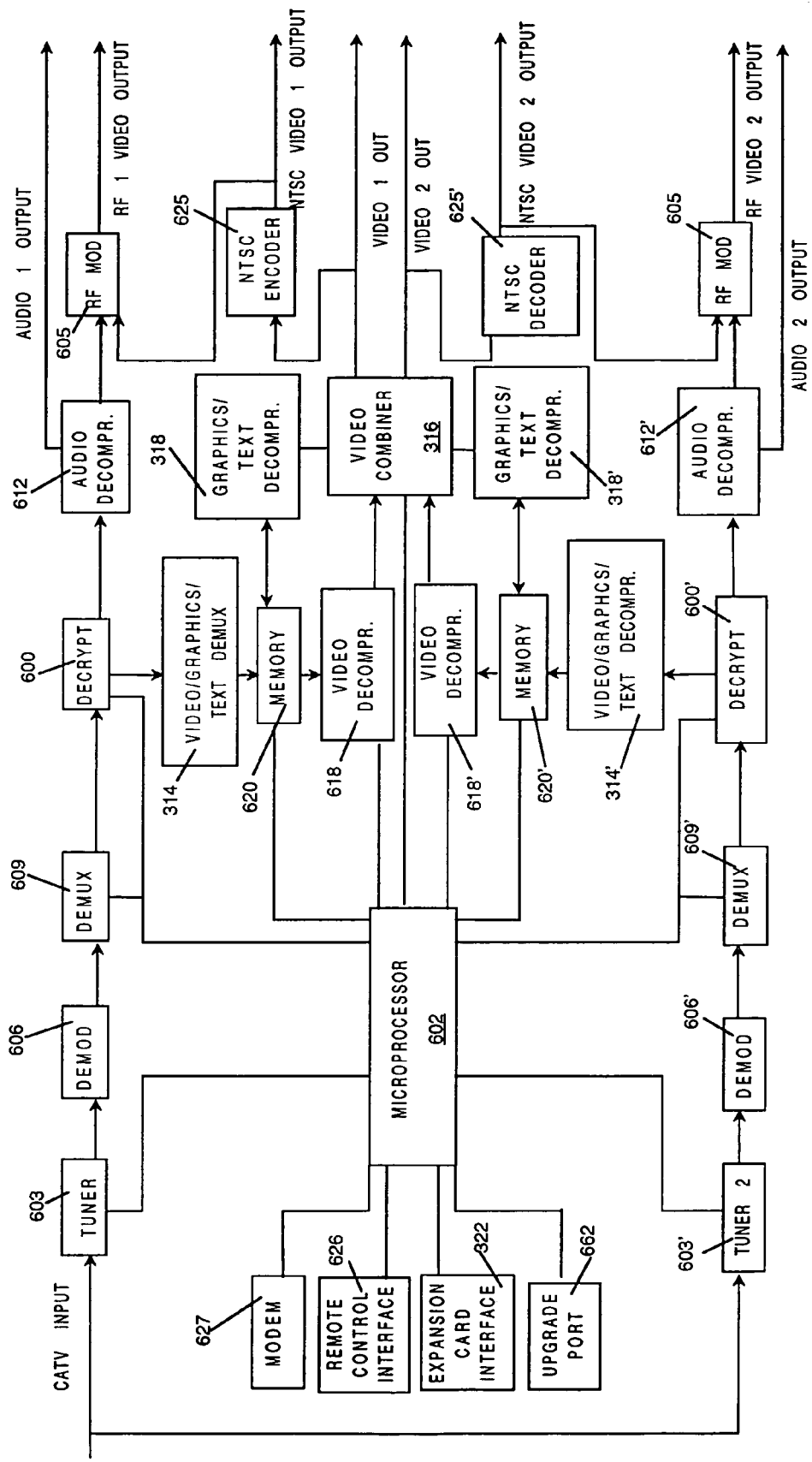
FIG. 14 is a diagram of the components of a set top terminal having a picture-on-picture capability.

FIG. 13b shows an alternative and preferred embodiment of the remote control 900 for use in the present invention. Standard television receiver remote control switches or buttons 362 may be used, including volume control, channel select, power and signal source buttons, as well as other menu buttons 364, including cursor movement, cursor select, menu select, and pay television buttons arranged longitudinally on the remote control 900, as opposed to the width-wise separation, as shown in FIG. 13a. The color of the buttons or the surrounding background may differ between the standard television remote control buttons 362 and the menu buttons 264 to differentiate visually between these two groups of buttons.

The width and depth of the remote control unit 900 are considerably less than the length to allow the remote control unit 900 to fit easily within a user's palm. The remote control unit 900 preferably has its center of mass balanced substantially near the longitudinal middle. This balance allows a user's thumb to naturally be placed in substantially the middle portion of the remote control unit 900, when it is picked up by a user.

Since the center of mass of the remote control unit 900 is placed substantially near the longitudinal middle of the remote control unit 900 (thereby having a user's thumb naturally fall in this same center region), the standard remote buttons 362 and menu access switches or buttons 364 most frequently accessed and depressed by a user are placed in the central region of the remote control unit 900 within easy reach of the user's thumb. Channel and volume increment and decrement buttons 366 are placed near this center of mass and longitudinal center line. The channel buttons 366 are preferably beveled in opposing directions to allow a user to feel for and press a desired button without looking down at remote 900. Similarly, the volume buttons 368 are preferably beveled in opposing directions for the same reason. Additionally, the channel buttons 366 could have a surface texture different from those of the volume buttons 368 to allow even easier differentiation.

Also placed in the longitudinal center, within easy reach of a user's thumb, are cursor movement buttons 370 and a "go" button 372. The "go" button 372 selects an option corresponding to the placement of the cursor. As opposed to buttons, a joystick may be used with a selection on the stick, or a trackball, depressible for selecting a desired choice. The cursor buttons 370 are placed ninety degrees apart, with the "go" button 372 placed within the center of the cursor movement buttons 370, as shown in FIG. 13*b*. The cursor movement buttons 370 are preferably beveled inwardly toward the "go" button 372 and the "go" button 372 is recessed below the level of the cursor movement buttons 370 so that it is not accidentally pressed while depressing the cursor movement buttons 370. In addition to the beveling on the cursor movement buttons 370, these buttons may also have a surface texture to allow a user to feel for and select the appropriate button without looking down at the remote 900 and directional arrows could be raised or recessed on the surface of the cursor movement buttons 370 for this same purpose.

Menu select buttons 374 are placed near buttons 370 as shown in FIG. 13*b*. Menu select buttons 374 are preferably the largest buttons on the remote control unit 900. Menu select buttons 374 preferably have icons or other graphics imprinted on their top surface or adjacent to corresponding buttons. For example, a button for the sports major menu may contain a baseball icon. The icons represent the programming available on the particular major menu selected by the menu select buttons 374. The icons may also be raised above the level of the menu select buttons to provide a textured surface. This textured surface would allow a user to select an appropriate menu button 374 by feel, without looking at the remote control unit 900. The icons would require substantial differences in texture, while still providing a meaningful graphic related to the associated menu.

As shown in FIG. 13*b*, labels and icons are provided for the following major menus: movies, sports, children's programming, documentary/news, entertainment, magazines, programming guide, HDTV (high definition television), interactive TV, music, and an additional button 376 for further programming. Menu select buttons 374 may also be labeled A through J for the above programs, with the last button for all additional major menus labeled K-Z.

Although the remote control unit 900 is described with a variety of channel selection buttons, nearly all buttons from a standard remote control (section 362 buttons) could be eliminated. The present invention would allow a subscriber to use a remote control unit 900 containing only menu select buttons 374 and/or cursor movement and select buttons, 370,374, respectively.

As used herein, "button" is contemplated to include all manner of switches or touch sensitive circuitry to activate a particular function in the remote control unit 900. Additionally, although the remote control unit 900 communicates with the set top box by means of infrared transmission, other forms of communication are contemplated, including ultrasound, radio frequency and other electromagnetic frequency communication.

4. Advanced Features and Functional Capabilities a. Overview

In the preferred embodiment, the set top terminal 220 will include features that are now being adopted in the industry, including parental controls and locks, electronic diagnostics and error detection, muting, on-screen volume control, sleep timer, recall of last selection, etc. Each of these features has a corresponding menu (or overlay menu) that allows on-screen customizing and activation of the feature.

The preferred set top terminal 220 also supports a number of advanced features and functional capabilities. This set top terminal 220 provides subscribers with a picture-on-picture capability without requiring a special television to support the capability. The set top terminal 220 also supports a program catalogue Service, which provides subscribers with information on all programming available at its particular subscriber location. The set top terminal 220 further includes the capability of querying viewers to establish, among other things, favorite channel lists, personal profile data and mood information. The set top terminal 220 allows the subscriber to view promotional menus on future programming events.

The set top terminal 220 supports additional capabilities using its hardware upgrades that allow subscribers to use other interactive services, for example, to engage in on-line question and answer sessions, to order and confirm airline tickets, and to access a variety of other data services. The set top terminal 220 makes use of a digital tuner as a hardware upgrade to provide subscribers with a digital audio capability.

The preferred set top terminal 220 may be used to control video tape machines, thereby simplifying the recording of programs. The set top terminal 220 can, in conjunction with the program delivery system, easily support high definition television (HDTV). For subscribers living in remote locations, the set top terminal 220 accommodates backyard satellite systems.

In addition to all the features that the set top terminal 220 supports with its current internal programming and upgradeability, additional features may be added or existing features increased through remote reprogramming of the set top terminal 220. Utilizing the resident operating system on the read only memory (ROM), the cable headend 208 is able to reprogram the random access memory (RAM) of the set top terminal 220. With this capability, the cable headend 208 can remotely upgrade software on the set top terminals 220.

Reprogramming will occur by using the program control information signal, with the appropriate signals sent over this signal. In an alternative embodiment, one channel is dedicated for the special programming needs. When reprogramming is to occur, the cable head end will send an interruption sequence on the program control information channel that informs the set top terminal 220 that reprogramming information is to follow.

b. Picture-On-Picture Capability

Although the preferred embodiment of the present invention decompresses one channel at a time for the viewer, users who desire a picture-on-picture capability can be provided with a set top terminal 220 have upgraded hardware components that allow two channels to be tuned and decompressed at any given time. Once two signals are available, the picture-on-picture capability can be made fully available in the set top terminal 220, without requiring a special television.

Figure 15:
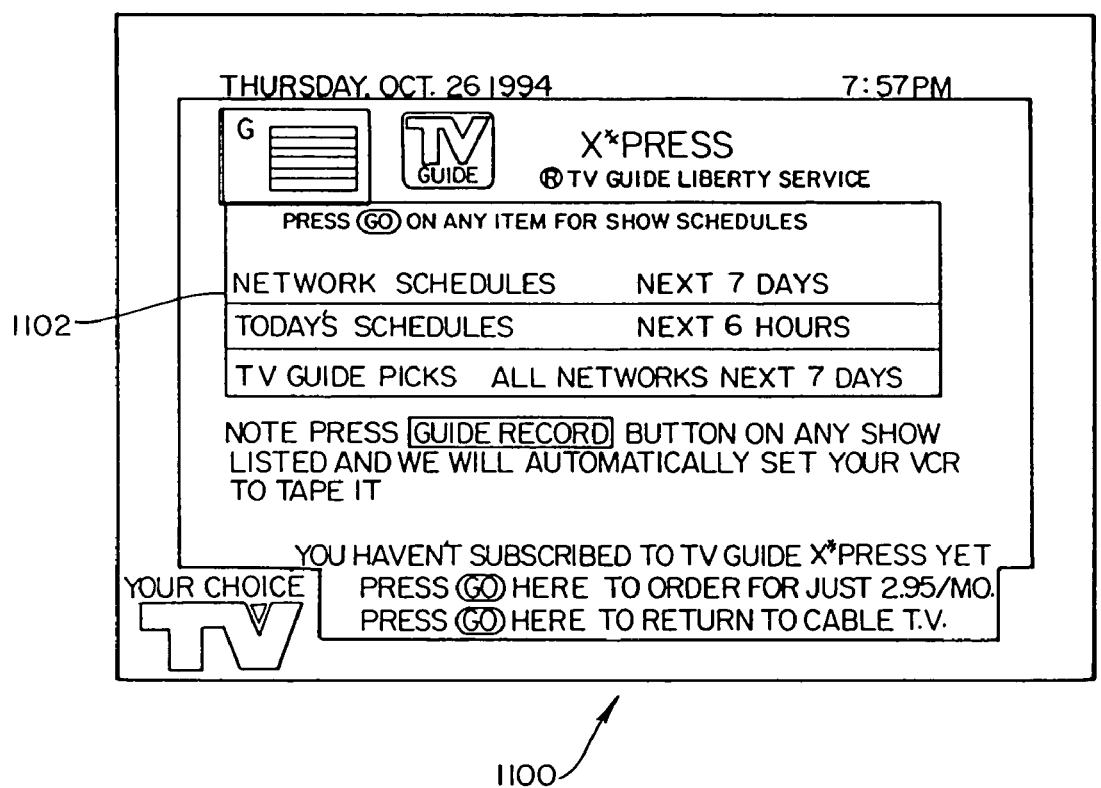
FIG. 15 is a drawing of a menu related to program catalogue services.

FIG. 15 diagrams one embodiment for implementing the picture-on-picture capability. Such implementation necessarily requires the use of two tuners 603, 603' and two decompressors 618, 618' so that two separate video programs may be displayed simultaneously on the subscriber's television screen. As shown in the figure, the CATV input signal is received by the set top terminal 220 and input into two separate tuners. These tuners will each tune to a separate television program, both of which will be simultaneously displayed on the subscriber's television. The two television programs are extracted from the CATV input signal by the two parallel signals paths depicted in FIG. 15.

Each signal path is substantially identical (therefore the components thereof are commonly numbered, with callout numbers of the components of one path carrying the prime indicator) and thus, only one path will be described. Each signal path shown includes a tuner 603, a demodulator 606, a demultiplexor 609, a decryptor 600 and various decompression devices. As the respective signals pass through these devices, the microprocessor 602 coordinates the signal processing to produce a decrypted program signal. The decrypted program signal is further partitioned between audio, on the one hand, and video, graphics and text, on the other. The audio signals extracted are passed to an audio decompressor 612, which further processes the audio for output to the subscriber's television.

The embodiment diagramed in FIG. 15 shows only single audio channels for each video channel tuned by the individual tuners. As described above, the number of audio channels will typically include four audio signals corresponding to a single video channel. At least two of these audio signals may be used for stereo television play. Although the subscriber can view two separate video pictures simultaneously through the picture-on-picture capability, the subscriber's television can only accommodate a single audio signal at a time (or two audio signals for stereo audio reception). Thus, the set top terminal hardware shown in FIG. 15 must also include a switch (not shown), which accommodates the simple switching between each audio signal or signals that correspond to one video picture or another. Such an audio switch, which is a component well known in the art, allows the subscriber to listen to the audio of one picture or the other. The video, graphics and text portion of the program signal are routed through another demultiplexor 314, which, in turn, separates all video, graphics and text of the signals. These signal parts are stored in a memory device 620 within the set top terminal 220. This memory device may be a ROM, RAM, EPROM, or EEPROM.

The microprocessor 602 initiates and coordinates further decompression of the video, graphics and text for each of the program signals. Once these signal parts are decompressed within the set top terminal 220, these components are passed to a video combiner 316. The video combiner correlates and combines the video, graphics and text of the two program signals. The video combiner outputs these two signals for display on the subscriber's television. These signals may also pass through an NTSC encoder 625 to produce analog NTSC video waveforms, which may likewise be displayed on the subscriber's television. Such display necessarily requires that each signal pass through an RF modulator 605 in order to be input into a television. In this way, two separate RF video outputs are produced. Each video signal produced by the RF modulators has its own corresponding audio outputs produced by each audio decompressor.

Each video signal (and its corresponding audio signal) produced by the two tuner configuration can be simultaneously displayed on the subscriber's television, which has a picture-on-picture capability, or, alternatively, the set top terminal 220 itself can create the picture-on-picture image for display. Such display involves the scaling and repositioning of one of the video (and audio) signals so that both pictures produced can be viewed simultaneously. In so doing, the subscriber's television can display one of the pictures as a full screen display, with the other picture being displayed as a scaled and repositioned display overlayed on the full screen display. To implement such a technique, the set top terminal 220 must include the hardware components necessary to produce a picture-on-picture capability, including hardware capable of scaling, repositioning and overlaying images. Such an advanced set top terminal 220 allows the subscriber to make use of a picture-on-picture capability even though the subscriber's television cannot alone produce such a result.

c. Program Catalogue Service

Referring to FIG. 15 and to FIG. 8, in the preferred embodiment of the present invention, program catalogue menu 1100 listing programs available on network schedules, will be available as a major menu of the type shown as 1020. In the preferred embodiment, the major program catalogue menu 1100 would offer submenus, such as network schedules for the next seven days, today's network schedules for the next six hours, and TV program catalogue picks for the next seven days.

In order for the set top terminal 220 to provide a program catalogue service, the set top terminal 220 must receive information on all programming available at its particular subscriber location. This information will be sent to each set top terminal 220 as part of the program control information signal or STTCIS. The program control information signal would include, among other things, all programming scheduled for the next 7 days. This programming information would, for example, include the name of each program, the type of program, the program start time, the length of the program, the date the program will be shown, a brief description of the program and whether or not the program is closed-captioned, among other information.

All programming information sent to the set top terminal 220 for use with the program catalogue service will be stored in the set top terminal's internal memory. Upon selection of the program catalogue service by the subscriber, the microprocessor accesses the memory device during its menu generation and creation process. In this way, the programming information will be combined with the program catalogue menu or submenu template to produce the Program catalogue service. The program catalogue service may involve the use of more than one menu, especially where the network scheduling information covers time frames longer than a few days.

If the particular set top terminal 220 has been subscribed to the program catalogue service, the subscriber may proceed to a submenu showing schedules of programs. If the subscriber chooses the network schedule submenu 1102, he is offered a list of network schedules to choose from. If a subscriber were to choose, for instance, HBO, an HBO-specific submenu (not shown) would appear and allow a subscriber to choose a date of interest to see what programs are available on that particular date.

d. Querying Viewer

Figure 16A:
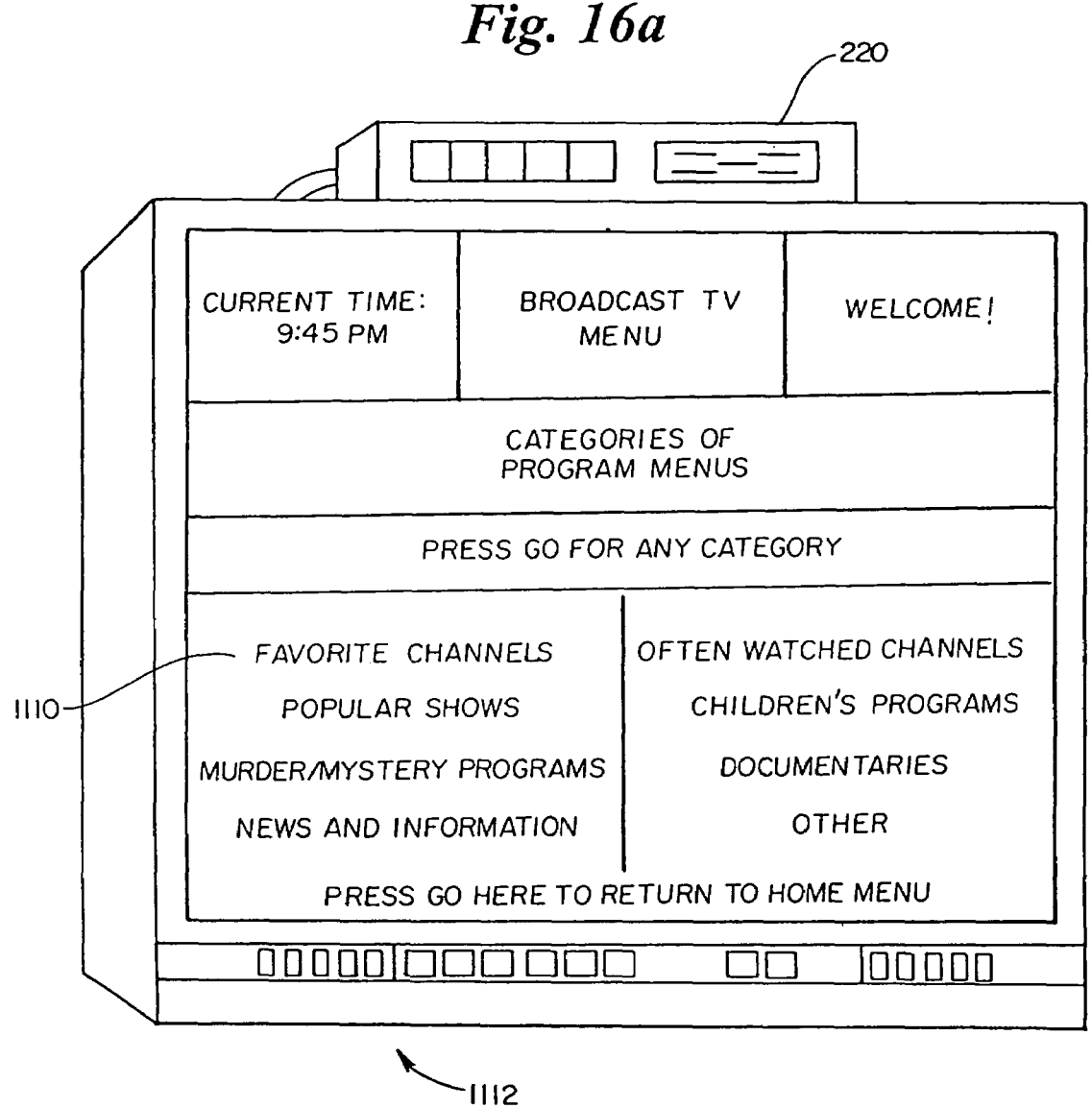

To support a variety of services, the set top terminal 220 is capable of querying the viewer and recording viewer responses. For example, in order for the set top terminal 220 to establish a favorite channel list as shown at 1100 in FIG. 16a depicting the broadcast TV menu 1112, menus querying the subscriber and allowing the subscriber to input his selection of eight favorite channels is displayed.

After querying the subscriber for a list of popular shows the terminal displays a submenu allowing the subscriber to choose one of the subscriber's favorite or popular shows for viewing. Although various embodiments of menus are possible, the goals of each are the same—to eliminate or augment printed guides to television programs. In an alternative embodiment, a program viewing suggestion feature is available as an additional feature. This feature gives the indecisive or lazy viewer suggestions as to which programs the viewer should watch. The set top terminal 220 uses a matching algorithm to accomplish this program suggestion feature. This program suggestion feature is described in detail in U.S. Pat. No. 5,798,785, dated Aug. 25, 1998, entitled, TERMINAL FOR SUGGESTING PROGRAMS OFFERED ON A TELEVISION PROGRAM DELIVERY SYSTEM, incorporated herein by reference.

In order for the set top terminal 220 to make decisions on which programs the subscriber should watch, the terminal must create a personal profile for the particular viewer. From the data in the particular viewer's personal profile and the television program information available in the program control information signal, the set top terminal 220 is able to select a group of programs which the particular viewer is most likely to watch. In order for this feature to operate, a personal profile for each viewer can be gathered by the set top terminal 220 and stored in a memory file. The personal profile consists of demographic information that may be gathered in a number of ways. The set top terminal 220 builds the personal profile for each viewer and stores the information in a memory file by viewer name. To build a personal profile in the preferred system, the viewer answers a series of questions presented on a series of menu screens. These personal profile screens request the viewer to input information such as name, sex, age, place of birth, place of lower school education, employment type, level of education, amount of television program viewing per week, and the number of shows in particular categories that the viewer watches in a given week such as, sports, movies, documentaries, sitcoms, etc. Any demographic information which will assist the set top terminal 220 in targeting advertisements to the viewer or suggesting programs may be used.

Once a personal profile has been created (in a particular set top terminal 220), it can be indefinitely stored in non-volatile memory. A selection at the home menu screen 1010 (FIG. 8) activates the program selection feature. Following activation of the feature, the set top terminal 220 will present the viewer with a series of brief questions to determine the viewer's mood at that particular time, as shown in FIG. 16*b*. For example, the first mood question screen 1114 may ask the viewer to select whether the viewer desires a short (30 minute), medium (30-60 minute), or long (60 plus minute) program selection. The second mood question screen 1116 requests the viewer to select between a serious program, a thoughtful program, or a light program, as shown in FIG. 16*c*. And the third mood question screen 1118 requests whether the user desires a passive program or an active program, as shown in FIG. 16*d*. The viewer makes a selection in each question menu, utilizing the cursor movement keys and "go" button on the remote control unit 900.

After the viewer has responded to the mood question menus which determine his mood, the set top terminal 220 uses the personal profile information and mood information to find the best programming matches for the viewer. The set top terminal 220 displays an offering of several suggested programs to the viewer. With this program selection feature, the set top terminal 220 can intelligently assist the specific viewer in selecting a television program.

The personal profile information may also be used in targeting advertisements. In the preferred embodiment, the network controller 214 can target specific advertisements to individual cable distribution network nodes or, alternatively, to individual subscribers. In order to accomplish the advertisement targeting capability, the network controller 214 transmits packages of advertisements to the cable distribution network nodes or subscribers for eventual display on the set top terminal 220. When the video that the subscriber is watching nears a break for a commercial, a specific advertisement or set of advertisements is specifically targeted to a particular set top terminal 220 based on the personal profile information described above. Although the network controller 214 is the component in the program delivery system which provides this targeting capability, the set top terminal 220 accommodates transparent channel switches to display the targeted advertisement. In this way, although the subscriber thinks that the set top terminal 220 is tuned to a specific channel, an advertisement from another channel is displayed on the subscriber's television.

Figure 17A:
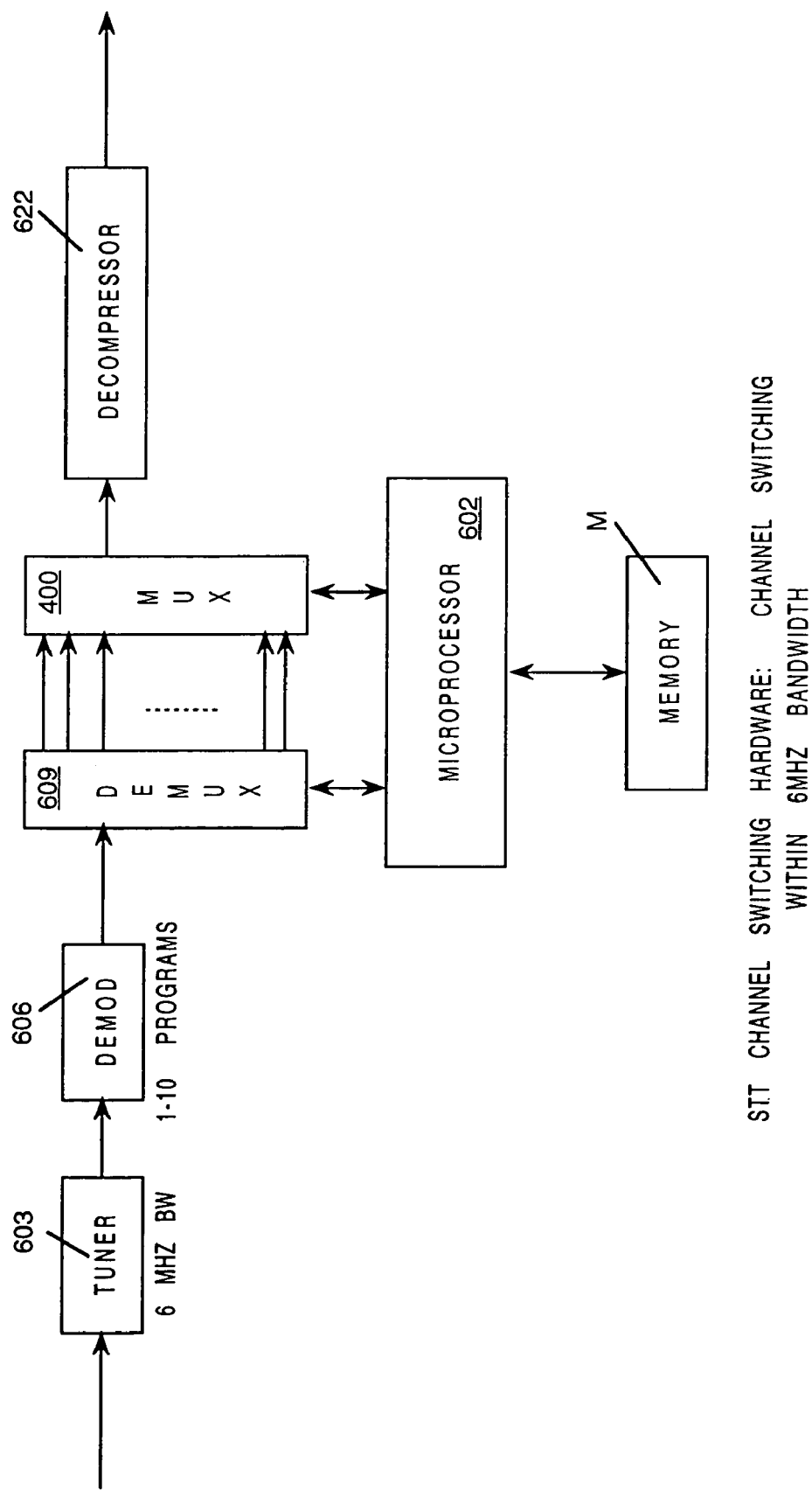
FIGS. 17a and 17b are drawings of the set top terminal hardware components that accommodate transparent channel switching.
Figure 17B:
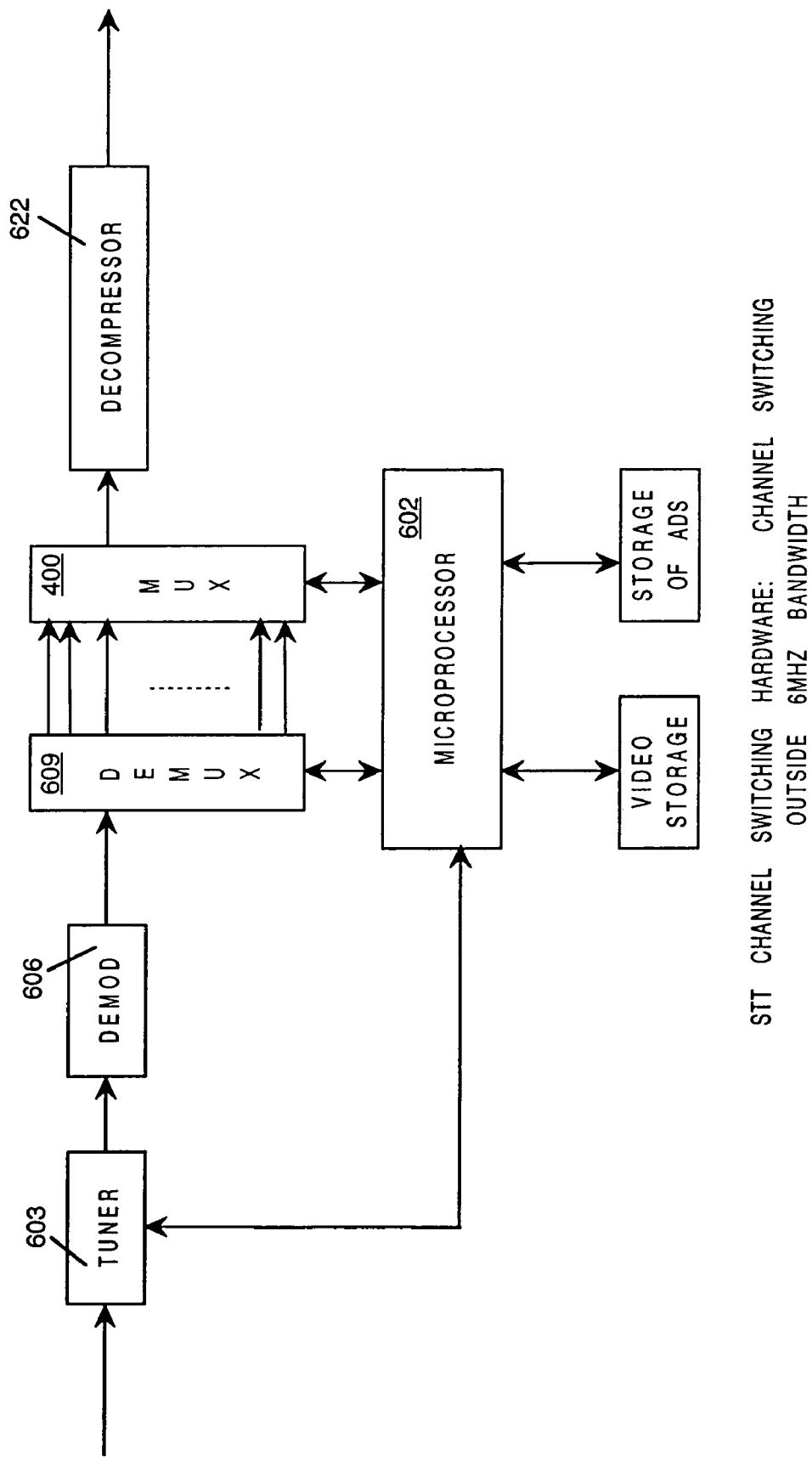

The hardware required to accommodate such transparent channel switching capabilities are shown in FIGS. 17*a* and 17*b*. FIG. 17*a* shows the set top terminal hardware components which accommodate channel switching within a single 6 MHZ channel bandwidth. These components include a tuner 603, a demodulator 606, a demultiplexer 609, a multiplexer 400, a decompressor 622, a microprocessor 602, and local memory M. The tuner 603 operates by tuning to a specific 6 MHZ bandwidth which includes the displayed video and a number of channels carrying advertisements. The demodulator 606 processes these signals and sends them to the demultiplexor 609, which converts the received signal into separate program and advertisement signals. During this processing, the microprocessor 602 coordinates the demultiplexing of the programming signals. Once the video signal pauses for a commercial break, the microprocessor 602 instructs the multiplexer 400 to select the advertisement or advertisements for decompression and subsequent display on the subscriber's television. This hardware configuration allows the set top terminal 220 to switch between channels within the MHZ bandwidth and display various advertisements for viewing, regardless of the video currently being watched by the subscriber.

Where a targeted advertisement falls outside the tuned 6 MHZ bandwidth containing the video that the subscriber is currently watching, the hardware configuration shown in FIG. 17*b* is used. In this configuration, the microprocessor 602 instructs the tuner 603 to retune to another 6 MHZ channel bandwidth, as represented by bi-directional arrow A.

Working together, the microprocessor 602 and tuner 603 allow targeted advertisements, which have been transmitted in another 6 MHZ bandwidth, to be tuned with minimal acquisition time and delay. In particular, this configuration allows the set top terminal 220 to tune outside a given 6 MHZ bandwidth (to another 6 MHZ bandwidth) in order to select a targeted advertisement for display. This alternative embodiment may require the use of a full screen mask in order to minimize any annoying screen rolling during the tuning process. The masking is intended to cover any glitches which would otherwise be displayed during the acquisition time (e.g., 0.5 seconds) for retuning to another 6 MHZ channel bandwidth.

Where the acquisition time or delay becomes unreasonable, an alternative embodiment (not depicted) can include the use of two tuners similar to the configuration used above for the picture-on-picture capability. This alternative configuration using two tuners trades an increased cost for lower acquisition times. Those skilled in the art will recognize a number of other configurations of set top terminal hardware that will accommodate a transparent channel switching feature. A more detailed description of target advertising and channel switching is provided in co-pending U.S. patent application Ser. No. 08/735,549, filed Oct. 23, 1996, entitled, METHOD AND APPARATUS FOR TARGETED ADVERTISING, and U.S. patent application Ser. No. 09/054,419, filed Apr. 3, 1998, entitled TARGETED ADVERTISING USING TELEVISION DELIVERY SYSTEMS, incorporated herein by reference.

e. Promotional Menus

Figure 18:
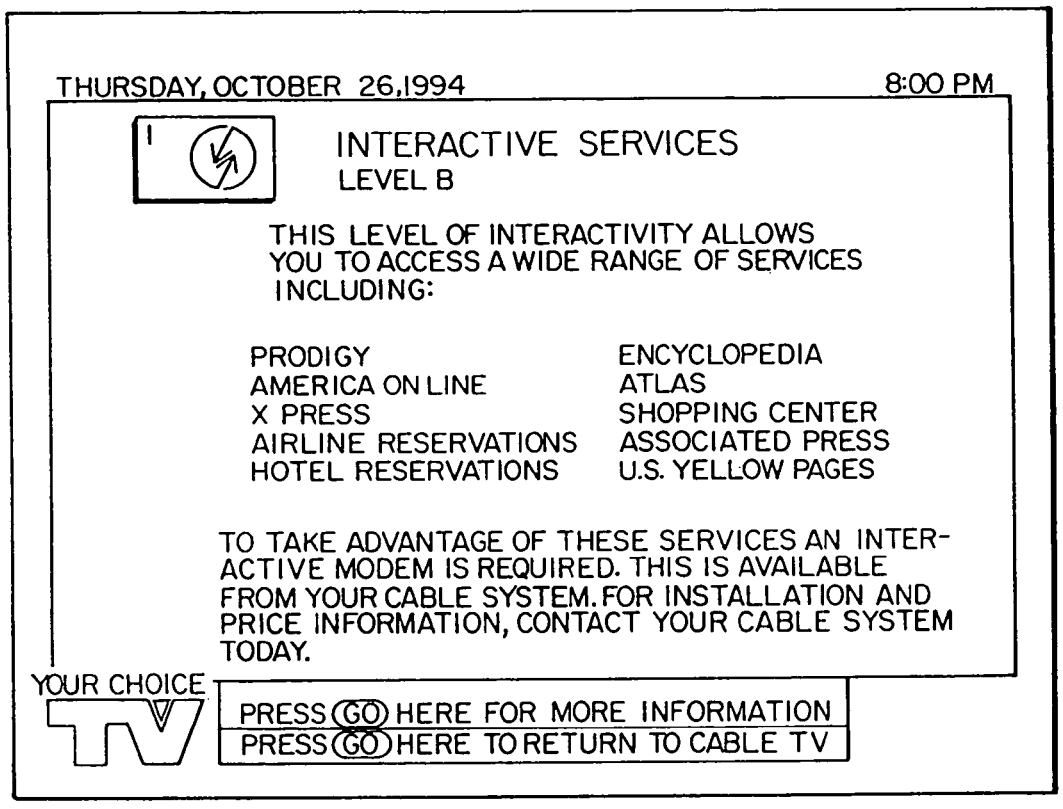
FIG. 18 is a drawing of an interactive television promotional menu for a set top terminal hardware upgrade.

FIG. 18 depicts the use of a promotional menu 1120 used to sell subscriptions to services in the system 200. This promotional menu is tailored to Level B interactive services which include a variety of on-line type services such as Prodigy, Yellow Pages, Airline Reservations, etc. A similar menu is used for Level A interactive services that offers subscribers additional information about programs such as quizzes, geographical facts, etc. Such information may be received by the set top terminal 220 in several data formats, including in the vertical blanking interval (VBI) and in the program control information signal.

Other promotion menus similar to menu 1120 may be used for the Level C interactive services. The Level C interactive services utilize local storage such as CD technology (e.g., 122) to offer an enormous range of multi-media experiences. The Level C interactive services require a hardware upgrade as described earlier. Specially adopted CD-I and CD-ROM 122 units are used for this service.

Typically, promotional menus may be generated when a subscriber selects a nonexistent channel, creating a virtual channel. Such virtual channels do not require any additional bandwidth since these channels do not carry any of the data required to create a promotional menu. Instead, when the subscriber selects a channel that does not exist (e.g., Channel 166), a virtual channel is created using data sent to the set top terminal in a number of ways. For example, the data may be sent in the vertical blanking interval (VBI) of another channel, out-of-band, or with the menu information sent from the headend 208 in the set top terminal control information stream (STTCIS). The data will be used to create graphics stored locally at the set top terminal 220 as an NTSC video signal which may be displayed on the subscriber's television. In this way, a promotional menu may be drawn and a virtual channel is created. This capability simply provides the set top terminal 220 with the ability to display a promotional menu or graphics display whenever a nonexistent channel is selected by the subscriber.

f. Other Interactive Services

Figure 19A:
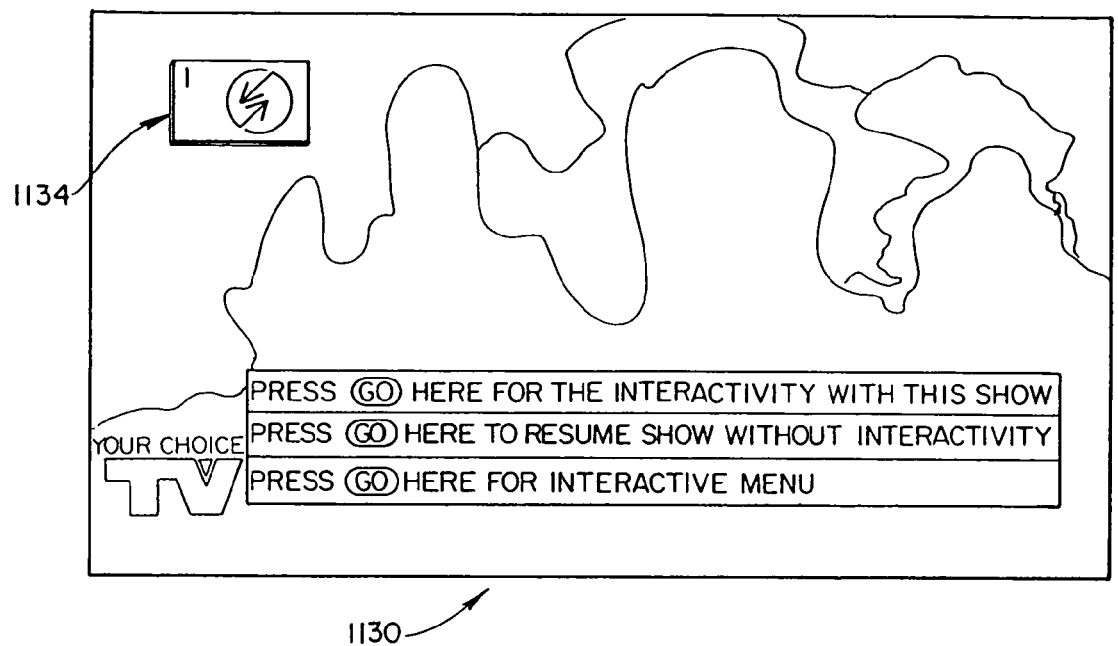
FIGS. 19a and 19b are drawings of submenus for interactive television services using hardware upgrade Level A.
Figure 19B:
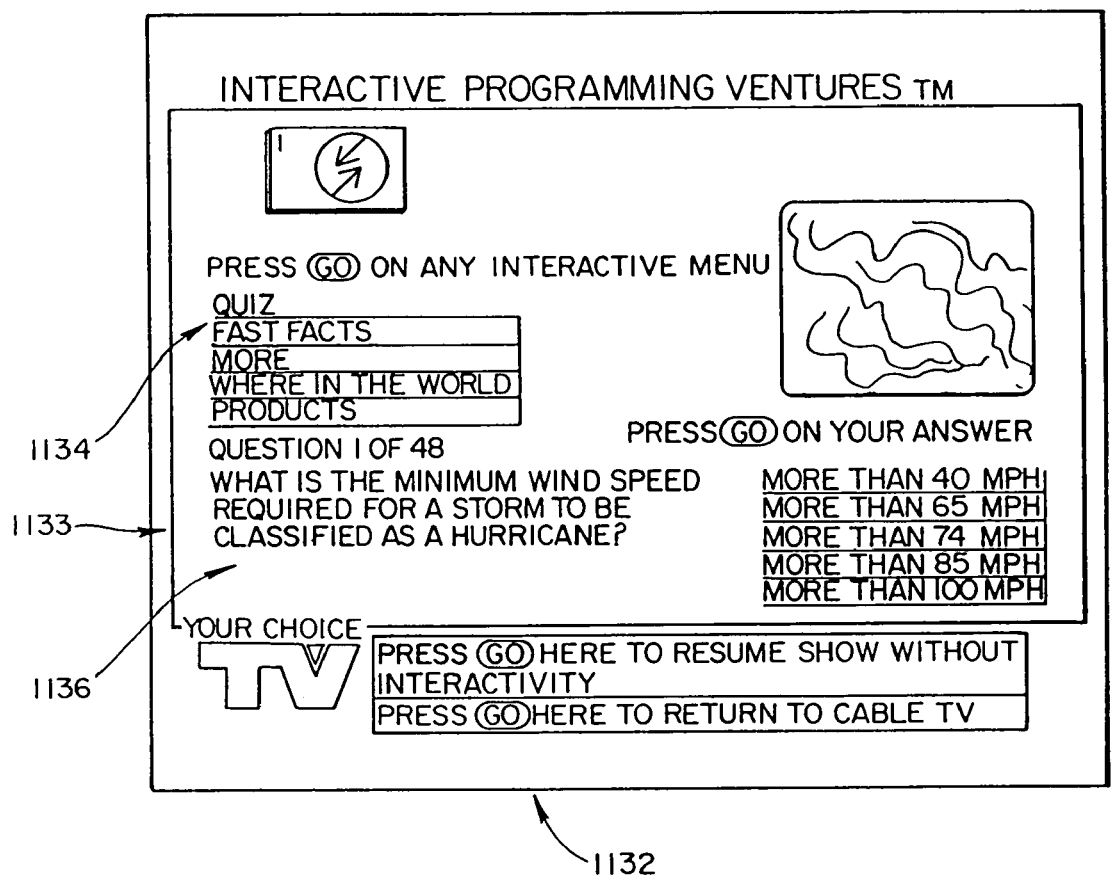

FIGS. 19a and 19b show menus (1130 and 1132, respectively) that are available using the interactive Level A services. Referring to FIG. 19a, when interactive Levels A services are available for a television program, the system will display an interactive logo 1134 consisting of the letter "I" and two arrows with semicircular tails. In the preferred embodiment, the set top terminal 220 will place the interactive logo on the television screen as an overlay menu. In the preferred embodiment, the set top terminal 220 will detect that there is data or information available about a television program which can be displayed to a subscriber using the interactive service. When the set top terminal 220 senses that there is interactive information available, it will generate the interactive logo overlay menu 1134 and place it on the television screen. For example, the set top terminal 220 will detect that information on a television program is being sent in the vertical blanking interval (VBI) and generate an interactive logo overlay menu 1134 which will appear on the subscriber's television screen for approximately fifteen seconds during each ten minute interval of programming. Similarly, the set top terminal 220 can sense that the programming has closed caption information available and place a closed caption logo on the screen.

Referring to FIG. 19b, when the subscriber sees the interactive logo 1134 on the television screen, the subscriber is made aware of the fact that interactive services are available in conjunction with his television program. If the subscriber presses the interactive remote control button, another overlay menu 1133 will be generated by the set top terminal 220 and placed on the screen. This overlay menu 1133 is shown in FIG. 19b being overlayed on an interactive television program. From this menu 1133, the subscriber may select a variety of different types of textual interactivity with the current television program, as at 1134, including quizzes, fast facts, more info, where in the world, products, etc. At any time during the interactive submenus, the user may return to the television program without interactive features.

Another submenu 1136 gives additional information related to the television program to the viewer in textual form in the lower half of the screen. In FIG. 19b, the submenu 1136 shows the available interactive options for the subcategory "quiz." In this interactive subcategory, the user is presented with questions and a series of possible answers. If the subscriber desires, the subscriber selects one of the answers to the quiz question. After the selection, the set top terminal 220 sequences to another menu. The set top terminal 220 sequences to the interactive quiz answers submenu which informs the subscriber whether the correct answer was or was not chosen. Subsequently, another submenu would show correctly or incorrectly answered quiz question.

Figure 20A:
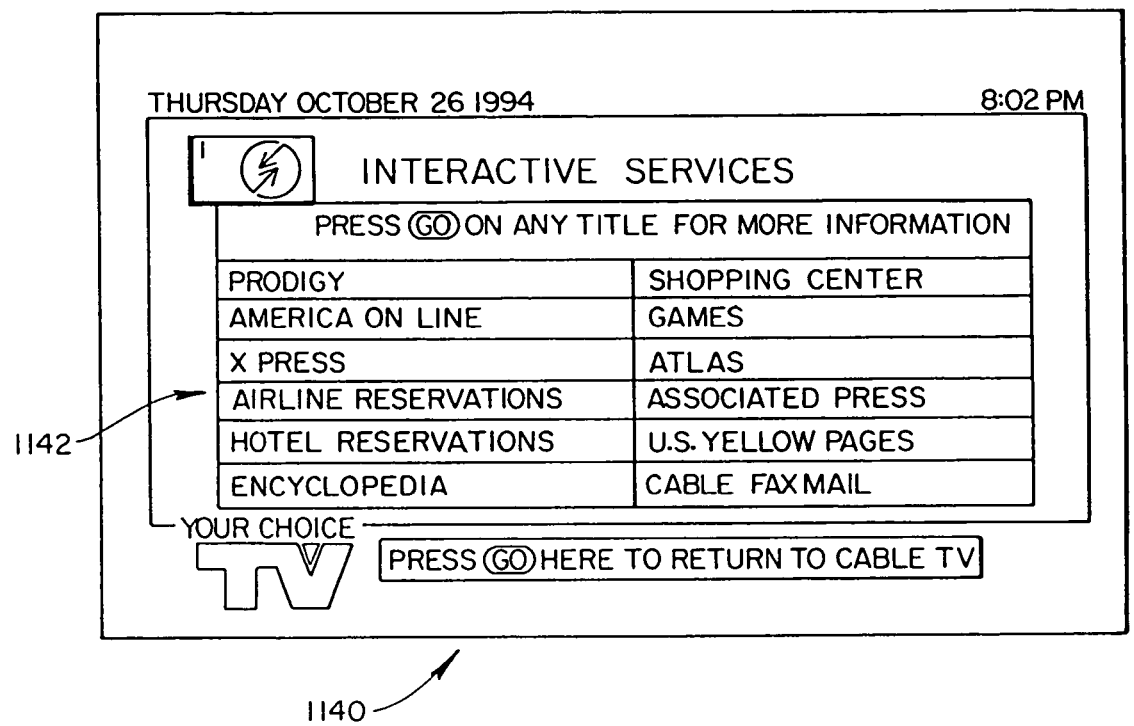

FIG. 20a is an example of a submenu for Level B interactive services. From this menu screen 1141, any of a number of on-line data services could be accessed. One service, the airline reservations selection 1142, has been chosen by the subscriber on this menu.

Figure 20B:

In selecting airline reservations, the subscriber encounters a sequence of menus as for any on-line data service. Referring to FIG. 20b, the subscriber is typically shown a submenu, such as submenu 1144, for the data service offering various options. In each of these submenus related to a data service, the subscriber is able to exit, returning to the home menu 1010 or regular cable TV.

FIG. 20b, the airline information and reservation submenu 1144, allows a subscriber to view six available flights. A subscriber may select one of the flights to check on its availability. Another similar submenu allows a subscriber to enter the month, day and year for the availability date desired. In this submenu, the subscriber is offered the option of correcting any errors in the entered information.

Figure 20C:
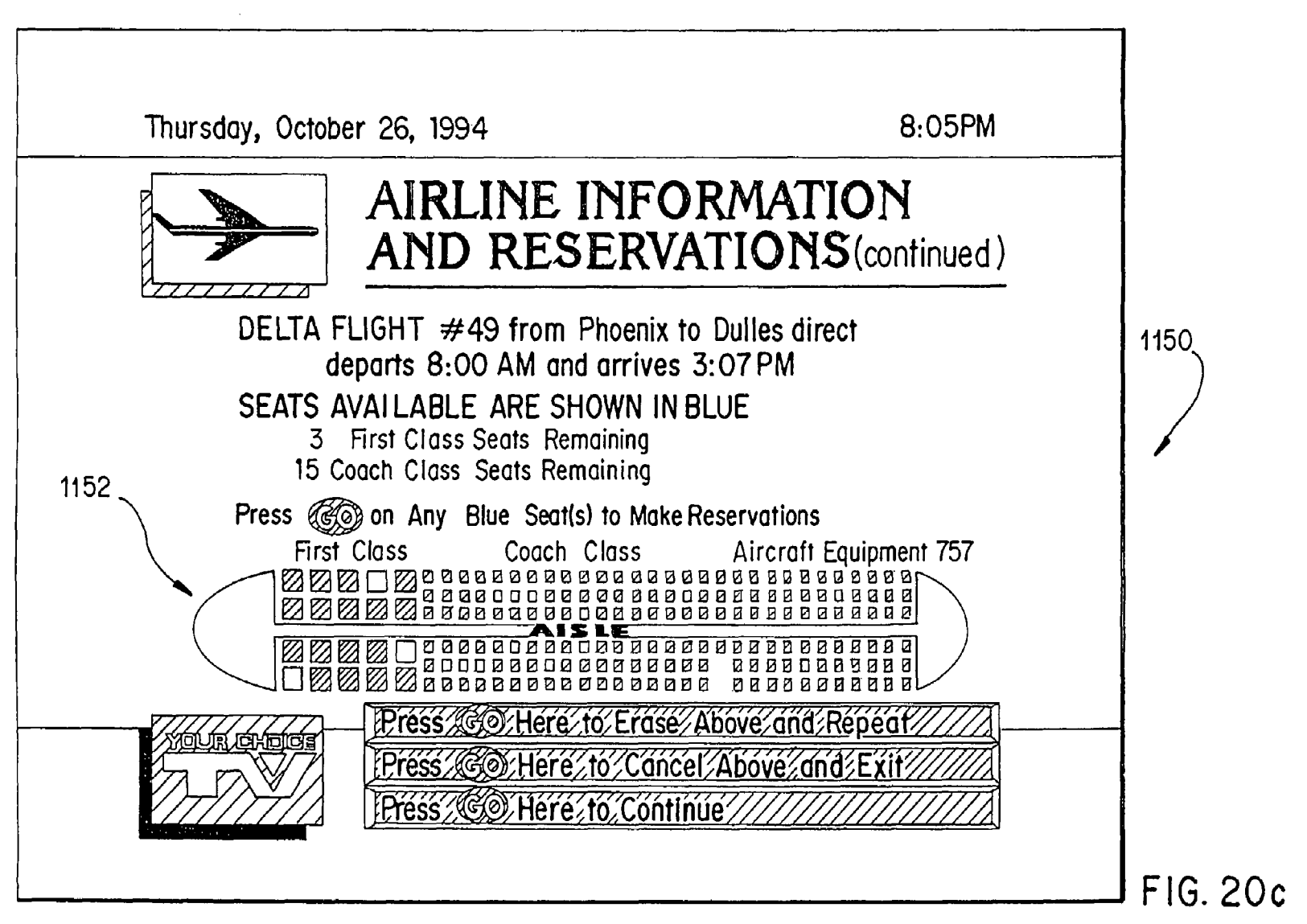

FIG. 20c is another airline submenu 1150 that allows a subscriber to view remaining seats available on a flight, enabling the selection of a seat assignment. This interactive submenu 1150 is an example of how information may be graphically shown to a subscriber using a portion of the menu and different coloring schemes. In this interactive menu, the lower half of the screen 1152 shows the passenger compartment of an airplane with all the seat locations graphically represented by square blocks. By coloring the available seat locations in blue and the unavailable seat locations in a different color, the menu can present a great deal of information in a limited amount of space. This graphic presentation of information for the interactive on-line data services is an important method of visually displaying large amounts of information to the subscriber.

Referring to FIG. 20d, another submenu 1156 allows the subscriber to choose a one-way or round-trip ticket, to confirm reservations and to charge an airline ticket by credit card, choosing the appropriate strip menu on the lowerpart of the screen. In this particular menu 1156, the subscriber is charging a round-trip plane ticket on a credit card. The subscriber simply needs to enter the credit card number, expiration date, and credit card type to charge an airline ticket. Other submenus may process the subscriber's credit card charge for the airline ticket, confirm the subscriber's airline ticket purchase, and pass this information to the location where the ticket is printed.

Using the methods and hardware described, a variety of interactive services are possible. Those skilled in the art will recognize that such interactive services may be accommodated by the preferred set top terminal 220.

g. Caller ID

Using the capability of the set top terminal and a connected modem, the set top terminal is able to perform the function of caller ID. The caller ID function of the set top terminal assists the viewer in a manner similar to the caller ID function provided by telephone companies. However, the set top terminal is able to use the television as its display means to communicate to the viewer information about incoming telephone calls. Also, the strong local processing capability of the set top terminal allows the caller ID function to be much more user friendly and convenient.

If the set top terminal senses that a viewer is using the system and watching television, then the caller ID feature would automatically be activated. When the caller ID function is active, the set top terminal software will monitor incoming telephone calls to the viewer through the modem. After the set top terminal senses that the phone is ringing, signals are received on the tip and ring lines of the telephone, the system will immediately look for incoming telephone data identifying the telephone number from which the telephone call was initiated. Upon receiving the telephone number from which the call was initiated, the preferred embodiment of the caller ID compares the telephone number with a list of telephone numbers stored in memory. The list of telephone numbers stored in memory is cross referenced to a list of names, other textual data or graphics. When the set top terminal finds a match between the telephone number and a number stored in memory, the corresponding text or graphics are displayed on the television screen. For example, "GRANDMA" and a "smiley face" graphic can be flashed across the television screen using an overlay menu. In this manner the viewer may see the name (and identifying icon graphics) of the person placing the call and can decide whether to activate an automatic telephone message recording system or answer the telephone call. After generating an overlay menu, the set top terminal software awaits an IR command signifying a viewer response. With the simple depression of a button on the remote control, the viewer can instruct the set top terminal to send an activation signal to the automatic telephone message system (through a set top terminal port). Thus, the viewer can continue to watch a program and know the identity of a caller without taking his or her eyes off the television. If a dumb telephone message system is used, the viewer can simply allow the telephone to ring the requisite number of rings until the telephone answering machine normally activates and answers the call.

In an alternative embodiment, having no stored telephone numbers, the set top terminal may just flash the incoming telephone number on the screen using an overlay menu. In a more sophisticated embodiment, a microphone is provided in the set top terminal or remote control unit. Using the television's speakers, a remote control, and a microphone, the viewer is able to answer the telephone using the keys of the remote control without taking his or her eyes off the television screen.

h. Digital Audio Capability

Figure 21:
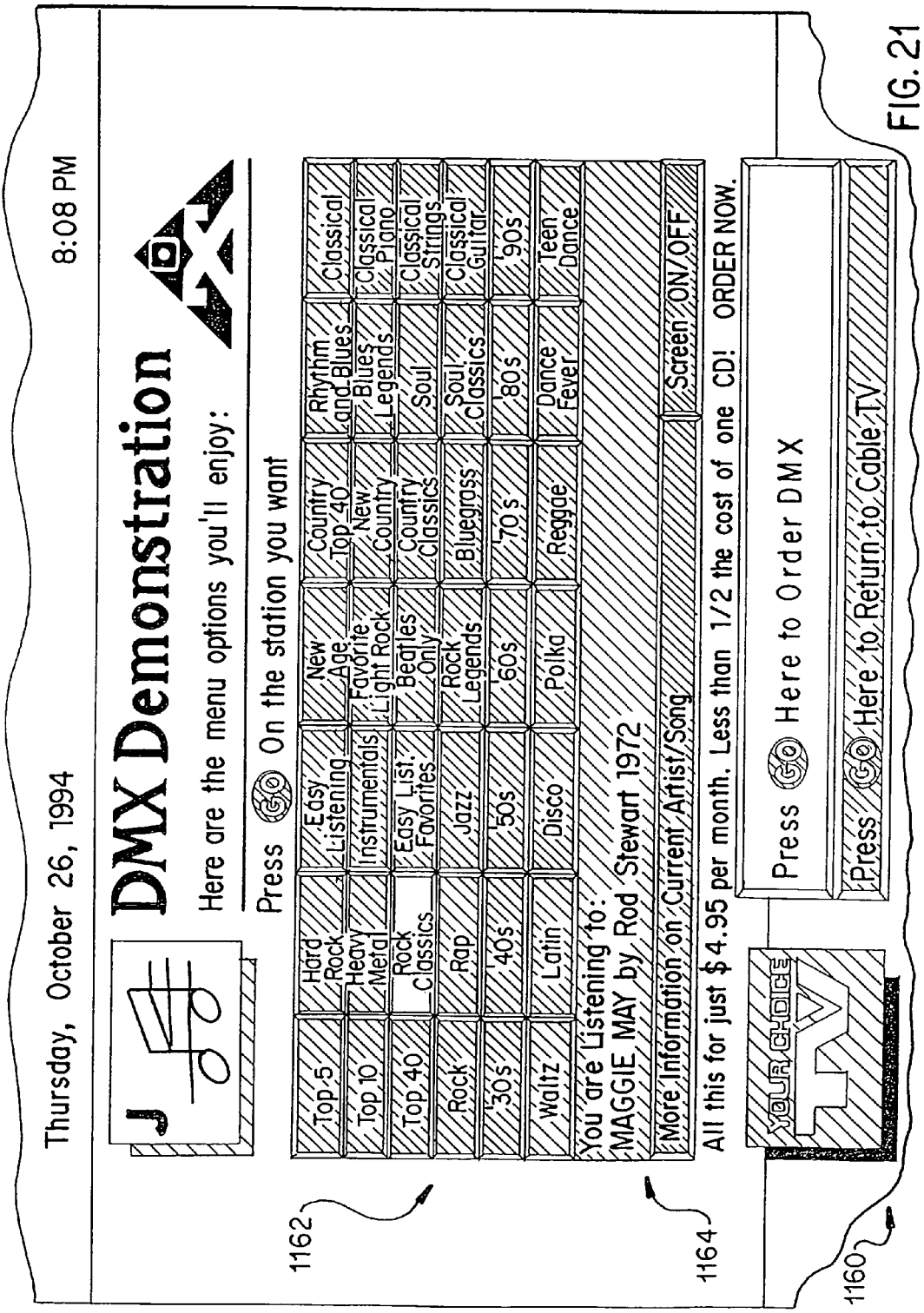
FIG. 21 is a drawing of a menu for digital audio services.

Referring to FIG. 21, the digital audio feature of the invention allows a subscriber to listen to CD quality audio selections through the subscriber's stereo (not shown). This can be accomplished by running cables directly from the set top terminal 220 (which may include a Level D hardware upgrade) to the subscriber's amplifier/stereo system. Alternatively, the subscriber may listen to audio selections through the subscriber's television system. In the preferred embodiment, the digital audio feature uses a Level D hardware upgrade as a digital radio tuner. This Level D hardware upgrade enables a subscriber to use the program delivery system's digital audio signaling capability. Digital audio transmissions require much less bandwidth than that used for the transmission of a digital video signals. Thus, hundreds of digital audio programs are delivered to each set top terminal 220 in limited segments of bandwidth.

Where digital audio programs are delivered to the set top terminal 220, the Level D upgrade (shown in FIG. 13*b*) provides the subscriber with the means to select a given digital audio program for listening.

The Level D hardware upgrade makes use of a tuner 603 that is separate from the tuner 603 used by the set top terminal 220 for video display. The digital audio signal is received at the set top terminal 220 over the CATV transmission media. The set top terminal 220, in turn, routes the digital audio signal to the components of the Level D hardware upgrade. These components may include: a tuner 603, demodulator 606, demultiplexer 609, decryptor, decompressor 622, remote control interface and microprocessor 602.

The Level D hardware upgrade will use its tuner 603 to tune to the specific digital audio program selected by the subscriber and subsequently demodulate, demultiplex and decrypt the digital audio signal. Upon completion of this processing, the digital audio signal will be decompressed to produce a processed digital audio signal ready to be output to the subscriber's stereo or directly to speakers.

The Level D hardware upgrade includes ports for the digital audio signal output, which provide the necessary connections for transmission of the signal from the Level D hardware upgrade to the subscriber's stereo. In addition, the Level D hardware upgrade include a small LED display that can show the channel number of the program selected, date and time, among other display fields.

The Level D hardware upgrade can be physically located in a different room from that of the television and set top terminal 220. Thus, the Level D hardware upgrade will have its own remote control device (not shown), albeit with less available options and keys than the set top terminal's remote control 900 described above. This Level D hardware upgrade remote control is more limited than the set top terminal's remote control 900 since the Level D remote control will be used exclusively for digital audio program selection. This limited remote control, nevertheless, includes a small LED or LCD display that is used to display the channel number of the digital audio program selected. Alternatively, the set top terminal's remote control may be programmed for use with the Level D hardware upgrade so that an additional remote control is not required to use the digital audio feature.

Using either remote control embodiment, the subscriber accesses the Level D hardware upgrade to select a digital audio program. The remote control sends an IR command signal to the Level D hardware upgrade, instructing the unit's microprocessor 602 to initiate the selection of a given program. The desired program is processed (i.e., tuned, demultiplexed, decrypted and decompressed) as described above and transmitted to the subscriber's stereo for listening.

The selection of a digital audio program does not necessarily require interaction with the subscriber's television.

Instead, all communications required to select a digital audio program may occur between a remote control and the Level D hardware upgrade. As a result, the subscriber's television need not be turned on for the digital audio capability to operate.

Alternatively, the Level D hardware upgrade can be co-located with the set top terminal 220 and the subscriber can select a digital audio program through a menu displayed on the subscriber's television. In this embodiment, the subscriber would use the set top terminal remote control to access a digital audio program selection menu.

In an alternative embodiment, the set top terminal 220 includes all the features of the Level D upgrade and, therefore, no upgrade is necessary. Those skilled in the art will recognize other alternatives that allow digital audio reception.

FIG. 21 is a major menu 1160 displaying the digital audio program choices which are available for subscribers who have paid the monthly fee. In a chart format 1162, the major menu shows the top five, ten, and forty songs available in six different categories of music. Below the chart, the system is able to provide a text message 1164 describing the particulars of the audio program selected. Using the same logos and menu format, the system can provide a text description enticing the subscriber to pay the monthly fee and join the service. For example, one menu may allow the user to test the system with a free demonstration. Another menu allows the subscriber to request additional promotional information about the system. Such menus may be used throughout the menu system.

From any of the menu screens for the digital audio feature, the subscriber may return to regular cable TV with the press of a single button.

i. VCR Control

Figure 22:
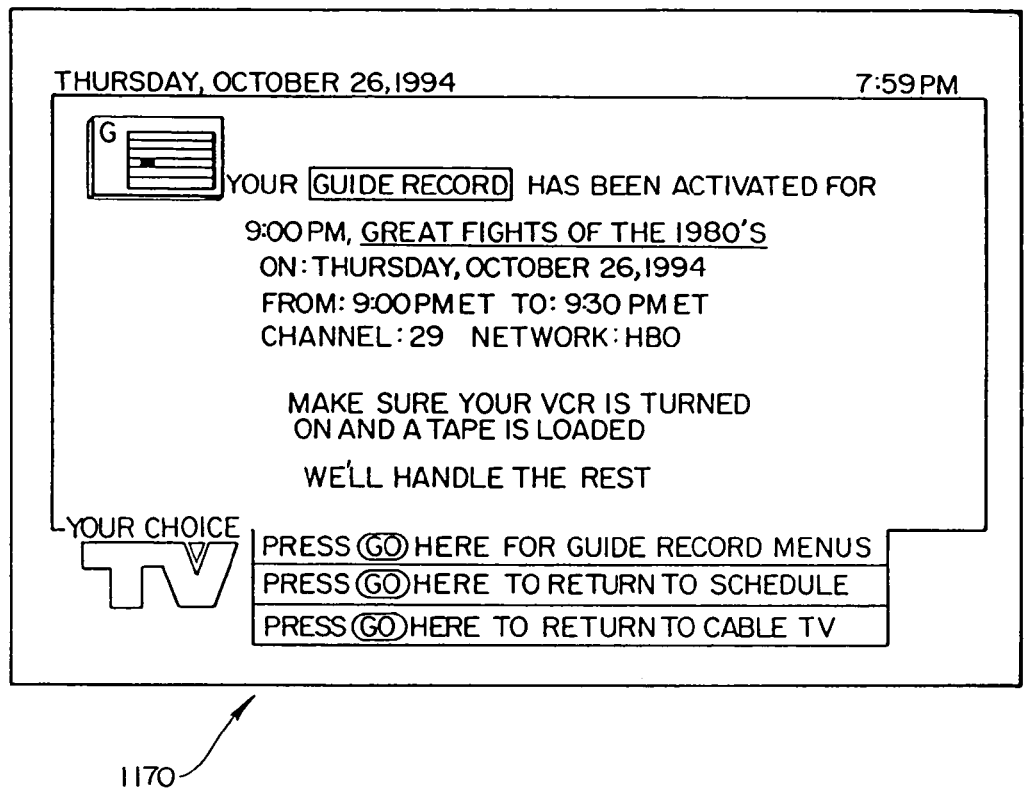
FIG. 22 is a drawing of a menu related to program guide services.

Referring to FIG. 22, the advanced system of the set top terminal 220 is used to control video tape machines and simplify recording programs using a Guide Record feature. The set top terminal 220 has a separate output 650 for a VCR. Control signals are transmitted through the VCR output of the set top terminal 220 and input to the VCR to allow the VCR to be automatically controlled by the set top terminal 220. Using the set top terminal 220, certain programs are selected by a subscriber from menus, and the VCR will be automatically activated to record the selected program.

In order to accommodate the VCR control feature, the set top terminal 220 sends instructions or control signals to the VCR. Such control signals are initiated by the set top terminal's microprocessor 602 and passed to the VCR either using a separate connection or as part of the video signals processed for display on the subscriber's television. These control signals are sent directly from the advanced set top terminal 220 to the VCR, instructing the VCR when to begin and end taping of a particular program.

The microprocessor 602 coordinates the dissemination of control signals sent to the VCR, storing the content of such signals in local memory. Upon nearing the time for the program to be displayed, the microprocessor 602 activates the menu generation software to display a notification menu or screen, notifying the subscriber that the program is nearing the time for display. This reminder will also request the subscriber to check whether a tape has been inserted into the VCR itself.

The subscriber can initiate the VCR control feature by accessing a VCR control submenu, which requests whether the subscriber wishes to record a program selected for future viewing. In this way the subscriber interactively enters such information on the menu screen or display using any of the hardware described above that accommodates subscriber interactive response capabilities.

In the preferred embodiment, the subscriber will use a movie library in conjunction with his VCR or other video taping machinery. The movie library is a menu selectable list of available movies. In that way, a subscriber may tape movies which are shown at inconvenient start times for later viewing. By enabling the proper features of the set top terminal 220, a subscriber can have the terminal activate the television and the VCR and perform all the functions necessary to tape a movie.

After the VCR control feature is initiated, a menu screen confirms the movie selection, start date and start time and informs the subscriber that the VCR will be automatically turned on. During this submenu, the user may return to the movie library major menu, or regular TV or cancel the movie library order by pressing the escape button. This menu shows that the subscriber has chosen to return to regular TV. The subscriber's VCR or other video taping equipment must be connected to the set top terminal 220 for the automatic taping feature to operate.

Following a program choice, a program description submenu is placed on the television screen. In addition, from this program description submenu, the viewer may choose to record the selected program on his VCR using the guide record feature. If the guide record feature is chosen, the guide record submenu 1170 shown in FIG. 22 provides the subscriber with further instructions. In order for the set top terminal 220 to perform the guide record functions and operate the VCR, control signals are sent from the set top terminal 220 to the VCR via the video connection 650 or through a separate connection between the set top terminal 220 and the VCR. The VCR is capable of interpreting these control signals from the set top terminal 220 and performing the desired function (such as, activating the record feature). In the preferred embodiment, the VCR control signals are sent with the video signal and output from the output 650, as described above. Alternatively, a separate connection between the set top terminal 220 and VCR may be used.

j. HDTV Capability

The set top terminal 220 and program delivery system of the preferred embodiment can easily support high definition television (HDTV). The combination of digital video, compression and no restricted bandwidth limitation per channel makes the preferred system ideal for HDTV. The greater information flow of HDTV causes no problems for the system. The menu selection system of the preferred embodiment is a user friendly manner of presenting HDTV programming to the subscriber.

Figure 23:
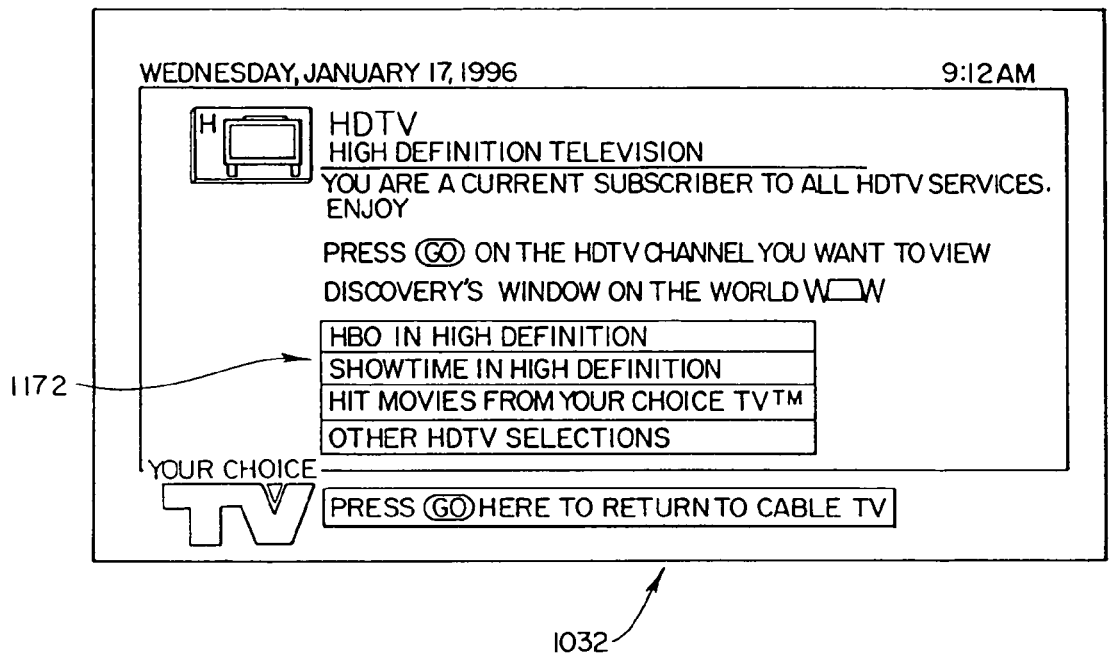
FIG. 23 is a drawing of a menu related to high definition television (HDTV) programming.

FIG. 23 shows the integration of HDTV services into the menu-driven program delivery system. If the subscriber selects the major menu for HDTV 1032, the subscriber will receive either a description of the service with a suggestion to order the system, or a text note that the subscription is current and a listing of the currently available program selections in HDTV. If the subscriber has not paid to join the particular service, HDTV, the subscriber may be allowed to join one of the programs in progress for a limited time as a demo to entice the subscriber to order.

If a subscriber has paid the HDTV fees, the subscriber proceeds as in any other major menu screen. This particular major menu shows an example of how a follow-on or second screen may exist for the same menu. In this particular case, a second screen exists for the major menu HDTV 1032. The subscriber may access the second screen by selecting the last menu display block 1172 "Other HDTV Selections" in the lower part of the screen. Following this selection, the subscriber will be given a second screen of program selections. In this manner, any menu can have multiple screens with many program choices. This type of screen pagination on one menu allows the operations center 202 packager to avoid categorizing program selections within that same menu. In an alternative embodiment, the options available to the subscriber may be scrolled on one menu screen with the text within the menu display blocks changing as the subscriber scrolls up or scrolls down. Many variations of this HDTV example can be used with the described system.

k. Backyard System

In an alternative configuration, in areas without cable services where subscribers use backyard satellite systems (TV RO) to receive packaged television services, the set top terminal 220 will include the appropriate hardware to allow connection to the satellite 206 reception equipment through port 656. In this configuration, the menu system within the set top terminal 220 will be programmed directly from the operations center 202. Additionally, an upstream communication mechanism must be in place at the subscriber's home (i.e. modem) to communicate information to the operations center.

The hardware components that allow the set top terminal 220 to operate in a backyard system typically will not be included within the set top terminal shell itself. Instead, any such components accommodating the set top terminal's interoperability with a backyard program delivery system will typically reside outside the subscriber's home. As a result, the set top terminal 220 will operate as described above, notwithstanding any change in program delivery transmission media.

l. Automatic Program Pause Feature and Voice-To-Text Conversion of Telephone Calls An apparatus and method consistent with the present invention provides for automatically pausing of a video program in response to detection of an occurrence of a communications event or related triggering event. The term "communications event" includes any communication of information through any wireline or wireless medium, examples of which are provided below. Communications events include audio communications events, and the term "audio communications event" includes any communications event having an audio component or portion, examples of which are provided below. The term "triggering event" includes a user's access to a communications event, examples of which are provided below. During the pausing, the video program is buffered such that a user may replay portions of it and perform other VCR-type functions of the program. In addition, the apparatus and method provide an indication of the communications event to the user by displaying, for example, text or graphics on a video display for the video program. For example, based upon detection of an incoming telephone call, the apparatus pauses the video program and displays an indication of the call overlayed on the paused video program or inset within it. This feature thus permits a user to automatically obtain an indication of a particular event while, at the same time, having the video program buffered such that portions of it are not missed, which is particularly useful for "live" video programs.

Figure 24A:
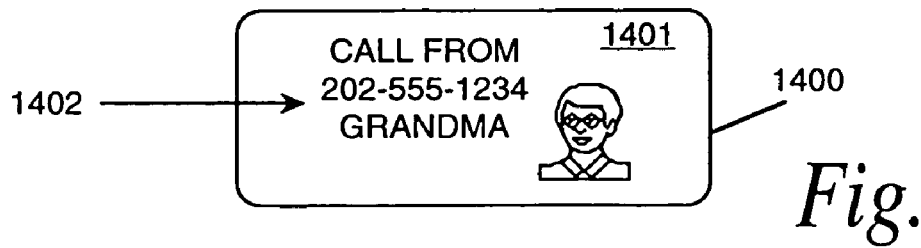
FIGS. 24a-24d are diagrams of exemplary indications of particular communications events for use in pausing a video program.

FIGS. 24a-24d provide examples of indications of various communications events which may be used to pause a video program. As shown in FIG. 24a, a video display 1400 displays a video program 1401. Based upon detection of a phone call, the system displays a message 1402, which may include the incoming telephone number as well as any text or graphics the user has previously associated with that number. For example, as shown, a user may associate a name with a particular number and potentially also associate an icon with it such as a "smiley face." The term "phone call" can include any type of telephonic communication through any medium such as wireline, wireless, a packet-based communication over a network such as the Internet, or by another medium or protocol.

The video display 1400 may be implemented with a television 222 or any device for displaying a video program, such as a computer monitor or flat screen display. Also, the indication of the communications event may be presented on the same display device as the paused video program, or on an associated display device.

Figure 24B:
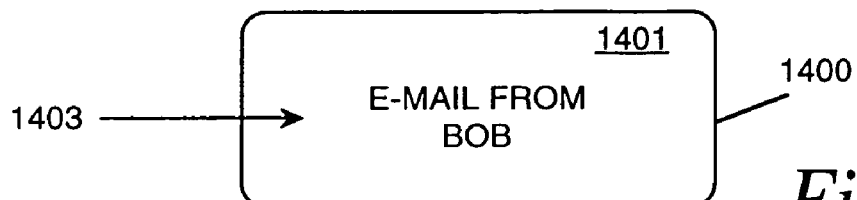

As shown in FIG. 24b, detection of an incoming e-mail message may result in a text message 1403 providing an indication of the incoming e-mail message. This indication can include the message itself for other identifying information, such as a graphic or an identification of the sender of the message. E-mails or e-mail messages include audio e-mails, which are e-mails having an audio portion. For example, in responding to a text e-mail message, a person may record an audio message and that audio message is sent as an audio file attached to a reply e-mail sent back to the sender.

Figure 24C:

As shown in FIG. 24c, detection of a message from program control may result in display of a message 1404. Program control refers to a particular content provider. For example, program control includes a cable television operator, a set top terminal manufacturer, or a cable television network programmer.

Figure 24D:
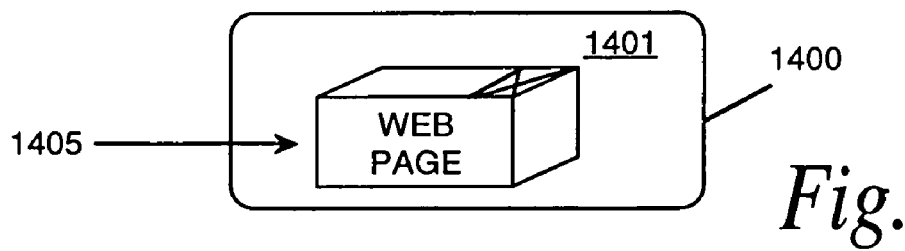

As shown in FIG. 24d, detection of an incoming web page may result in display of a web page 1405. Web pages includes pages formatted, for example, in HyperText Markup Language (HTML) for transmission over the Internet using web browsers. Web pages can include audio components such as attached audio files, music file, sound effects, or any other audio information. Also, a user's access to the web page may constitute a triggering event, resulting in pausing and buffering of the video program.

Many other types of triggering events are possible, involving a user's access to other types of communications events and audio communications events. Examples of other communications events include, but are not limited to, the following: a page to a pager number; an incoming cell phone call; an incoming facsimile transmission; or an indication of a voice mail. Examples of audio communications events include, but are not limited to, the following: a phone call; an audio e-mail message; a web page with an associated audio file or component; and a message an associated audio file or component. Examples of other triggering events include, but are not limited to, the following: a user's access to a page to a pager number; a user answering an incoming cell phone call; a user accessing or otherwise requesting to view an incoming facsimile transmission; a user's access to a pending voice mail message; or a user's access to his or her personal web page.

This program pause feature provides the user with an indication of a particular communications event, while buffering the paused video program. The user can thus take a particular action in response to the communications event without missing any substantial portion of the video program. For example, in response to display of an indication of an incoming telephone call, the user may choose to answer the telephone call while the video program is buffered. The system can buffer the video program either, for example, in response to the telephone call or in response to an off-hook condition indicating the user has answered the call. Likewise, in response to an e-mail message or message from program control, the user may choose to view the message while the paused video program continues to be buffered. The incoming e-mail and web pages may be related to user options; for example, a particular stock price may be used to automatically trigger an e-mail or web page transmission to the user's display device.

Figure 25:
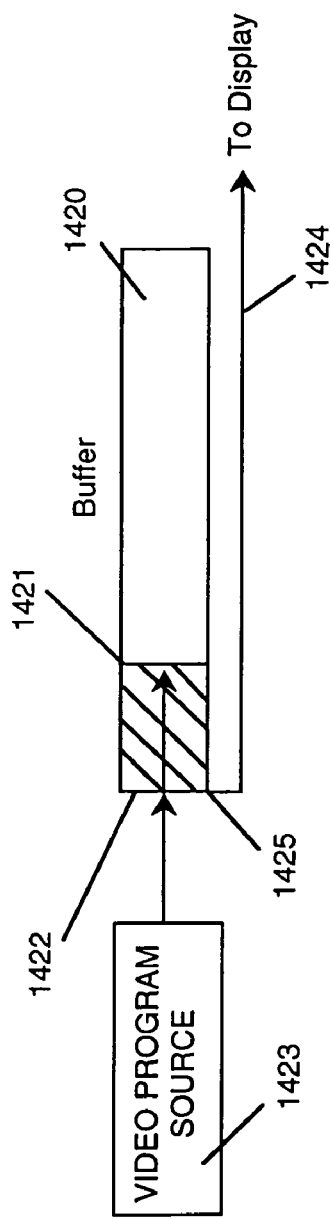
FIG. 25 is a diagram illustrating use of a buffer to store a video program while it is paused in response to detection of occurrence of a communications event.
Figure 26:
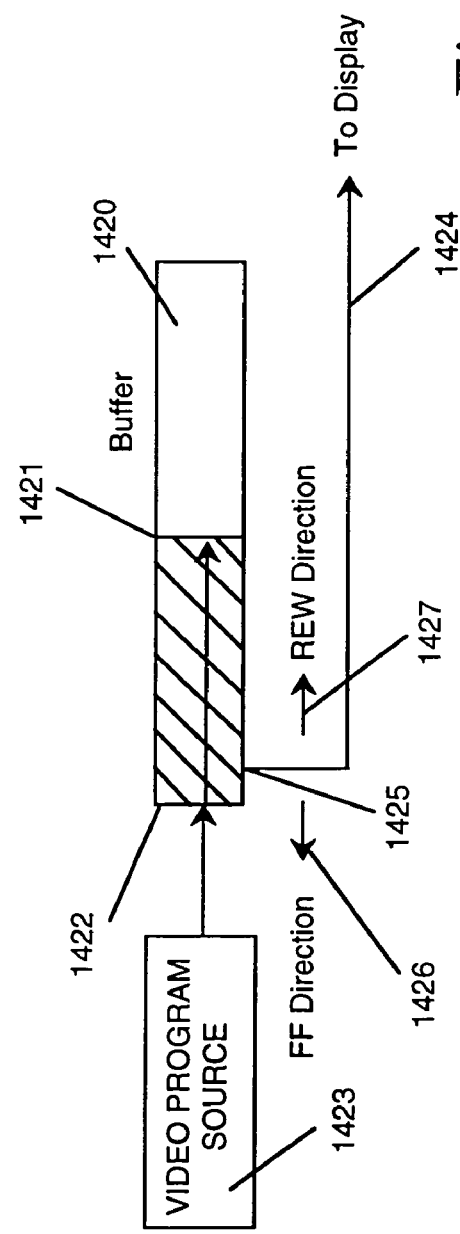
FIG. 26 is a diagram of use of a buffer to permit the user to execute various video program control functions of a buffered video program.

FIGS. 25 and 26 illustrate how use of the buffer for a video program permits the user to replay portions of the video program and execute other VCR-type functions for it. This feature is particularly useful for real-time ("live") video program transmission, where the user typically would otherwise lose portions of the transmission when the video program is paused. This feature may be used with any type of video program, whether transmitted, for example, in real-time or prerecorded. The buffer receives and stores the video program for subsequent playback. Various techniques are known for converting a video program into a digital signal, potentially compressing it, and storing it onto a storage device for subsequent replay. The buffer may be implemented with a storage device such as a hard disk drive or the RAM controlled by set top terminal 220, as shown in FIG. 4. Alternatively, the buffer can be implemented with a storage device at cable headend 208 or with any type of storage device receiving a video program for display on an associated display device.

As shown in FIG. 25, a buffer 1420 receives a video signal from a video program source 1423, which includes any source of a video signal for use in displaying a video program. Examples include broadcast television, other wireless and cable television transmission, and electronic devices outputting video signals. The video signal is typically processed for storage within buffer 1420, such as through conversion to a digital signal, compression, and filtering. Buffer point 1422 in buffer 1420 illustrates a point of current transmission. In other words, a beginning of the buffer corresponds with a current transmission of a video program from video program source 1423. The video program is transmitted from the buffer to a video program display 1424.

Upon reading the video signal from buffer 1420, various processing of it may occur for subsequent display on a television or other display device. For example, the stored video signal is typically converted to an analog signal, amplified, and filtered before transmission to the display device. A transmission point 1425 illustrates a point of transmission of the video program from buffer 1420 to display 1424. Therefore, when the system transmits the video program from the start of the buffer, with transmission point 1425 corresponding to the point of current transmission 1422, the video program is transmitted in real-time.

Although transmitted in real-time, the apparatus simultaneously buffers the incoming video signal for subsequent use in performing various video program control features. Therefore, buffer point 1421 illustrates the amount of the video program stored within buffer 1420. With various types of storage devices such as hard disk drives along with known compression technology, it is possible to buffer a substantial amount of a video program.

FIG. 26 illustrates use of the buffer for performing various video control functions, particularly after the video program has been paused. As the video program is paused, buffer point 1425 moves along buffer 1420 to track the last point of transmission of the video program. When the video program is paused, the user may execute various functions to continue to play the video program and play portions that were missed. Therefore, the amount of video buffered between point 1421 and buffer point 1425 represents an amount buffered before the video program was paused. The amount buffered between buffer point 1425 and point of current transmission 1422 represents the amount of video program missed by the user and buffered while the video program was paused. Upon requesting to play the video program, buffer point 1425 moves toward the beginning of buffer 1422 in order to play a buffered portion that was missed.

Since the video program has been buffered, the user may perform other functions. In particular, the user may rewind the video program, in which case buffer point 1425 moves in rewind direction 1427 to play previous portions of the video program. The user may fast forward the video program, in which case buffer point 1425 moves in fast forward direction 1426 toward the point of current transmission 1422 as the buffered video program is transmitted to display 1424. Accordingly, by transmitting the video program from various points along the buffered portion of the video program in buffer 1420, the user may perform VCR-type functions of real-time or other video programs. Various other buffering methodologies may also be used with the program pause feature.

Figure 27:
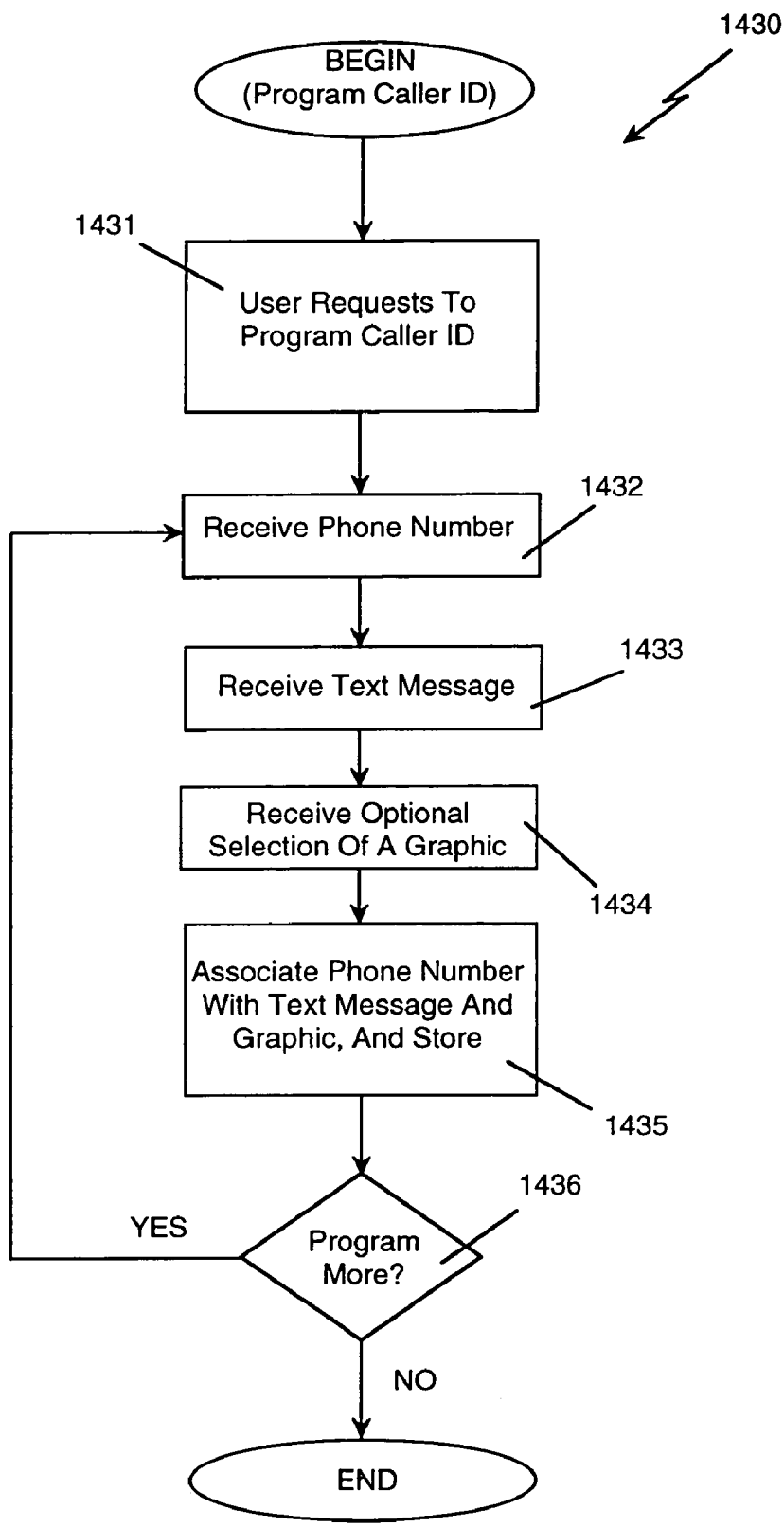
FIG. 27 is a flow chart of a method for programming a caller ID function.

FIG. 27 is a flow chart of a program caller ID method 1430 for programming a caller ID function. As also explained above, caller ID uses known technology for displaying on a telephone or associated device a caller's phone number for an incoming phone call. The caller ID function permits pausing of a video program to display an indication of an incoming telephone call. Program caller ID method 1430 permits a user to associate text messages and potentially graphical information with telephone numbers. Therefore, when a caller ID function displays the telephone number of an incoming telephone call, the system may also retrieve and display a name or other information associated with that number. Program caller ID method 1430 may be implemented in software or firmware, including modules, for execution by microprocessor 602 in set top terminal 220; alternatively, it may be implemented with other processor-controlled devices for use in displaying a video program on an associated display device. The term "module" includes a single module, multiple modules, and one or more modules each having one or more sub-modules.

In program caller ID method 1430, a user requests to program caller ID (step 1431), which may occur through the use of an input device such as a keyboard or remote control 900. The system receives a phone number from the user (step 1432), which the user may enter through use of remote control 900 or other input device. The user then enters a text message through use of remote control 900 or other input device (step 1433). In addition, the system may permit a user to select a graphic or other icon to also associate with the phone number (step 1434), an example of which is shown in FIG. 24a. The system can prestore various graphics or icons and display them to the user for selection through remote control 900 or other input device. In response to the user's request to save the information, the system associates the phone number with the text message and graphic and stores it for later retrieval (step 1435). The information may be stored in the RAM accessed by microprocessor 602. If the user requests to program more telephone numbers (step 1436), the system repeats steps 1432-1435. Certain numbers can be programmed to automatically pause the video program while others will need an additional step for pausing the video program.

Figure 28A:
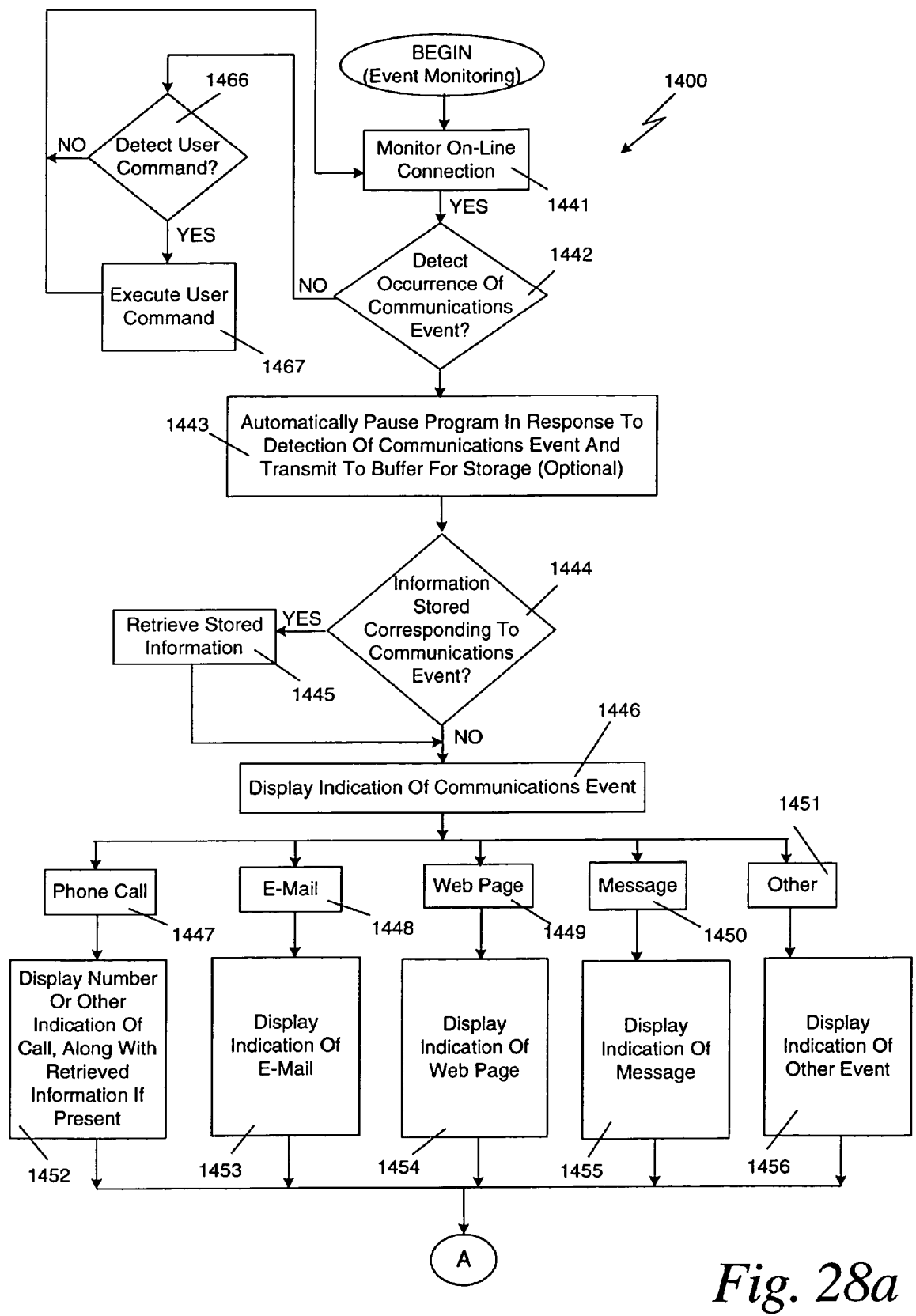
FIGS. 28a and 28b are a flow chart of a method for event monitoring for use in pausing a video program in response to detection of occurrence of a communications event.
Figure 28B:
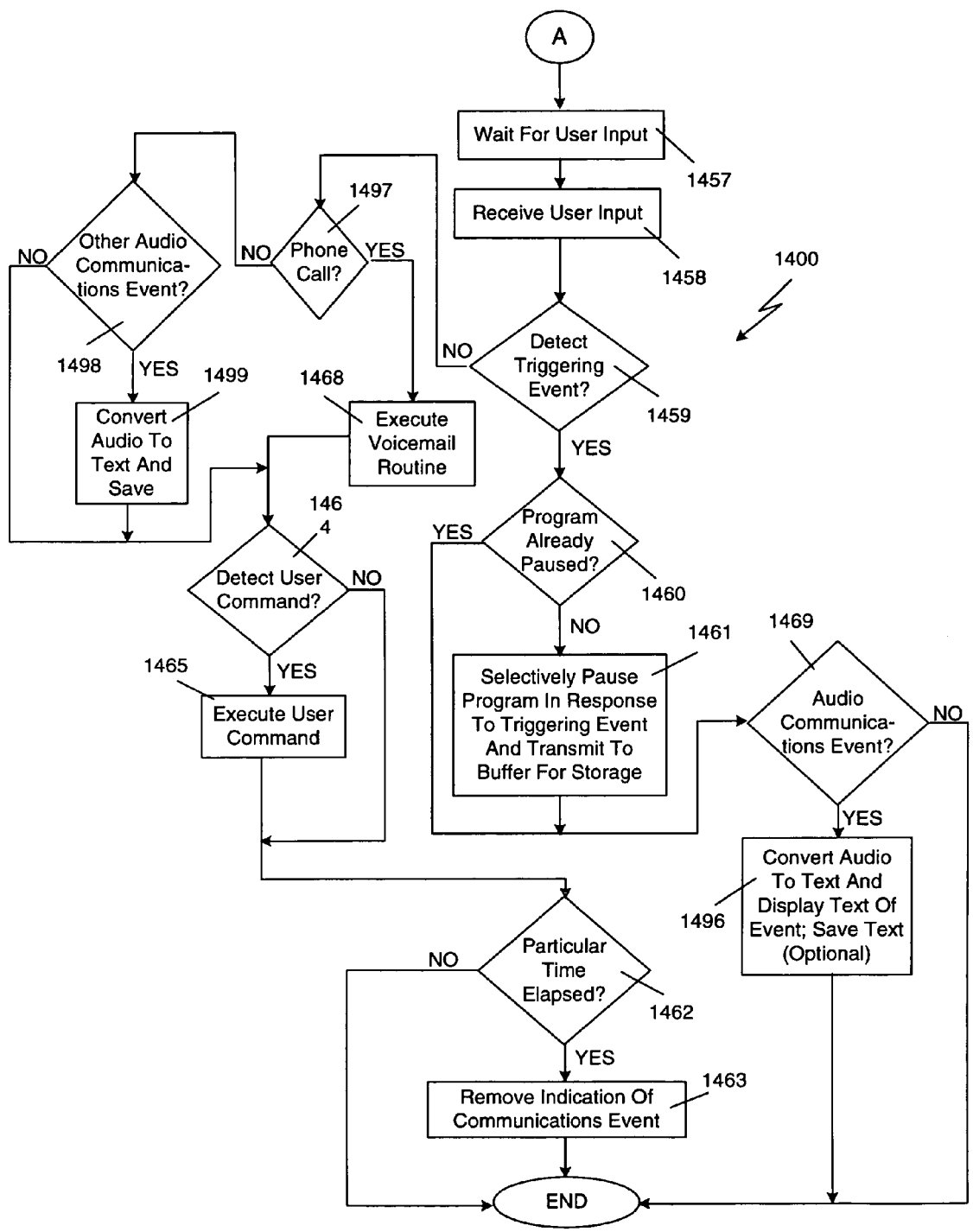

FIGS. 28a and 28b are a flow chart of an event monitoring method 1440 for monitoring communications events and pausing a video program in response to detection of an occurrence of a communications event or triggering event. Event monitoring method 1440, as well as the other described methods, may be implemented in software or firmware, including modules, for execution by microprocessor 602 in set top terminal 220; alternatively, it may be implemented with other processor-controlled terminal or device for use in displaying a video program on an associated display device.

In event monitoring method 1440, the system monitors an on-line connection (step 1441). This typically occurs at set top terminal 220, which may include a connection with a phone line through telephone jack 658 in addition to a connection to a source of a cable television signal, a satellite television signal, or other sources of video programs such as those described above or in the related applications identified above. Therefore, video programs include live or pre-recorded program from any source such as, for example, a broadcast television signal transmission, a cable television signal transmission, cable television, satellite television, video streaming over the Internet or other network, a VCR, a computer memory such as a hard disk drive, a CD-ROM, or a Digital Versatile Disk (DVD).

The system continually monitors the connection for an occurrence of a communications event (step 1442). During the monitoring, the system determines if it receives a user command (step 1466) and, if so, it executes the user command (step 1467), as explained below.

Upon detecting the occurrence of a communications event, the system optionally automatically pauses the video program in response to the communications event and continues to transmit it to the buffer for storage (step 1443). Step 1443 is optional in that a user may choose to have the video program paused in response to a triggering event, explained below, rather than in response to a communications event. Alternatively, in other embodiments information may be overlayed on the video program with the video program paused or not paused. Pausing the video program includes halting and buffering transmission of the video portion of the video program, the audio portion, or both. While paused, a paused (still) image of the video program can be displayed; alternatively, no image can be displayed or others can be displayed such as, for example, a blue screen, a graphic, a screen saver image, or other information.

The system also determines if stored information exists corresponding to the communications event (step 1444). For example, the user may have stored text information corresponding to particular phone numbers using program caller ID method 1430. If information corresponding to the communications event exists, the system retrieves the stored information (step 1445).

The system then displays an indication of the communications event (step 1446). This indication is typically displayed on the same television or display device which displays the video program. It may be displayed as an overlayed image on the displayed or paused video program or an inset image within the displayed or paused video program, as shown in FIGS. 24a-24d. If the communications event was a telephone call (step 1447), the system displays the number of the incoming telephone call or another indication of the call along with any retrieved information, if present (step 1452). The system may, for example, detect occurrence of a telephone call through monitoring a phone line through telephone jack 658 and detecting a signal corresponding to a phone call.

If the event was an incoming e-mail message (step 1448), the system displays an indication of the e-mail message such as the name of the sender (step 1453). The system may detect an e-mail message through use of e-mail communications software detecting an incoming e-mail on a phone line through telephone jack 658. Software packages for sending and receiving e-mail messages are known in the art. E-mail messages can include audio e-mail messages.

If the communications event was an incoming web page (step 1449), the system displays an indication of the web page such as the page itself (step 1454). The system may detect an incoming web page, for example, through use of a web browser in set top terminal 220 detecting receipt of a web page on a phone line through telephone jack 658. Web browsers are known in art and include, for example, the Microsoft Internet Explorer program and the Netscape Navigator program.

If the communications event was an incoming message (step 1450), the system displays an indication of the message such as an identification of the sender of the message (step 1455). The system may detect an incoming message in the same manner as detection of an e-mail message.

If another type of communications event occurred (step 1451), the system may display an indication of that type of communications event (step 1456). For any of the communications events, the system may alternatively display an icon, such as a telephone icon for a phone call or an envelope icon for an e-mail message, or display textual or other information providing an indication of the communications event. This display may be in the form of an overlay menu or a hidden menu. Alternatively, techniques such as picture-in-picture, split screen, or side-by-side screen displays may be used. After displaying an indication of the communications event, the system waits for user input (step 1457).

The system receives a particular user input (step 1458) and determines if it is a triggering event, which is a user's access to a communications event. For example, triggering events include a user answering a phone call, opening or selecting a displayed indication of an e-mail or web page, or one of the other examples provided above. Therefore, instead of having the video program automatically paused in response to the communications event, a user can continue to view the video program upon viewing an indication of a communications event and have the video program paused if the user decides to access the communications event. The indications of the communications events may be displayed overlayed on the video program, or inset within it, for that purpose. In addition, if no triggering event occurs within a particular time, the system can be programmed to automatically remove the indication of the communications event. Therefore, if the user does not access the communications event within a particular time frame, the system does not continue to display the indication of a communications event over the video program. The system may also be programmed for other types of options and examples include, but are not limited to, the following actions by the system based upon detection of a communications event or a triggering event: muting an audio portion of a video program, continue displaying a video portion of the video program, and buffering both the video and audio portions for future replay; or pausing a video portion of a video program, continue presenting an audio portion of the video program, and buffering both the video and audio portions for future replay.

The system determines if the user input is a triggering event (step 1459). For example, it may detect a phone off-hook condition or a user's selection of an e-mail or web page through, for example, use of remote control 900.

Alternatively, the television system may be equipped to allow the user to answer the phone using the remote control 900. If the user input is a triggering event, the system determines if the program is already paused (step 1460); if not, the system selectively pauses the program in response to the triggering event and transmits the video program to the buffer for storage (step 1461). As explained above, the pausing may include pausing both the video and audio portions of a video program, pausing only the audio portion, or pausing only the video portion. Typically, both the audio and video portions are buffered during the pausing.

The term "selectively paused" means that the user may specify whether or not to pause the video program in response to a triggering event; alternatively, the system may rely upon other criteria such as default settings to make that determination. The system also determines if the communications event is an audio communications event such as one of the examples provided above (step 1469). If it is an audio communications event, the system may converts the audio portion of the event to text for display to the user (step 1496). Based upon user preferences or other criteria, the system can display the text to the user in essentially real-time during the call, store the text for later retrieval, or both store and display it. Therefore, a user can view audio-to-text conversion during the event, such as a phone call, audio e-mail, or audio file of a web page, and also have the text stored for later use. The text is typically stored in a memory associated with the system and can be stored in a variety of formats such as, for example, a text file, an e-mail message, an HTML file, a particular word processing program format, or another format.

After the voice-to-text conversion has begun, the user may view the text in various ways including: viewing the text instead of the video program; viewing the text with the video program paused; viewing the text overlayed on the paused video program; viewing the text overlayed with the video and/or audio components of the video program running; or viewing the text in an e-mail.

If the user input was not a triggering event (step 1459), the system determines if the communications event is a phone call (step 1497) and, if so, executes a voice mail routine (step 1468). The voice mail routine permits the caller to leave a voice mail message. If the event is not a phone call, the system determines if the event is another type of audio communications event (step 1498); if so, it converts the audio of the event to text, and stores the text and possibly the audio as well (step 1499). The text can be stored in a variety of formats such as those identified above. By having the text saved, a user can later retrieve it for display. In addition, the system can display the text during the conversion.

The system also determines if an event was a user command (step 1464); if so, the system executes the user command (1465), as described in video program control method 1470 shown in FIG. 29 or in a routine for other user commands as explained below. As indicated, the system may also be programmed to remove the indication of the communications event if it does not detect a triggering event within a particular time frame. Therefore, the system may determine if a particular time has elapsed without receiving a triggering event (step 1462) and, if so, it removes the indication of the corresponding communications event (step 1463). For example, any overlayed items or text may be removed.

Figure 29:
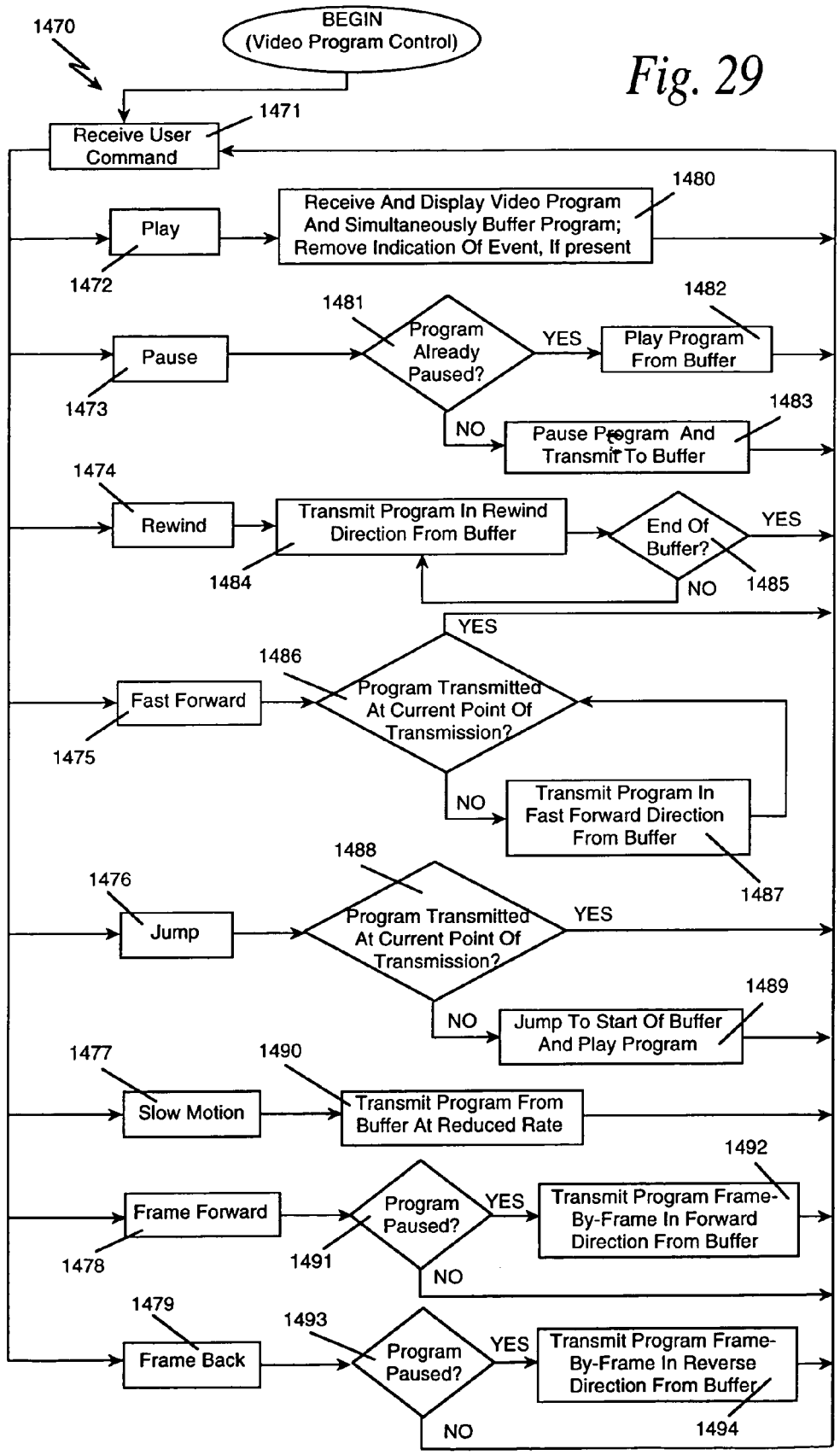
FIG. 29 is a flow chart of a method for video program control of a buffered video program.

FIG. 29 illustrates video program control method 1470, which may be executed simultaneously with event monitoring method 1440. Video program control method 1470 permits VCR-type functions based upon use of the buffer as explained with respect to FIGS. 25 and 26. In addition, video program control method 1470 permits the user to enter a command in step 1457 in the flow chart in FIGS. 28a and 28b in order to begin playing a video program after it has been paused in response to detection of an occurrence of a communications event. The user may also enter these commands at various other times during the viewing of a video program. Video program control method 1470 may be implemented in software or firmware, including modules, for execution by microprocessor 602 in set top terminal 220; alternatively, it may be implemented with other processor-controlled devices for use in displaying a video program on an associated display device.

In video program control method 1470, the system receives a user command (step 1471). The user may enter commands through use of remote control 900 or other input device. If the user entered a play command (step 1472), the system receives and displays a video program and simultaneously buffers the program; the system also removes an indication of a communications event from the display device, if present (step 1480). Therefore, if a program had been paused in response to detection of an occurrence of a communications event in event monitoring method 1440, the system removes the displayed indication and begins playing the video program from buffer point 1425 such that the user would not have missed any substantial portion of the video program.

If the user entered a pause command (step 1473), the system determines that the video program is already paused (step 1481). If the program is paused, the system begins playing the program again from the buffer at buffer point 1425 (step 1482). If the program was not paused, the system pauses the video program and continues to transmit it to the buffer for storage (step 1483). Therefore, in this preferred embodiment the pause function operates to pause the program and, upon selection of pause again, begin playing the video program at the point where it was paused.

If the user selected a rewind command (step 1474), the system transmits the video program in rewind direction 1427 from the buffer (step 1484). The system also determines during the rewind if it has reached the end of the buffer at point 1421 (step 1485). Once the system reaches the end of the buffer, it waits for another user command as it cannot further rewind the video program. If the user entered a fast forward command (step 1475), the system determines if the program is transmitted at the current point of transmission 1422 (step 1486). If the program is already transmitted at its current point of transmission, the system cannot fast forward beyond that point and waits for another user command. Otherwise, the system transmits the program in fast forward direction 1426 from the buffer (step 1487), and continues fast forwarding the video program until it reaches the current point of transmission as determined in step 1486.

If the user entered a jump command (step 1476), the system determines if the program is transmitted at current point of transmission 1422 (step 1488); if not, it jumps to the start of the buffer such that buffer point 1425 corresponds with the point of current transmission 1422 and plays the program from that point (step 1489). If the user entered a slow motion command (step 1477), the system transmits the program from the buffer at a reduced rate, which may be predetermined or entered by the user (step 1490).

If the user entered a frame forward command (step 1478), the system determines if the program is paused (step 1491). In this example, the system only executes the frame forward command after the program has first been paused. If the program is paused, the system transmits the program frame-by-frame in a forward direction from the buffer (step 1492).

The forward direction corresponds with fast forward direction 1426. If the user entered a frame back command (step 1479), the system again determines if the program is paused (step 1493), since in this example the system only performs the frame back command if the program is first paused. If the program is paused, the system transmits the video program frame-by-frame in a reverse direction from the buffer (step 1494). The reverse direction corresponds with rewind direction 1427.

Figure 30:
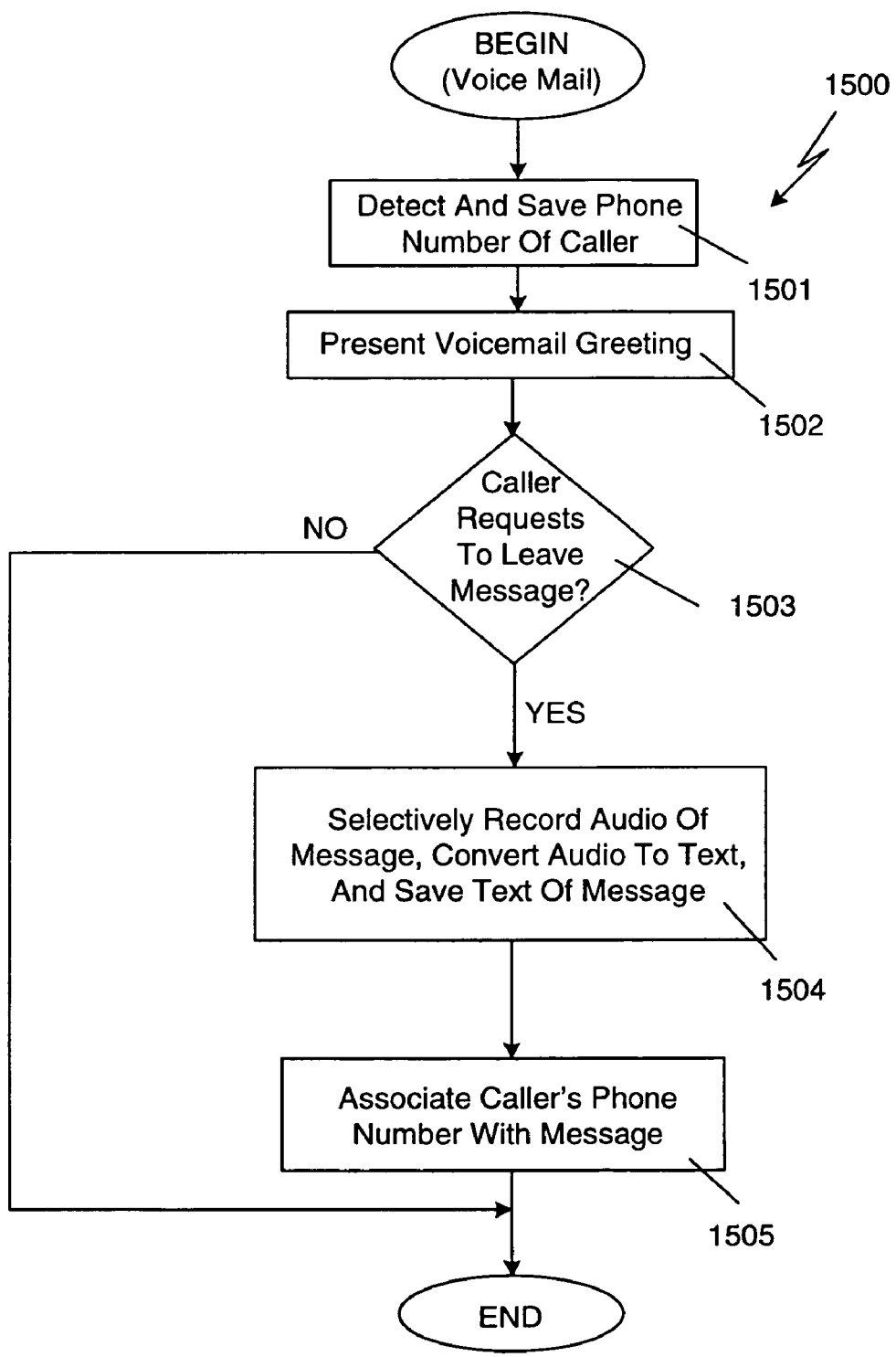
FIG. 30 is a flow chart of a method for recording a voice mail message and optionally converting the message to text.

FIG. 30 is a flow chart of a voice mail method 1500 for recording a voice mail message and optionally converting the message to text, executed for step 1468. In voice mail method 1500, preferably the system detects and saves a phone number of the caller (step 1501), which can be accomplished using conventional caller ID technology. The system presents an audio voice mail greeting to the caller (step 1502) and determines if the caller requests to leave a voice mail message (step 1503). The caller can make this request by entering a particular command or by waiting a particular period of time for an indication to begin leaving the message. The system then records a voice mail message, if requested by the user (step 1504).

In particular, the system selectively records the audio (voice) portion of the message, converts the audio to text, and saves the text and/or audio of the message. The user can typically set preferences instructing the system to save the audio portion of the message, the voice-to-text conversion of the message, or both. The system also associates the caller's phone number with the message for retrieval along with the message (step 1505) and can also associate other information with the message such as a date and time of the call. The recorded information can be stored in a memory associated with set top terminal 220 or telephone system (not shown).

Steps 1496 and 1504 that involve voice-to-text conversion can be implemented with known technology. In particular, voice-to-text, also referred to as speech-to-text, and speech recognition programs are known in the art and examples include those programs disclosed in the following U.S. patents, which are incorporated herein by reference: U.S. Pat. No. 5,864,805, entitled METHOD AND APPARATUS FOR ERROR CORRECTION IN A CONTINUOUS DICTATION SYSTEM; U.S. Pat. No. 5,799,278, entitled SPEECH RECOGNITION SYSTEM AND METHOD USING A HIDDEN MARKOV MODEL; U.S. Pat. No. 5,615,299, entitled SPEECH RECOGNITION USING DYNAMIC FEATURES; U.S. Pat. No. 5,325,462, entitled SYSTEM AND METHOD FOR SPEECH SYNTHESIS EMPLOYING IMPROVED FORMANT COMPOSITION; U.S. Pat. No. 5,313,531, entitled METHOD AND APPARATUS FOR SPEECH ANALYSIS AND SPEECH RECOGNITION; U.S. Pat. No. 5,054,074, entitled OPTIMIZED SPEECH RECOGNITION SYSTEM AND METHOD; U.S. Pat. No. 5,050,215, entitled SPEECH RECOGNITION METHOD; and U.S. Pat. No. 4,430,726, entitled DICTATION/TRANSCRIPTION METHOD AND ARRANGEMENT. Other examples include products developed by the AT&T Advanced Speech Products Group.

Figure 31:
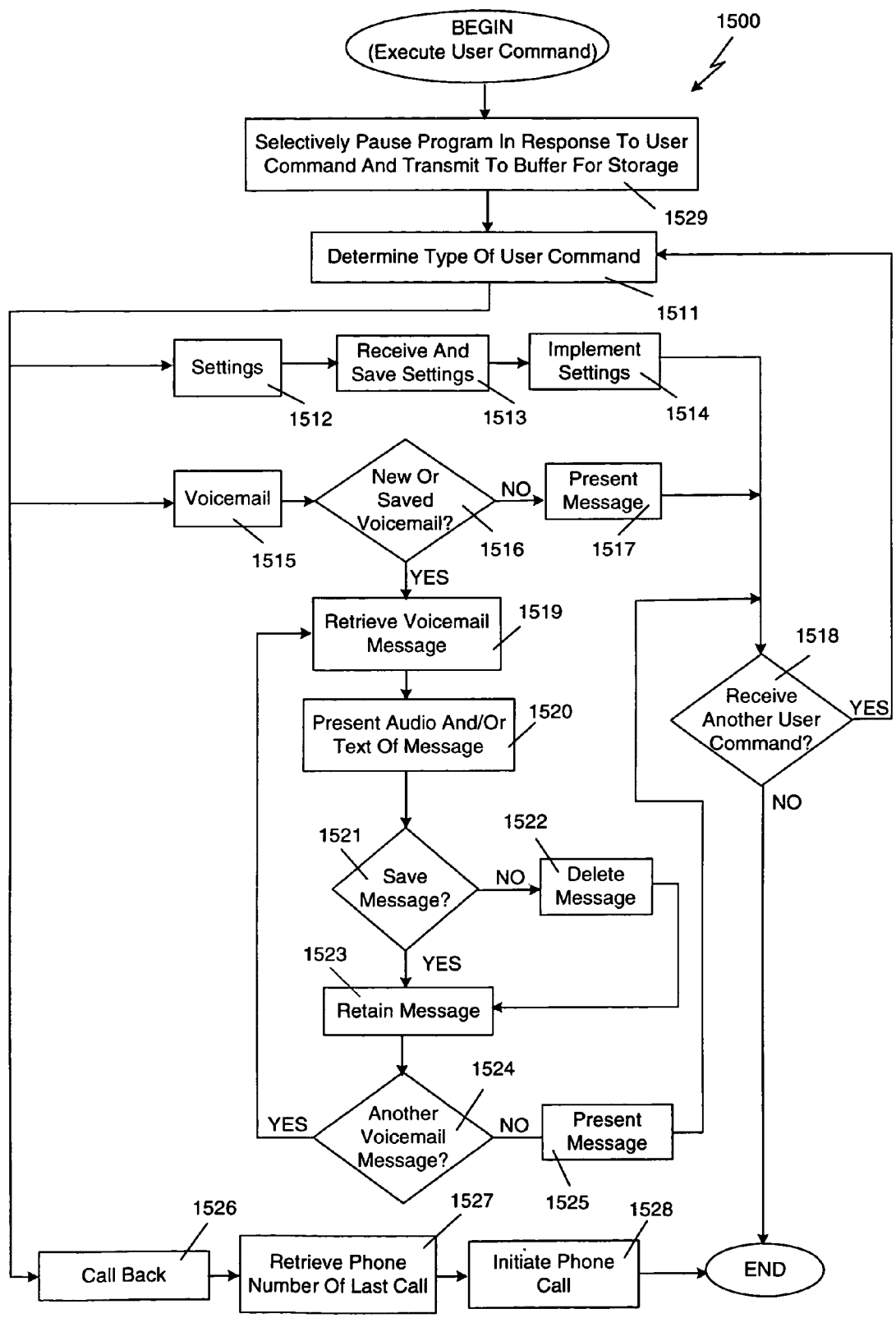
FIG. 31 is a flow chart of a method for executing various user commands.

FIG. 31 is a flow chart of a method 1510 for executing various user commands, which can be executed through steps 1466 and 1468. In method 1510, the system selectively pauses the video program in response to the user command and transmits it to the buffer for storage (step 1529). The video program is selectively paused, for example, based upon user preferences. The system determines the type of user command (step 1511). The type of command can be based, for example, upon a particular key stroke entered by a user through remote control 900, a voice command, or selection of a particular portion of an overlayed or displayed screen. If the user selected a settings command (step 1512), the system receives and saves the settings in memory (step 1513) and implements them (step 1514). The settings can specify the user preferences for a variety of functions such as, for example, whether to pause a video program in response to a communications event, whether to pause it in response to a triggering event, whether to display voice-to-text conversion of a real-time phone call, the information recorded for voice mail messages, how to display text overlayed with a paused or not paused video program (with or without audio), and whether to store audio, voice-to-text conversion, or both of a voice mail or other audio message.

If the user selected a voice mail command (step 1515), the system retrieves any new or saved voice mail messages or other audio messages for the user. The system determines if new or saved voice mail messages exist for the user (step 1516); if not, it can present an audio or visual message that the user's voice mailbox is empty (step 1517). If the system receives another user command (step 1518), it returns to step 1511.

If the user has a new or saved voice mail message pending, the system retrieves the voice mail message (step 1519). It presents the audio (voice) portion of the message, the voice-to-text conversion of the message, or both to the user (step 1520). The system determines whether the user wants to save the message (step 1521), which can be input through a key stroke on the remote control 900, a voice command, or another way. If the user does not want to save the message, the system deletes it (step 1522); otherwise, the system saves or retains the message (step 1523). The system determines if another voice mail message exists in the user's mailbox (step 1524) and, if so, it returns to step 1519 to process the next message. Otherwise, the system can present an audio or visual message indicating that no more messages exist (step 1525). It returns to step 1511 if it detects that the user has entered another command (step 1518). The voice mail steps can include additional functions and features as may be desired by users.

If the user entered a call back command (step 1526), the system retrieves the phone number of the last call (step 1527). The phone number of call can be detected and recorded using the caller ID function, as explained above. The system uses the phone number to initiate a phone call to that number (step 1528).

Figure 32:
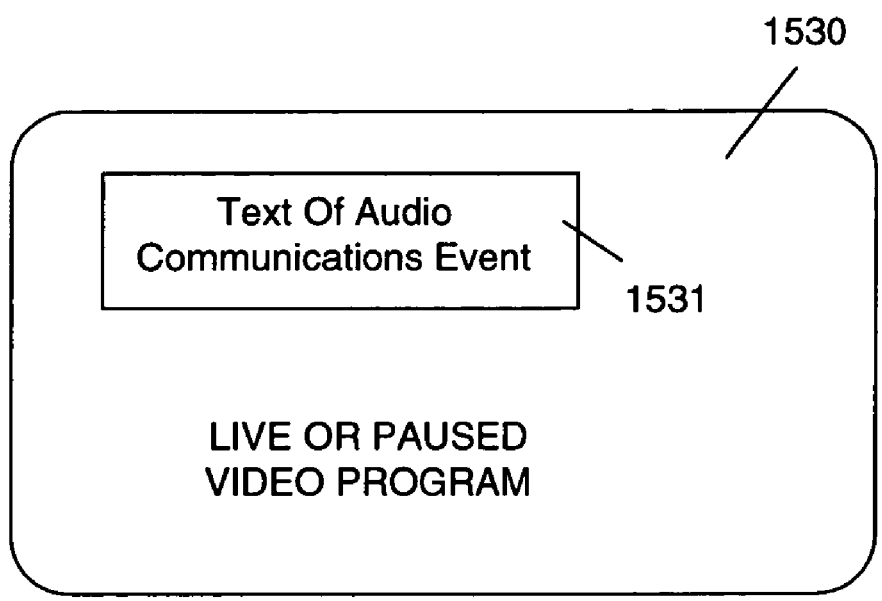
FIG. 32 is a diagram of an exemplary screen illustrating voice-to-text conversion presented in an overlayed window on a live or paused video program.

FIG. 32 is a diagram of an exemplary screen illustrating voice-to-text conversion presented in an overlayed window on a live or paused video program. This screen illustrates how voice-to-text conversion of an audio communications event can be presented in a window 1531 overlayed on a live or paused video program 1530. The voice-to-text conversion can include text from real-time telephone calls, real-time voice mail messages, saved voice mail messages, or other audio communications events. The audio portion of the audio communications event can be presented as well, in conjunction with or in place of the displayed text. The program audio for the presented video program may be on or muted. This screen displaying video program 1530 can be presented on any type of video or other display device such as, for example, a television, computer monitor or display device, or Internet appliance.

The terms and descriptions used herein are set forth by way of illustration only and are not meant as limitations. Those skilled in the art will recognize that numerous variations are possible within the spirit and scope of the invention as defined in the following claims.

What is claimed is:

1. A method, comprising:

receiving a video program;

outputting the video program for presentation to a user on a display device;

receiving a notification portion of an incoming audio communications event that originates remotely from the user, wherein the incoming audio communications event comprises the notification portion and an audio portion;

detecting by a processor the receiving of the notification portion of the incoming audio communications event during the video program presentation;

pausing automatically the video program upon detecting the receiving of the notification portion of the incoming audio communications event without any action by the user;

converting the audio portion of the incoming audio communications event to corresponding text for display; and outputting a signal for displaying an indication of the receiving of the notification portion of the incoming audio communications event.

2. The method of claim 1 wherein the detecting step includes detecting an incoming phone call, an audio e-mail, a web page with an associated audio file, or a message with an associated audio file.

3. The method of claim 2 wherein the outputting the signal step includes outputting the signal for displaying a telephone number associated with the incoming telephone call.

4. The method of claim 3 wherein the outputting the signal step includes outputting the signal for displaying a text message associated with the telephone number.

5. The method of claim 3 wherein the outputting the signal step includes outputting the signal for displaying a graphic associated with the telephone number.

6. The method of claim 2, further including:

receiving a voice mail message related to the telephone call;

converting the voice mail message to corresponding text; and storing the text of the voice mail message.

7. The method of claim 6, further including storing the received voice mail message in audio form.

8. The method of claim 6, further including presenting the text of the voice mail message.

9. The method of claim 7, further including presenting the text and the audio form of the voice mail message.

10. The method of claim 1, further including displaying the corresponding text in a window overlayed on the paused video program.

11. The method of claim 2, further including initiating a call back of the telephone call.

12. The method of claim 1, further including:

receiving a play signal to restart the video program; and transmitting, in response to the play signal, the video program for presentation on the display device starting at an approximate location where the video program was paused.

13. The method of claim 12, further including:

receiving a fast forward signal to increase a rate of transmission of the video program; and transmitting, in response to the fast forward signal, video program at an increased rate for presentation of an increased rate of display of the video program on the display device.

14. The method of claim 12, further including:

receiving a rewind signal to reverse a rate of transmission of the video program; and transmitting, in response to the rewind signal, the video program at a reversed rate for presentation of a reversed rate of display of the video program on the display device.

15. The method of claim 12, further including:

receiving a slow motion signal to decrease a rate of transmission of the video program; and transmitting, in response to the slow motion signal, the video program at an decreased rate for presentation of a decreased rate of display of the video program on the display device.

16. The method of claim 1, further including:

receiving a frame forward signal to display a next frame of the video program; and transmitting, in response to the frame forward signal, a next frame of the video program for presentation of the next frame on the display device.

17. The method of claim 1, further including:

receiving a frame back signal to display a previous frame of the video program; and transmitting, in response to the frame back signal, a previous frame of the video program for presentation of the previous frame on the display device.

18. The method of claim 12, further including:

receiving a jump signal to display the video program from a current point of transmission; and transmitting, in response to the jump signal, the video program for presentation of the video program from the current point of transmission on the display device.

19. The method of claim 2, further including receiving information to associate with a particular phone number.

20. The method of claim 19 wherein the receiving information step includes receiving textual information or graphical information.

21. The method of claim 19 wherein:

the detecting step includes detecting occurrence of an incoming telephone call associated with the particular phone number; and the outputting the signal step includes outputting the signal for displaying the information associated with the particular phone number.

22. An apparatus, comprising:

a module for receiving a video program and outputting the video program for presentation to a user on a display device;

a module for receiving a notification portion of an incoming audio communications event that originates remotely from the user, wherein the incoming audio communications event comprises the notification portion and an audio portion;

a detection module for detecting the receiving of the notification portion of the incoming audio communications event during the video program presentation;

a pause module for pausing automatically the video program upon detecting the receiving of the notification portion of the incoming audio communications event without any action by the user;

a conversion module for converting the audio portion of the incoming audio communications event to corresponding text for display; and an output module for outputting a signal for displaying an indication of the receiving of the notification portion of the incoming audio communications event.

23. The apparatus of claim 22 wherein the detection module Includes a module for detecting an incoming phone call, an audio email, a web page with an associated audio file, or a message with an associated audio file.

24. The apparatus of claim 23 wherein the output module includes a module for outputting the signal for displaying a telephone number associated with the incoming telephone call.

25. The apparatus of claim 24 wherein the output module includes a module for outputting the signal for displaying a text message associated with the telephone number.

26. The apparatus of claim 24 wherein the output module includes a module for outputting the signal for displaying a graphic associated with the telephone number.

27. The apparatus of claim 23, further including:
a module for receiving a voice mail message related to the telephone call;
a module for converting the voice mail message to corresponding text; and
a module for storing the text of the voice mail message.

28. The apparatus of claim 27, further including a module storing the received voice mail message in audio form.

29. The apparatus of claim 27, further including a module for presenting the text of the voice mail message.

30. The apparatus of claim 28, further including a module for presenting the text and the audio form of the voice mail message.

31. The apparatus of claim 22, further including a module for displaying the corresponding text in a window overlayed on the paused video program.

32. The apparatus of claim 23, further including a module for initiating a call back of the telephone call.

33. The apparatus of claim 22, further including:
a module for receiving a play signal to restart the video program; and
a module for transmitting, in response to the play signal, the video program for presentation on the display device starting at an approximate location where the video program was paused.

34. The apparatus of claim 33, further including:
a module for receiving a fast forward signal to increase a rate of transmission of the video program; and
a module for transmitting, in response to the fast forward signal, video program at an increased rate for presentation of an increased rate of display of the video program on the display device.

35. The apparatus of claim 33, further including:
a module for receiving a rewind signal to reverse a rate of transmission of the video program; and
a module for transmitting, in response to the rewind signal, the video program at a reversed rate for presentation of a reversed rate of display of the video program on the display device.

36. The apparatus of claim 33, further including:
a module for receiving a slow motion signal to decrease a rate of transmission of the video program; and
a module for transmitting, in response to the slow motion signal, the video program at an decreased rate for presentation of a decreased rate of display of the video program on the display device.

37. The apparatus of claim 22, further including:
a module for receiving a frame forward signal to display a next frame of the video program; and
a module for transmitting, in response to the frame forward signal, a next frame of the video program for presentation of the next frame on the display device.

38. The apparatus of claim 22, further including:
a module for receiving a frame back signal to display a previous frame of the video program; and
a module for transmitting, in response to the frame back signal, a previous frame of the video program for presentation of the previous frame on the display device.

39. The apparatus of claim 33, further including;
a module for receiving a jump signal to display the video program from a current point of transmission; and
a module for transmitting, in response to the jump signal, the video program for presentation of the video program from the current point of transmission on the display device.

40. The apparatus of claim 23, further including a module for receiving information to associate with a particular phone number.

41. The apparatus of claim 40 wherein the module for receiving information includes a module for receiving textual information or graphical information.

42. The apparatus of claim 40 wherein:
the detection module includes a module for detecting occurrence of an incoming telephone call associated with the particular phone number; and
the output module includes a module for outputting the signal for displaying the information associated with the particular phone number.

43. A computer program product, comprising:
a computer-readable medium containing instructions for controlling a computer system to perform a method, the method including:
receiving a video program;
outputting the video program for presentation to a user on a display device;
receiving a notification portion of an incoming audio communications event that originates remotely from the user, wherein the incoming audio communications event comprises the notification portion and an audio portion;
detecting by the computer system the receiving of the notification portion of the incoming audio communications event during the video program presentation;
pausing automatically the video program upon detecting the receiving of the notification portion of the audio communications event without any action by the user;
converting the audio portion of the incoming audio communications event to corresponding text for display; and
outputting a signal for displaying an indication of the receiving of the notification portion of the incoming audio communications event.

44. The computer program product of claim 43 wherein the detecting step includes detecting an incoming phone call, an audio e-mail, a web page with an associated audio file, or a message with an associated audio file.

45. The computer program product of claim 44 wherein the outputting the signal step includes outputting the signal for displaying a telephone number associated with the incoming telephone call.

46. The computer program product of claim 45 wherein the outputting the signal step includes outputting the signal for displaying a text message associated with the telephone number.

47. The computer program product of claim 45 wherein the outputting the signal step includes outputting the signal for displaying a graphic associated with the telephone number.

48. The computer program product of claim 44, further including;
receiving a voice mail message related to the telephone call;
converting the voice mail message to corresponding text; and
storing the text of the voice mail message.

49. The computer program product of claim 48, further including storing the received voice mail message in audio form.

50. The computer program product of claim 48, further including presenting the text of the voice mail message.

51. The computer program product of claim 49, further including presenting the text and the audio form of the voice mail message.

52. The computer program product of claim 43, further including displaying the corresponding text in a window overlayed on the paused video program.

53. The computer program product of claim 43, further including initiating a call back of the telephone call.

54. The computer program product of claim 43, further including:
receiving a play signal to restart the video program; and
transmitting, in response to the play signal, the video program for presentation on the display device starting at an approximate location where the video program was paused.

55. The computer program product of claim 54, further including:
receiving a fast forward signal to increase a rate of transmission of the video program; and
transmitting, in response to the fast forward signal, video program at an increased rate for presentation of an increased rate of display of the video program on the display device.

56. The computer program product of claim 54, further including:
receiving a rewind signal to reverse a rate of transmission of the video program; and
transmitting, in response to the rewind signal, the video program at a reversed rate for presentation of a reversed rate of display of the video program on the display device.

57. The computer program product of claim 54, further including:
receiving a slow motion signal to decrease a rate of transmission of the video program; and
transmitting, in response to the slow motion signal, the video program at an decreased rate for presentation of a decreased rate of display of the video program on the display device.

58. The computer program product of claim 43, further including:
receiving a frame forward signal to display a next frame of the video program; and
transmitting, in response to the frame forward signal, a next frame of the video program for presentation of the next frame on the display device.

59. The computer program product of claim 43, further including:
receiving a frame back signal to display a previous frame of the video program; and
transmitting, in response to the frame back signal, a previous frame of the video program for presentation of the previous frame on the display device.

60. The computer program product of claim 54, further including:
receiving a jump signal to display the video program from a current point of transmission; and
transmitting, in response to the jump signal, the video program for presentation of the video program from the current point of transmission on the display device.

61. The computer program product of claim 44, further including receiving information to associate with a particular phone number.

62. The computer program product of claim 61 wherein the receiving information step includes receiving textual information or graphical information.

63. The computer program product of claim 61 wherein:
the detecting step includes detecting occurrence of an incoming telephone call associated with the particular phone number; and
the outputting the signal step includes outputting the signal for displaying the information associated with the particular phone number.

* * * * *

UNITED STATES PATENT AND TRADEMARK OFFICE
CERTIFICATE OF CORRECTION

| | |
|---|---|
| PATENT NO. | : 7,293,279 B1 |
| APPLICATION NO. | : 09/609285 |
| DATED | : November 6, 2007 |
| INVENTOR(S) | : Michael L. Asmussen |

It is certified that error appears in the above-identified patent and that said Letters Patent is hereby corrected as shown below:

On the title page, item 56, OTHER PUBLICATIONS, delete "PAge," and insert instead --Page,--.

Column 15, line 22, delete "609,616" and insert instead --609, 616--; line 37, delete "demulfiplexed" and insert instead --demultiplexed--.

Column 19, lines 13-15, delete "Program Overlay Menus 1390 are similar to Hidden Menus 1380. However, the" and insert the same at column 19, line 16, before "Program" as the beginning of the paragraph.

Column 21, line 32, delete "fill" and insert instead --full--.

Column 22, line 64, after "itself" insert --.--.

Column 25, line 7, delete "310,312," and insert instead --310, 312,--.

Column 26, line 18 (approx), delete "928,928')." and insert instead --928, 928').--

Column 31, line 45, delete "370,374," and insert instead --370, 374,--.

Column 35, lines 10-27, delete "In order for this feature to operate, . . . suggesting programs may be used." and insert the same at column 35, line 11, after "watch." as a separate paragraph.

Column 36, line 28 (approx), after "the" insert --6--.

Column 38, line 62, delete "lowerpart" and insert instead --lower part--.

Column 39, lines 28-38; delete "Upon receiving the telephone number from which the call was initiated ... the television screen using an overlay menu." and insert the same at column 39, line 29, after "initiated." as a separate paragraph; lines 38-53, delete "In this manner the viewer may see the name ... answering machine normally activates and answers the call." and insert the same at column 39, line 39, after "menu." as a separate paragraph.

Column 40, lines 4-12, delete "In the preferred embodiment, the digital audio feature ... top terminal 220 in limited segments of bandwidth." and insert the same at column 40, line 5, after "system." as a separate paragraph.

UNITED STATES PATENT AND TRADEMARK OFFICE
CERTIFICATE OF CORRECTION

PATENT NO. : 7,293,279 B1
APPLICATION NO. : 09/609285
DATED : November 6, 2007
INVENTOR(S) : Michael L. Asmussen It is certified that error appears in the above-identified patent and that said Letters Patent is hereby corrected as shown below:

Column 44, line 17, delete "for" and insert --or--.

Column 55, line 2, in claim 23, delete "Includes" and insert instead --includes--; line 3, delete "email," and insert instead --e-mail,--.

Column 56, line 8, in claim 39, delete "including;" and insert instead --including:--.

Column 57, line 6, in claim 48, delete "including;" and insert instead --including:--.

Signed and Sealed this

First Day of April, 2008

JON W. DUDAS
*Director of the United States Patent and Trademark Office*